United States Patent
Hayashi et al.

(10) Patent No.: US 12,541,925 B2
(45) Date of Patent: Feb. 3, 2026

(54) INFORMATION PROCESSING APPARATUS AND METHOD THEREOF

(71) Applicant: Sony Group Corporation, Tokyo (JP)

(72) Inventors: Kao Hayashi, Kanagawa (JP); Satoru Kuma, Tokyo (JP); Tsuyoshi Kato, Kanagawa (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 223 days.

(21) Appl. No.: 18/563,238

(22) PCT Filed: Nov. 25, 2021

(86) PCT No.: PCT/JP2021/043204
§ 371 (c)(1),
(2) Date: Nov. 21, 2023

(87) PCT Pub. No.: WO2022/269944
PCT Pub. Date: Dec. 29, 2022

(65) Prior Publication Data
US 2024/0265638 A1    Aug. 8, 2024

(30) Foreign Application Priority Data
Jun. 25, 2021  (JP) .................. 2021-105856

(51) Int. Cl.
*G06T 19/00* (2011.01)
*G06T 9/00* (2006.01)

(52) U.S. Cl.
CPC ............ *G06T 19/00* (2013.01); *G06T 9/001* (2013.01); *G06T 2207/10028* (2013.01); *G06T 2207/20021* (2013.01)

(58) Field of Classification Search
None
See application file for complete search history.

(56) References Cited

U.S. PATENT DOCUMENTS

2017/0068689 A1 *   3/2017  Sato .................. G06F 16/29
2019/0197739 A1     6/2019  Sinharoy
(Continued)

FOREIGN PATENT DOCUMENTS

KR       20200092418 A      8/2020
WO       WO-2020101021 A1   5/2020

OTHER PUBLICATIONS

Graziosi et al., [VPCC] [EE2.6-related] Mesh Geometry Smoothing Filter, International Organisation for Standardisation, ISO/IEC JTC 1/SC 29/WG 7 m55374, Oct. 2020, pp. 1-6.
(Continued)

*Primary Examiner* — Tapas Mazumder
(74) *Attorney, Agent, or Firm* — Paratus Law Group, PLLC

(57) ABSTRACT

There is provided an information processing apparatus and method capable of suppressing a reduction in the quality of 3D data due to encoding and decoding. By dividing a mesh representing an object having a three-dimensional structure into patches, pair information indicating a pair constituted by a single vertex of the mesh or a plurality of vertices of a patch generated from a plurality of vertices at the same position is generated, and the generated pair information is encoded. The present disclosure may be applied to, for example, an information processing apparatus, an electronic device, an information processing method, a program or the like.

20 Claims, 33 Drawing Sheets

(56) References Cited

U.S. PATENT DOCUMENTS

| | | |
|---|---|---|
| 2020/0043121 A1 | 2/2020 | Boyce |
| 2020/0219286 A1 | 7/2020 | Sinharoy et al. |
| 2020/0221137 A1* | 7/2020 | Vosoughi ............. H04N 19/865 |
| 2021/0090301 A1 | 3/2021 | Mammou |
| 2021/0092430 A1 | 3/2021 | Schwarz et al. |
| 2021/0174551 A1* | 6/2021 | Graziosi ................ G06T 17/20 |

OTHER PUBLICATIONS

Graziosi et al., <m55368> Mesh Patch Data, Oct. 2020, pp. 1-30.

Graziosi et al., <m55374> Mesh Geometry Smoothing Filter, Jan. 2022, pp. 1-11, retrieved from: https://mpeg-pcc.org/index.php/public-contributions/mpeg-132-sony-contribution-list.

Graziosi et al., <m55368> Mesh Patch Data, Jan. 2022, pp. 1-32, retrieved from: https://mpeg-pcc.org/index.php/public-contributions/mpeg-132-sony-contribution-list.

Tang et al., Deep Implicit Volume Compression, 2020 IEEE/CVF Conference on Computer Vision and Pattern Recognition (CVPR), Jan. 2022, pp. 1290-1300.

* cited by examiner

*FIG. 5*

| 1 | TRANSMISSION (ENCODING) OF PAIR INFORMATION OF VERTICES (EDGES) | | | | |
|---|---|---|---|---|---|
| 1-1 | GENERATION OF PAIR INFORMATION | | | | |
| | PAIRING VERTICES SEPARATED AT PATCH SEGMENTATION | | | | |
| 1-2 | PAIR INFORMATION UNIT | | | | |
| | FOR EACH PAIR (ALL PAIRS) | | | | |
| | FOR EACH PAIR GROUP (SOME PAIRS) | | | | |
| | | BOTH END POINTS, INTERMEDIATE POINT (THREE POINTS) | | | |
| | | START POINT/END POINT (TWO POINTS)+PAIR CORRESPONDENCE DIRECTION FLAG | | | |
| 1-3 | PAIR INFORMATION CONFIGURATION | | | | |
| 1-3-1 | TRANSMISSION ORDER | | | | |
| | ONE BY ONE | | | | |
| | | TRANSMITTING PARAMETERS INDICATING NUMBER OF VERTICES OF PAIR | | | |
| | | LISTING CONTINUOUS VERTICES AND PARING LIST | | | |
| 1-3-2 | CONTENTS OF PAIR INFORMATION | | | | |
| | | IDENTIFICATION INFORMATION | | | |
| | | ALL VERTEX IDs | | | |
| | | IN-PATCH VERTEX ID | | | |
| | | | +PATCH ID | | |
| | | | | FOR EACH PAIR | |
| | | | | FOR EACH PLURALITY OF PAIRS | |
| | | | BOUNDARY VERTEX LIST ID | | |
| | | | | +BOUNDARY VERTEX LIST | |
| | | | ABSOLUTE VALUE | | |
| | | | RELATIVE VALUE | | |

FIG. 6

| | UV COORDINATES | | | |
|---|---|---|---|---|
| | | ABSOLUTE VALUE | | |
| | | RELATIVE VALUE | | |
| | | | DIFFERENCE | |
| | | | PATCH RELATIVE VECTOR +DIFFERENCE | |
| | | | POSTURE CORRECTION+PATCH RELATIVE VECTOR+DIFFERENCE | |
| | | | DIFFERENCE OF OTHER PAIR+DIFFERENCE | |
| 1-4 | VERTEX INTERPOLATION | | | |
| | | FROM OCCUPANCY MAP AND CONNECTIVITY INFORMATION | | |
| | | FROM CONNECTIVITY INFORMATION | | |
| 1-5 | PAIR USE POSITION CORRECTION | | | |
| | | PAIRING INTO ONE POINT | | |
| | | PAIR DUPLICATION | | |
| | | MESHING | | |
| 1-5-1 | COORDINATE DETERMINATION METHOD | | | |
| | | SELECTING ANY VERTEX COORDINATES | | |
| | | | TRANSMITTING INFORMATION INDICATING VERTEX TO BE SELECTED | |
| | | (WEIGHTED) AVERAGE OF VERTEX COORDINATES | | |

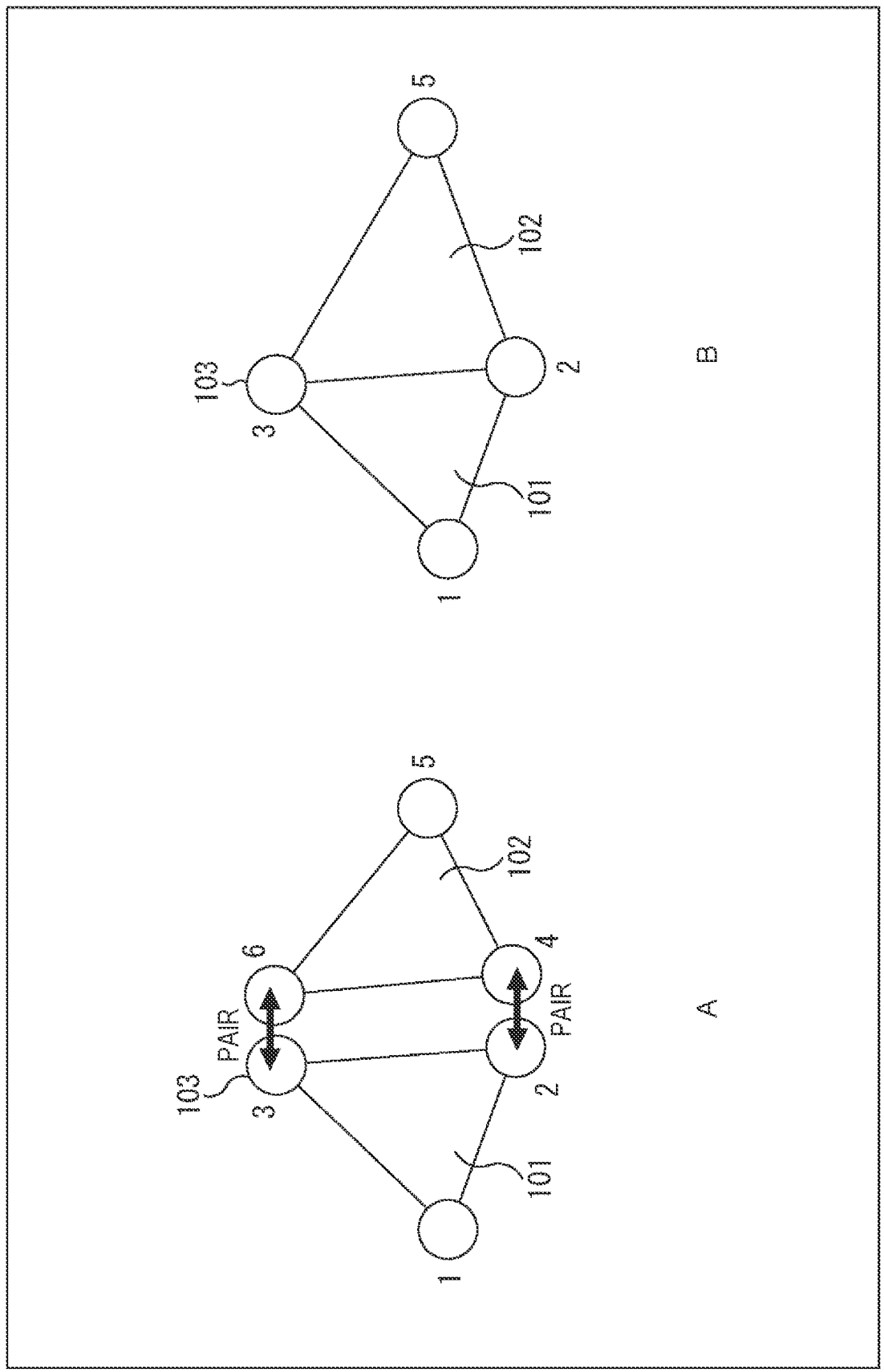

FIG. 10

| vertex index | #0 | #1 | #2 | #3 | #4 | #5 | #6 | #7 | #8 |
|---|---|---|---|---|---|---|---|---|---|
| UV COORDINATES | A(u00, v00)<br>B(u01, v01) | A(u10, v10)<br>B(u11, v11) | A(u20, v20)<br>B(u21, v21)<br>C(u22, v22) | B(u30, v30)<br>C(u31, v31) | A(u40, v40)<br>C(u41, v41) | A(u50, v50)<br>D(u51, v51) | A(u60, v60)<br>D(u61, v61) | A(u70, v70)<br>D(u71, v71) | A(u80, v80)<br>D(u81, v81) |

INFORMATION PROCESSING APPARATUS AND METHOD THEREOF

CROSS REFERENCE TO PRIOR APPLICATION

This application is a National Stage Patent Application of PCT International Patent Application No. PCT/JP2021/043204 (filed on Nov. 25, 2021) under 35 U.S.C. § 371, which claims priority to Japanese Patent Application No. 2021-105856 (filed on Jun. 25, 2021), which are all hereby incorporated by reference in their entirety.

TECHNICAL FIELD

The present disclosure relates to an information processing apparatus and a method, and more particularly, to an information processing apparatus and a method capable of suppressing a reduction in the quality of 3D data due to encoding and decoding.

BACKGROUND ART

Conventionally, mesh has been used as 3D data representing an object having a three-dimensional shape. As a mesh compression method, a method of compressing a mesh by extending video-based point cloud compression (VPCC) has been proposed (see, for example, Non-Patent Document 1).

However, in this method, the vertex of the patch boundary is distorted by encoding and decoding, so that a crack (tear) may occur in the object (3D data), leading to deterioration of appearance. Therefore, an algorithm called zippering has been proposed in which neighboring boundary vertices are searched in 3D and the crack is corrected by moving vertex coordinates (for example, see Non-Patent Document 2).

CITATION LIST

Non-Patent Document

Non-Patent Document 1: Danillo Graziosi, Alexandre Zaghetto, Ali Tabatabai, "[VPCC] [EE2.6-related] Mesh Patch Data", ISO/IEC JTC 1/SC 29/WG 7 m 55368, October 2020
Non-Patent Document 2: Danillo Graziosi, Alexandre Zaghetto, Ali Tabatabai, "[VPCC] [EE2.6-related] Mesh Geometry Smoothing Filter", ISO/IEC JTC 1/SC 29/WG 7 m 55374, October 2020

SUMMARY OF THE INVENTION

Problems to be Solved by the Invention

However, in the zippering, there is a possibility that the quality of the 3D data is reduced because the crack correction is not appropriately performed.

The present disclosure has been made in view of such a situation, and aims to suppress a reduction in the quality of 3D data due to encoding and decoding.

Solutions to Problems

An information processing apparatus according to one aspect of the present technology is an information processing apparatus including: a generation unit that divides a mesh representing an object having a three-dimensional structure into at least a first patch and a second patch and arranges the first patch and the second patch in a single image, and generates pair information indicating that at least one vertex of the first patch and at least one vertex of the second patch located at a same position as a position of the vertex of the first patch in the object before encoding are a pair; and an encoding unit that encodes the pair information.

An information processing method according to one aspect of the present technology is an information processing method including: dividing a mesh representing an object having a three-dimensional structure into at least a first patch and a second patch and arranging the first patch and the second patch in a single image, and generating pair information indicating that at least one vertex of the first patch and at least one vertex of the second patch located at a same position as a position of the vertex of the first patch in the object before encoding are a pair; and encoding the pair information generated.

An information processing apparatus according to another aspect of the present technology is an information processing apparatus including: a decoding unit that divides a mesh representing an object having a three-dimensional structure into at least a first patch and a second patch and arranges the first patch and the second patch in a single image, decodes encoded data of pair information indicating that at least one vertex of the first patch and at least one vertex of the second patch located at a same position as a position of the vertex of the first patch in the object before encoding are a pair, and obtains the pair information; and a correction unit that corrects the mesh reconstructed on the basis of the pair information.

An information processing method according to another aspect of the present technology is an information processing method including: dividing a mesh representing an object having a three-dimensional structure into at least a first patch and a second patch and arranging the first patch and the second patch in a single image, and decoding encoded data of pair information indicating that at least one vertex of the first patch and at least one vertex of the second patch located at a same position as a position of the vertex of the first patch in the object before encoding are a pair; and correcting the mesh reconstructed on the basis of the pair information obtained by decoding the encoded data.

In an information processing apparatus and the method according to one aspect of the present technology, a mesh representing an object having a three-dimensional structure is divided into at least a first patch and a second patch and arranged in a single image, pair information indicating a pair of at least one vertex of the first patch and at least one vertex of a second patch located at the same position as a position of the vertex of the first patch in the object before encoding is generated, and the generated pair information is encoded.

In an information processing apparatus and a method according to another aspect of the present technology, a mesh representing an object having a three-dimensional structure is divided into at least a first patch and a second patch and arranged in a single image, encoded data of pair information indicating that at least one vertex of the first patch and at least one vertex of the second patch located at the same position as a position of the vertex of the first patch in the object before encoding are paired is decoded, and a reconstructed mesh is corrected on the basis of pair information obtained by decoding the encoded data.

BRIEF DESCRIPTION OF DRAWINGS

FIG. 5 is a diagram for explaining transmission of pair information.

FIG. 6 is a diagram for explaining transmission of pair information.

FIG. 7 is a diagram for explaining pair information.

FIG. 10 is a diagram for explaining a content example of pair information.

MODE FOR CARRYING OUT THE INVENTION

Figure 1:
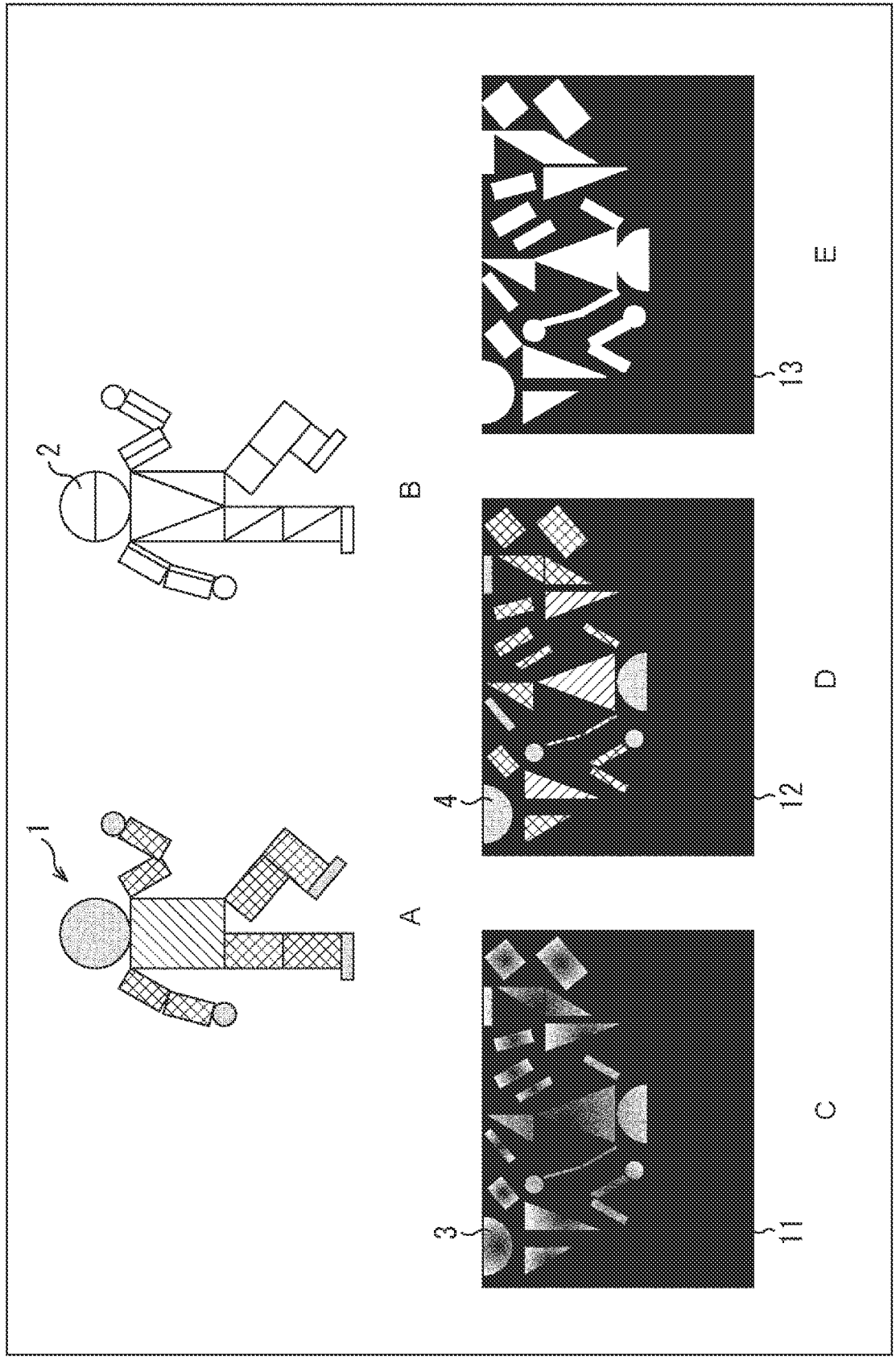
FIG. 1 is a diagram for explaining a video-based approach.

Hereinafter, modes for carrying out the present disclosure (hereinafter referred to as embodiments) will be described. Note that, the description will be given in the following order.

1. Mesh Compression in VPCC Extension
2. Transmission of Pair Information
3. First Embodiment (Encoding Device)
4. Second Embodiment (Decoding Device)
5. Derivation of Correct Coordinates
6. Pairing Processing in Two Dimensions
7. Third Embodiment (Encoding Device)
8. Fourth Embodiment (Decoding Device)
9. Appendix 1. Mesh Compression in VPCC Extension <Documents and the Like That Support Technical Contents and Technical Terms>

The scope disclosed in the present technology includes not only the content described in the embodiments but also the content described in the following Non-Patent Documents and the like that are known at the time of filing, content of other documents referred to in the following Non-Patent Documents, and the like.

Non-Patent Document 1: (described above)

Non-Patent Document 2: (described above)

Non-Patent Document 3: "Information technology—Coded Representation of Immersive Media—Part 5: Visual Volumetric Video-based Coding (V3C) and Video-based Point Cloud Compression (V-PCC)", ISO/IEC 23090-5:2020 (E), ISO/IEC JTC 1/SC 29/WG 11 w19579

That is, the contents described in the above-described Non-Patent Documents, the contents of other documents referred to in the above-described Non-Patent Documents, and the like are also basis for determining the support requirement.

<Point Cloud>

Conventionally, there has been 3D data such as a point cloud representing a three-dimensional structure by point position information, attribute information, and the like.

For example, in a case of a point cloud, a three-dimensional structure (three-dimensional shaped object) is expressed as a set of a large number of points. The point cloud includes position information (also referred to as geometry) and attribute information (also referred to as attribute) of each point. The attribute can include any information. For example, color information, reflectance information, normal line information, and the like of each point may be included in the attribute. As described above, the point cloud has a relatively simple data structure, and can express any three-dimensional structure with sufficient accuracy by using a sufficiently large number of points.

<VPCC>

Video-based point cloud compression (VPCC) is one of such point cloud encoding techniques, and encodes point cloud data, which is 3D data representing a three-dimensional structure, using a codec for two-dimensional images.

In the VPCC, the geometry and the attribute of a point cloud are each decomposed into small regions (also referred to as patches), and each patch is projected onto a projection plane that is a two-dimensional plane. For example, the geometry and the attribute are projected onto any of the six surfaces of the bounding box containing the object. The geometry and the attribute projected on the projection plane are also referred to as projection images. The patch projected on the projection plane is also referred to as a patch image.

For example, the geometry of a point cloud 1 illustrating an object having a three-dimensional structure illustrated in A of FIG. 1 is decomposed into patches 2 as illustrated in B of FIG. 1, and each patch is projected onto a projection plane. That is, a patch image (projection image for each patch) of geometry is generated. Each pixel value of the patch image of the geometry indicates a distance (depth value) from the projection plane to the point.

The attribute of the point cloud 1 is also decomposed into patches 2 similarly to the geometry, and each patch is projected onto the same projection plane as the geometry. That is, a patch image of the same size and same shape attribute as the patch image of the geometry is generated. Each pixel value of the patch image of the attribute indicates an attribute (color, normal vector, reflectance, and the like) of a point at the same position of the patch image of the corresponding geometry.

Then, each patch image thus generated is arranged in a frame image (also referred to as a video frame) of the video sequence. That is, each patch image on the projection plane is arranged on a predetermined two-dimensional plane.

For example, the frame image in which the patch images of the geometry are arranged is also referred to as a geometry video frame. Furthermore, this geometry video frame is also referred to as a geometry image, a geometry map, or the like. The geometry image 11 illustrated in C of FIG. 1 is a frame image (geometry video frame) in which the patch images 3 of the geometry are arranged. The patch images 3 correspond to the patches 2 in B of FIG. 1 (the patches 2 of the geometry are projected onto the projection plane).

In addition, the frame image in which the patch images of the attribute are arranged is also referred to as an attribute video frame. The attribute video frame is also referred to as an attribute image or an attribute map. The attribute image 12 illustrated in D of FIG. 1 is a frame image (attribute video frame) in which the patch images 4 of the attribute are arranged. The patch images 4 correspond to the patches 2 in B of FIG. 1 (the patches 2 of the attribute are projected on the projection plane).

Then, these video frames are encoded by an encoding method for a two-dimensional image, such as, for example, advanced video coding (AVC) or high efficiency video coding (HEVC). That is, point cloud data that is 3D data representing a three-dimensional structure can be encoded using a codec for a two-dimensional image. Generally, an encoder of 2D data is more widespread than an encoder of 3D data, and can be realized at low cost. That is, by applying the video-based approach as described above, an increase in cost can be suppressed.

Note that, in the case of such a video-based approach, an occupancy image (also referred to as an occupancy map) can also be used. The occupancy image is map information indicating the presence or absence of the projection image (patch image) for each N×N pixels of the geometry video frame and the attribute video frame. For example, an occupancy image indicates the region in the geometry image or the attribute image where the patch image exists (N×N pixels) with the value "1" and the region where the patch image does not exist (N×N pixels) with the value "0".

Such an occupancy image is encoded as data different from the geometry image and the attribute image and transmitted to the decoding side. Since the decoder can grasp whether or not the region is a region where the patch exists by referring to this occupancy map, it is possible to suppress the influence of noise and the like caused by encoding/decoding, and to reconstruct the point cloud more accurately. For example, even if the depth value changes due to encoding/decoding, the decoder can ignore the depth value of the region where no patch image exists (not process the depth value as the position information of the 3D data) by referring to the occupancy map.

For example, the occupancy image 13 as illustrated in E of FIG. 1 may be generated for the geometry image 11 in C of FIG. 1 or the attribute image 12 in D of FIG. 1. In the occupancy image 13, a white portion indicates the value "1" and a black portion indicates the value "0".

It should be noted that, similarly to the geometry video frame, the attribute video frame, and the like, this occupancy image can also be transmitted as a video frame. That is, similarly to the geometry and the attribute, encoding is performed by an encoding method for a two-dimensional image such as AVC or HEVC.

That is, in the case of the VPCC, the geometry and the attribute of the point cloud are projected onto the same projection plane and are arranged at the same position in the frame image. That is, the geometry and the attribute of each point are associated with each other by the position on the frame image.

<Mesh>

Figure 2:
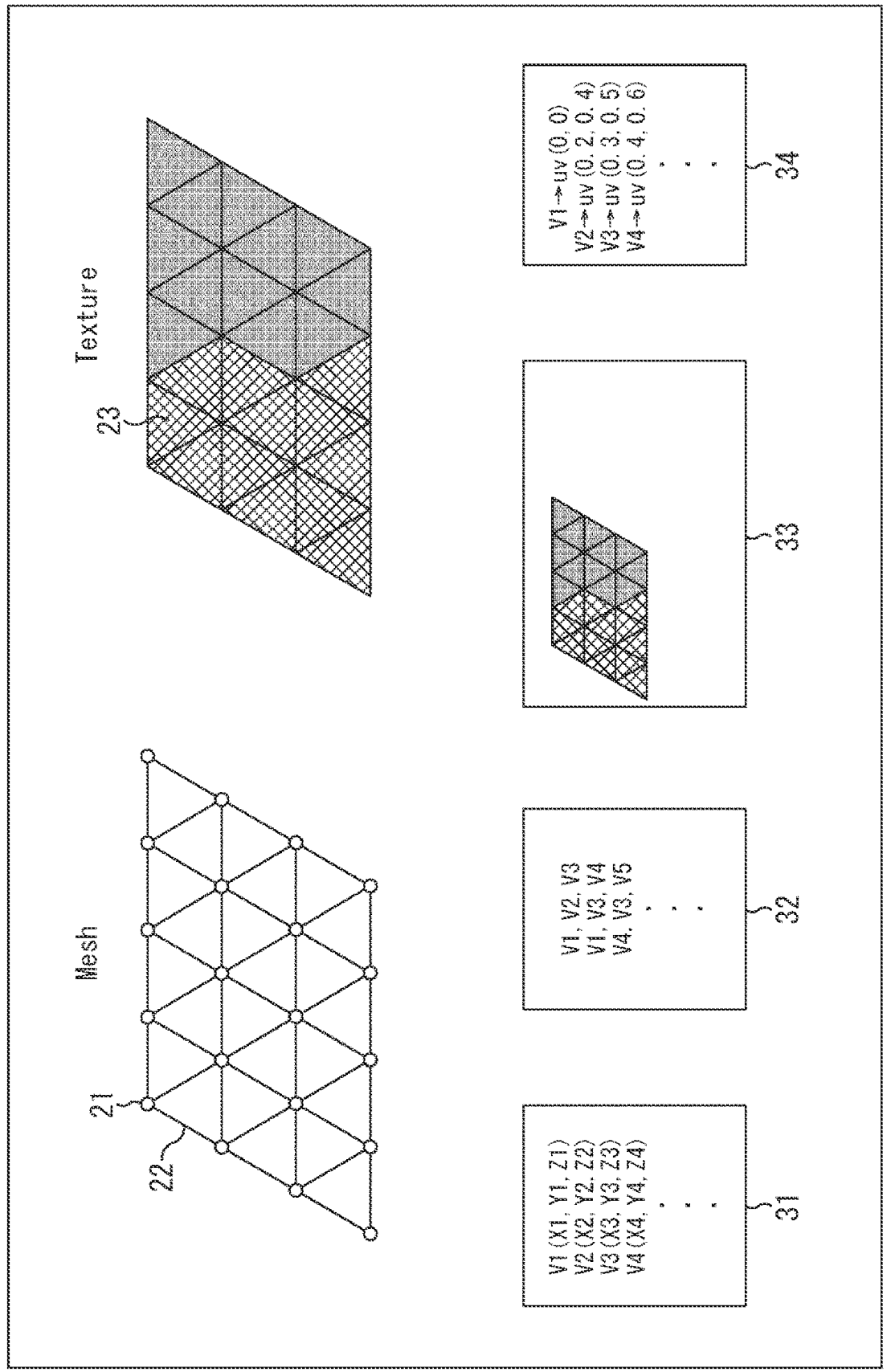
FIG. 2 is a diagram for explaining a mesh.

Meanwhile, as 3D data representing an object having a three-dimensional structure, for example, a mesh exists in addition to a point cloud. As illustrated in FIG. 2, the mesh represents the surface of the object in the three-dimensional space by a polygon that is a plane (polygon) surrounded by the sides 22 connecting the vertices 21. As illustrated in FIG. 2, the 3D data representing the object includes the mesh and the texture 23 attached to each polygon.

For example, as illustrated in the lower part of FIG. 2, the 3D data using the mesh includes vertex information 31 including position information (three-dimensional coordinates (X, Y, Z)) of each vertex 21, connectivity 32 indicating a vertex 21 and a side 22 constituting each polygon, a texture image 33 that is map information of a texture 23 attached to each polygon, and a UV map 34 indicating a position (that is, the position of each vertex 21 in the texture image 33) in the texture image 33 of the texture corresponding to each vertex 21. The UV map 34 indicates the position of each vertex by UV coordinates which are coordinates on the texture image 33.

In the case of 3D data using meshes, unlike the case of VPCC described above, the correspondence between each vertex 21 and the texture 23 is indicated by the UV map 34. Therefore, as in the example of FIG. 2, the texture image 33 is configured as map information independent of the vertex information 31 configured by the three-dimensional coordinates of each vertex. Therefore, in the texture image 33, the projection direction and resolution of the texture 23 of each polygon can be arbitrarily set.

<Mesh Compression Using VPCC>

As a method of compressing 3D data using such a mesh, for example, a method of compressing (encoding) 3D data using a mesh by extending the above-described VPCC has been proposed in Non-Patent Document 1 and the like.

However, in this method, the vertex of the patch boundary is distorted by encoding and decoding, so that a crack (tear) may occur in the object (3D data), leading to deterioration of appearance.

Figure 3:
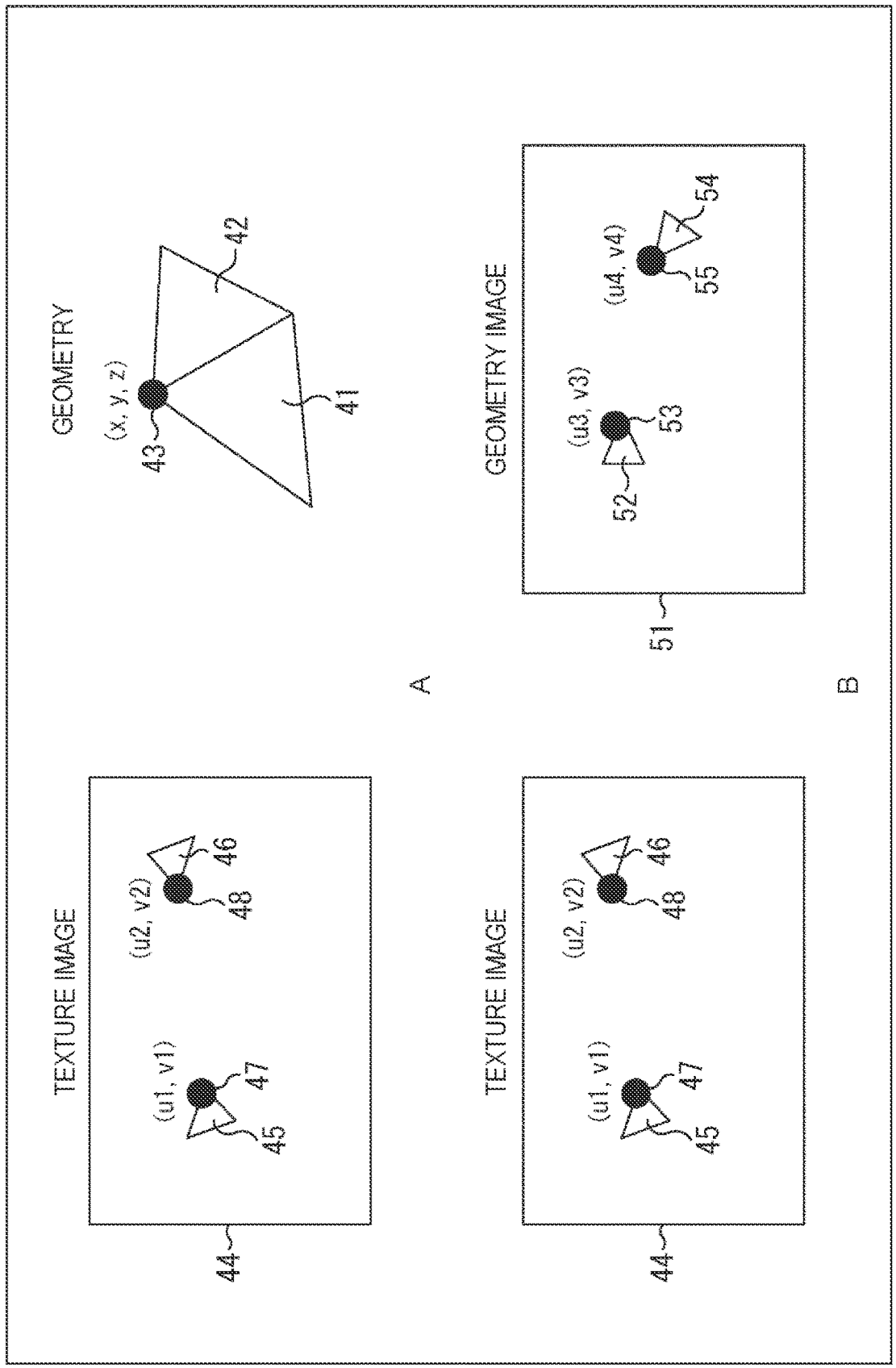
FIG. 3 is a diagram for explaining a difference in data configuration between a VPCC and a mesh.

In the mesh, as illustrated in A of FIG. 3, the geometry of the vertex (the position of the vertex) is indicated as non-image as vertex information. Therefore, for example, the vertex 43 shared by the polygon 41 and the polygon 42 is expressed as one point. On the other hand, the texture is arranged in the texture image 44. That is, the texture 45 attached to the polygon 41 and the texture 46 attached to the polygon 42 are independently arranged in the texture image 44. Therefore, for example, as in the example illustrated in A of FIG. 3, the texture 45 and the texture 46 can be arranged at positions away from each other. That is, in this case, the vertex 43 is expressed as two points of the vertex 47 and the vertex 48 in the texture image 44. However, since the geometry is expressed as one point as described above, the texture of the vertex 47 and the texture of the vertex 48 are pasted to the vertex 43 (the same position as each other) when reconstructing the mesh. Even if distortion occurs in the vertex 43 due to encoding, only the position of the vertex 43 is shifted, and the texture of the vertex 47 and the texture of the vertex 48 are pasted at the same position.

On the other hand, in the VPCC, as illustrated in B of FIG. 3, similarly to the case of the texture, the geometry is also expressed as the geometry image 51. That is, when the VPCC is extended and the 3D data using the mesh is compressed (encoded), the mesh representing the object having the three-dimensional structure is divided into at least the first patch and the second patch and arranged in a single image. Therefore, the polygon 41 is independently arranged as the polygon 52 and the polygon 42 is independently arranged as the polygon 54 in the geometry image 51. More precisely, each vertex constituting each polygon is arranged in the geometry image 51 to form a respective polygon. Therefore, for example, as in the example illustrated in B of FIG. 3, the polygon 52 and the polygon 54 can be arranged at positions separated from each other.

That is, the vertices shared by the plurality of polygons in the mesh are arranged as vertices constituting each polygon in the geometry image, and thus can be arranged as a plurality of points. For example, in the case of the example of B of FIG. 3, both the vertex 53 of the polygon 52 and the vertex 55 of the polygon 54 correspond to the vertex 43 (one vertex) of the mesh in the geometry image 51.

As described above, one vertex in the mesh can be expressed as a plurality of vertices in the geometry image. Furthermore, a plurality of vertices (also referred to as overlapping points) existing at the same position in the mesh may be arranged at different positions in the geometry image.

When coding distortion occurs (positional deviation occurs) in the geometry of such vertices, each vertex of the originally single geometry becomes a vertex at a position different from each other in reconstructing the mesh, and a crack (tear) may occur in the object (mesh). That is, the quality of the 3D data using the mesh may be reduced.

<Zippering>

Therefore, for example, an algorithm called zippering as described in Non-Patent Document 2 has been proposed. In zippering, neighboring boundary vertices are searched in 3D, and the vertex to be processed is moved and matched with the searched point (also referred to as matching). The crack is eliminated by correcting the vertex coordinates of the cracked portion in this way.

However, in the case of this method, when no match point is found in the set search range, matching between points is not performed. Therefore, the crack may not be eliminated by this method.

Figure 4:
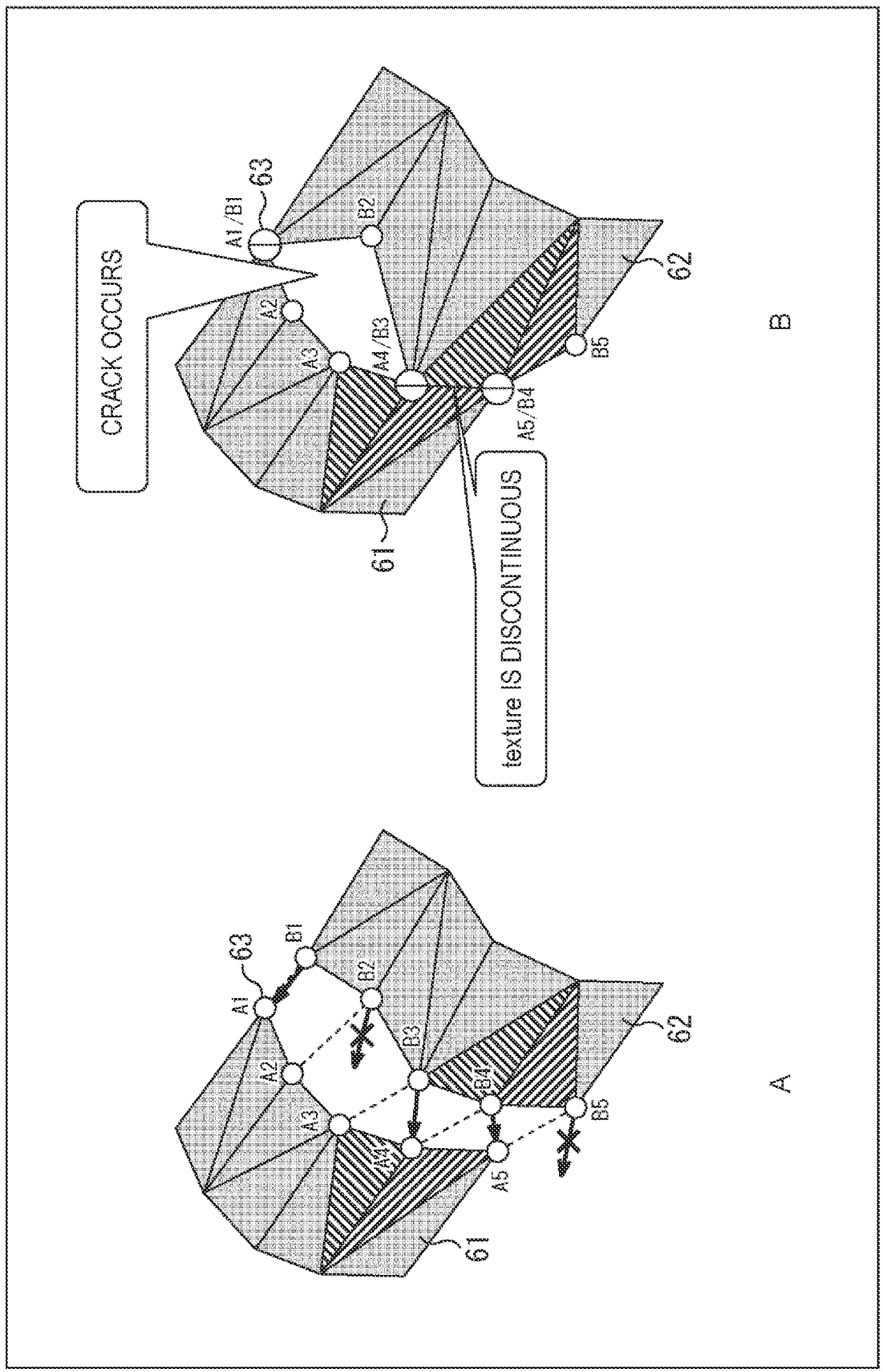
FIG. 4 is a diagram for explaining zippering.

For example, it is assumed that a crack occurs between the patch 61 and the patch 62 illustrated in A of FIG. 4. The vertex 63 indicated by a white circle in the drawing is a vertex on the boundary of the patch 61 or the patch 62. In FIG. 4, only one vertex is denoted by a reference sign. It is assumed that the boundary where the vertex 63 of the patch 61 is arranged and the boundary where the vertex 63 of the patch 62 is arranged are in contact with each other in the state before encoding. Then, it is assumed that the vertex A1 of the patch 61 and the vertex B1 of the patch 62 are one vertex in the state before encoding. Similarly, it is assumed that the vertex A2 and the vertex B2, the vertex A3 and the vertex B3, the vertex A4 and the vertex B4, the vertex A5 and the vertex B5 are each one vertex in a state before encoding.

Note that, in the present specification, the boundary of the patch indicates the boundary between the region included in the patch and the region not included in the patch. For example, a side (connection) of a polygon constituting the outer shape of the patch is referred to as a boundary.

For example, when the vertex 63 of the patch 61 corresponding to the vertex B2 is not found by the zippering search, the vertex B2 is not matched with other vertices. That is, the geometry of the vertex B2 is not corrected and remains as it is. Therefore, as illustrated in B of FIG. 4, there is a possibility that a crack is generated (the crack is not eliminated).

In addition, in the case of this method, there is a possibility of matching with an inappropriate point. In the zippering, since the corresponding points are searched in one direction (normal direction of the patch), there is a possibility that the corresponding points match points other than the points that were originally the same points.

For example, in the case of A of FIG. 4, the vertex B3 is matched to the vertex A4, and the vertex B4 is matched to the vertex A5. Therefore, as illustrated in B of FIG. 4, the texture of the patch 61 and the texture of the patch 62 might be discontinuous (that is, continuity of the texture existing in the state before encoding is lost).

As described above, when zippering is applied, there is a possibility that the quality of 3D data is reduced without appropriate crack correction.

In addition, since a search for a matching point is performed in the zippering, there is a possibility that a processing load increases.

2. Transmission of Pair Information

Therefore, pair information indicating a pair of vertices of a patch to be vertices at the same position when reconstructing the mesh is transmitted from the encoder to the decoder. That is, as illustrated at the top row of the table in FIG. 5, the pair information is transmitted (for example, the encoder generates and encodes the pair information, and the decoder decodes and uses the encoded data).

For example, in an information processing method, a generation unit of an information processing apparatus divides a mesh representing an object having a three-dimensional structure into at least a first patch and a second patch and arranges the patches in a single image, generates pair information indicating that at least one vertex of the first patch and at least one vertex of the second patch located at the same position as the position of the vertex of the first patch in the object before encoding are paired, and an encoding unit of the information processing apparatus encodes the pair information.

For example, an information processing apparatus includes: a generation unit that divides a mesh representing an object having a three-dimensional structure into at least a first patch and a second patch and arranges the patches in a single image, and generates pair information indicating that at least one vertex of the first patch and at least one vertex of the second patch located at the same position as the position of the vertex of the first patch in the object before encoding are paired; and an encoding unit that encodes the pair information.

For example, in an information processing method, a decoding unit of an information processing apparatus divides a mesh representing an object having a three-dimensional structure into at least a first patch and a second patch and arranges the patches in a single image, decodes encoded data of pair information indicating that at least one vertex of the first patch and at least one vertex of the second patch located at the same position as the position of the vertex of the first patch in the object before encoding are paired, and a correction unit of the information processing apparatus corrects a reconstructed mesh on the basis of pair information obtained by decoding the encoded data.

For example, an information processing apparatus includes: a decoding unit that divides a mesh representing an object having a three-dimensional structure into at least a first patch and a second patch and arranges the patches in a single image, decodes encoded data of pair information indicating that at least one vertex of the first patch and at least one vertex of the second patch located at the same position as the position of the vertex of the first patch in the object before encoding are paired, and obtains the pair information; and a correction unit that corrects a reconstructed mesh on the basis of the pair information.

For example, it is assumed that the polygon 101 and the polygon 102 illustrated in A of FIG. 7 are constituted by the vertex 103 indicated by a white circle. Note that, in A of FIG. 7 and B of FIG. 7, only one vertex is denoted by a reference sign. The number indicated in the vicinity of each vertex 103 is assumed to be identification information of each vertex 103.

In the state before encoding, it is assumed that the polygon 110 and the polygon 102 are in contact with each other. That is, in the state before encoding, it is assumed that the vertex 103 of identification information "3" and the vertex 103 of identification information "6" are one vertex 103, and the vertex 103 of identification information "2" and the vertex 103 of identification information "4" are one vertex. Since the polygon 101 and the polygon 102 are arranged independently of each other in the geometry image by extending the VPCC and encoding the mesh, identification information different from each other is assigned to each vertex 103 of each polygon.

In such a case, the encoder generates pair information expressing the vertex 103 of the identification information "3" and the vertex 103 of the identification information "6", and the vertex 103 of the identification information "2" and the vertex 103 of the identification information "4" as pairs. The decoder performs matching of the vertex 103 according to the pair information. That is, in the pair information, the decoder corrects the position of each vertex 103 in the reconstructed mesh so that vertices 103 that were one vertex 103 in the state before encoding are one vertex.

For example, as illustrated in B of FIG. 7, the decoder matches the vertex 103 of the identification information "3" with the vertex 103 of the identification information "6", and matches the vertex 103 of the identification information "2" with the vertex 103 of the identification information "4". As a result, the polygon 101 and the polygon 102 come into contact with each other (the same state as that before encoding is obtained). Therefore, the occurrence of cracks can be suppressed.

Since which vertices are matched is indicated by the pair information (transmitted from the encoder), the decoder can more reliably and more accurately match the vertices as compared with the case of zippering. That is, the crack can be more reliably eliminated, and matching with a more appropriate vertex can be performed (occurrence of discontinuity of texture can be suppressed). Therefore, a reduction in the quality of the 3D data due to encoding and decoding can be suppressed. In addition, since the search processing is unnecessary, an increase in processing load can be suppressed.

Note that, in the present specification, a "pair" refers to a "set" (which may also be expressed as a "pair" or a "group") including a plurality of vertices of a patch generated from a single vertex of a mesh. That is, the vertices constituting the pair correspond to the same vertex in the mesh. In other words, the "pair information" indicating this pair is information indicating a correspondence relationship between vertices of a plurality of patches (which vertex corresponds to which vertex). Note that the pair may include three or more vertices. That is, one vertex of the mesh may be divided into three or more patches.

Furthermore, processing of matching vertices on the basis of such pair information is also referred to as pairing processing.

Note that, in the above description, an example has been described in which one vertex in a mesh is divided into a plurality of patches, but each vertex constituting a pair may correspond to an "overlapping point" in the mesh. That is, a plurality of vertices at the same position in the mesh may be divided into different patches to form a pair.

Furthermore, in the above description, a pair has been described to be constituted by vertices, but may be constituted by "edges" instead of vertices. Adjacent polygons share not only vertices but also "sides" ("connections" connecting vertices). A "set" of consecutive sides or vertices shared by a pair of patches is also referred to as an "edge". That is, the pair may indicate a "set" including a plurality of edges. In other words, the pair information may be information indicating a correspondence relationship between edges of a plurality of patches.

<Generation of Pair Information>

Next, a manner of generating the pair information will be described. As illustrated in the third row from the top of the table illustrated in FIG. 5, vertices (or edges) divided when the mesh is divided into patches are paired. The process of dividing the mesh into patches is also referred to as patch segmentation. In patch segmentation, a patch is generated by connecting adjacent polygons (triangles) of a mesh. The information of the adjacent polygons is obtained from the connectivity. When adjacent polygons become patches different from each other, edges (vertices and sides) shared by the polygons are divided into a plurality of pieces (each vertex has a plurality of UV coordinates). The vertices located at each of the plurality of UV coordinates are paired.

Figure 8:
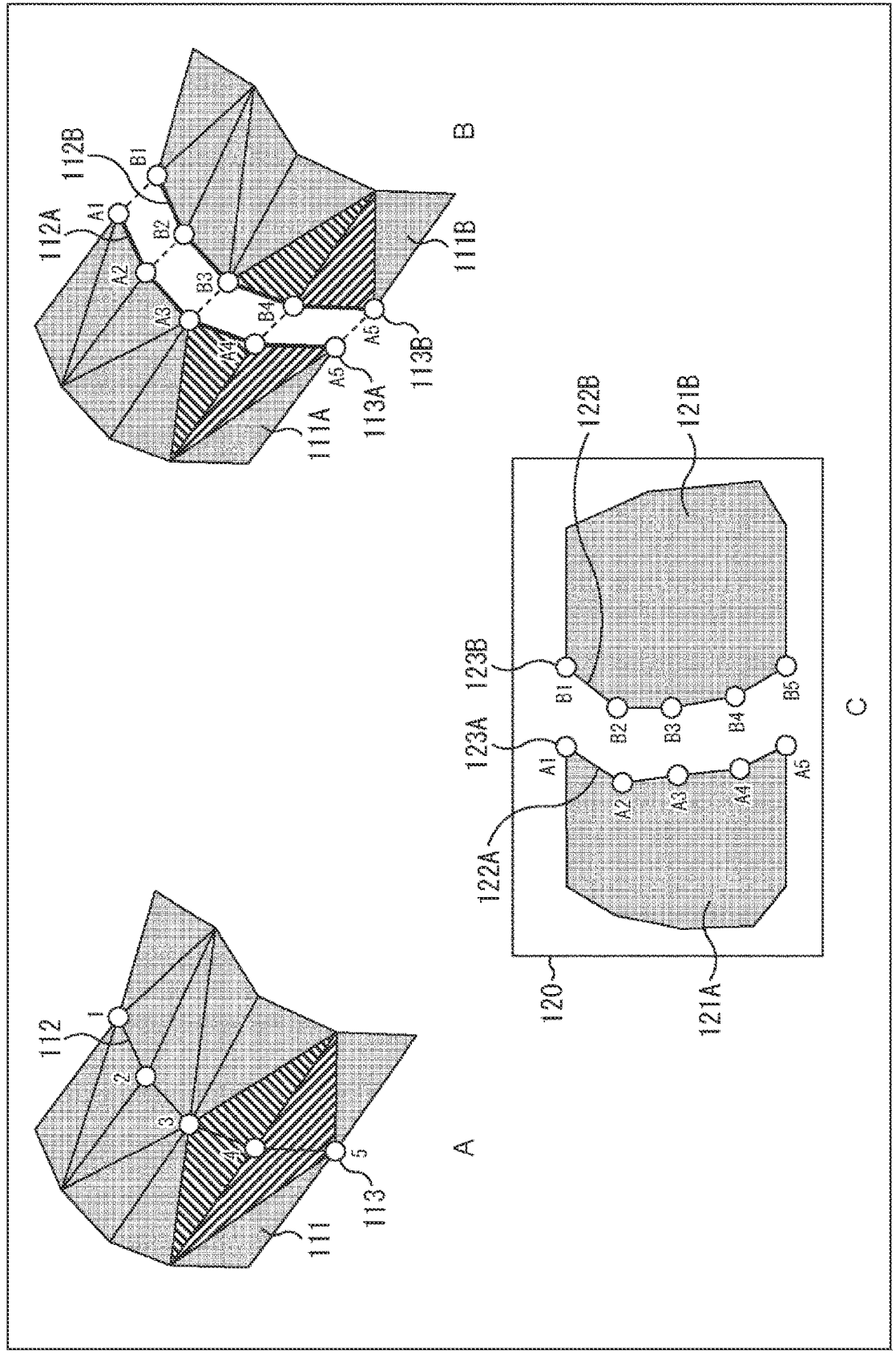
FIG. 8 is a diagram for explaining generation of pair information.

For example, in A of FIG. 8, it is assumed that white circles indicate vertices of the mesh 111. The vertex indicated by the white circle is referred to as a vertex 113. Note that, in A of FIG. 8, only one white circle is denoted by a reference sign, but all the white circles are vertices 113. In addition, numbers in the vicinity of each vertex 113 schematically represent identification information assigned to each vertex 113. That is, identification information "1" to identification information "5" are assigned to each of the five vertices 113. In addition, a connection (side of polygon) connecting the vertices 113 is referred to as a side 112. Note that, in A of FIG. 8, only one connection is denoted by a reference sign, but all connections connecting the vertices 113 are sides 112. Note that, other vertices are not illustrated.

It is assumed that the mesh 111 is divided by a side 112 as illustrated in B of FIG. 8 by patch segmentation and divided into a patch 111A and a patch 111B. With this processing, each of the side 112 and the vertex 113 is divided into two. The vertex 113 divided on the patch 111A side in this manner is referred to as a vertex 113A. In addition, the vertex 113 divided on the patch 111B side is referred to as a vertex 113B. Note that, in B of FIG. 8, only one of the white circles of the patch 111A is denoted by a reference sign, but all the white circles of the patch 111A are vertices 113A. Similarly, only one of the white circles of the patch 111B is denoted by a reference sign, but all the white circles of the patch 111B are vertices 113B.

That is, the vertex 113 of identification information "1" is divided into the vertex 113A of identification information "A1" and the vertex 113B of identification information "B1". Similarly, the vertex 113 of identification information "2" is divided into the vertex 113A of identification information "A2" and the vertex 113B of identification information "B2". The vertex 113 of identification information "3" is divided into the vertex 113A of identification information "A3" and the vertex 113B of identification information "B3". The vertex 113 of identification information "4" is divided into the vertex 113A of identification information "A4" and the vertex 113B of identification information "B4". The vertex 113 of identification information "5" is divided into the vertex 113A of identification information "A5" and the vertex 113B of identification information "B5".

Similarly, the side 112 divided on the patch 111A side is referred to as a side 112A. In addition, the side 112 divided on the patch 111B side is referred to as a side 112B. In B of FIG. 8, only one of the connections connecting the vertices 113A of the patch 111A is denoted by a reference sign, but all the connections connecting the vertices 113A are sides 112A. Similarly, only one of the connections connecting the vertices 113B of the patch 111B is denoted by a reference sign, but all the connections connecting the vertices 113B are sides 112B.

That is, an edge constituted by the vertex 113A and the side 112A and an edge constituted by the vertex 113B and the side 112B indicate an edge shared by the patch 111A and the patch 111B.

The patch is projected onto a two-dimensional plane, and the projection image (also referred to as a patch image) is arranged in the geometry image. C of FIG. 8 illustrates an example of the arrangement. In the geometry image 120 illustrated in C of FIG. 8, a patch image 121A indicates a projection image of the patch 111A. In addition, a patch image 121B indicates a projection image of the patch 111B.

A vertex 123A indicated by a white circle indicates a vertex of the patch image 121A. Similarly, a vertex 123B indicated by a white circle indicates a vertex of the patch image 121B. The vertex 123A is a vertex corresponding to the vertex 113A (vertex 113A projected), and the vertex 123B is a vertex corresponding to the vertex 113B (vertex 113B projected). Note that, in C of FIG. 8, only one of the white circles of the patch image 121A is denoted by a reference sign, but all the white circles of the patch image 121A are vertices 123A. Similarly, only one of the white circles of the patch image 121B is denoted by a reference sign, but all the white circles of the patch image 121B are vertices 123B.

That is, the vertex 123A of identification information "A1" and the vertex 123B of identification information "B1" constitute one pair. Similarly, the vertex 123A of identification information "A2" and the vertex 123B of identification information "B2" constitute one pair. The vertex 123A of identification information "A3" and the vertex 123B of identification information "B3" constitute one pair. The vertex 123A of identification information "A4" and the vertex 123B of identification information "B4" constitute one pair. The vertex 123A of identification information "A5" and the vertex 123B of identification information "B5" constitute one pair.

In addition, a connection connecting the vertices 123A is referred to as a side 122A. The side 122A is a side corresponding to the side 112A (a side on which the side 112A is projected), and constitutes a boundary of the patch image 121A. Similarly, a connection connecting the vertices 123B is referred to as a side 122B. The side 122B is a side corresponding to the side 112B (a side on which the side 112A is projected), and constitutes a boundary of the patch image 121B. In C of FIG. 8, only one of the connections connecting the vertices 123A of the patch image 121A is denoted by a reference sign, but all the connections connecting the vertices 123A are sides 122A. Similarly, only one of the connections connecting the vertices 123B of the patch image 121B is denoted by a reference sign, but all the connections connecting the vertices 123B are sides 122B.

That is, an edge constituted by the vertex 123A and the side 122A and an edge constituted by the vertex 123B and the side 122B indicate an edge shared by the patch image 121A and the patch image 121B. That is, an edge constituted by the vertex 123A and the side 122A and an edge constituted by the vertex 123B and the side 122B constitute one pair.

The encoder generates pair information indicating such a pair generated by patch segmentation.

<Pair Information Unit>

Next, the pair information generated as described above will be described. For example, as illustrated in the fifth row from the top of the table illustrated in FIG. 5, the pair information may indicate only a pair constituted by vertices included in the pair information. In other words, the pair information may be information indicating all pairs obtained by performing patch segmentation on the mesh.

Furthermore, the pair information may also be information indicating a pair constituted by vertices not indicated by the pair information, for example, as illustrated in the sixth row from the top of the table illustrated in FIG. 5. In other words, the pair information is information formed for each group of vertices, and may be information indicating all pairs constituted by vertices of the group by indicating a pair constituted by some vertices of the group.

<Pair Information for Each Pair (All Pairs)>

First, a case where the pair information indicates only a pair constituted by vertices included in the pair information will be described.

<Transmission Order of Pair>

The transmission order of each pair in the pair information will be described. That is, the order in which the pairs are indicated in the pair information will be described.

Figure 9:
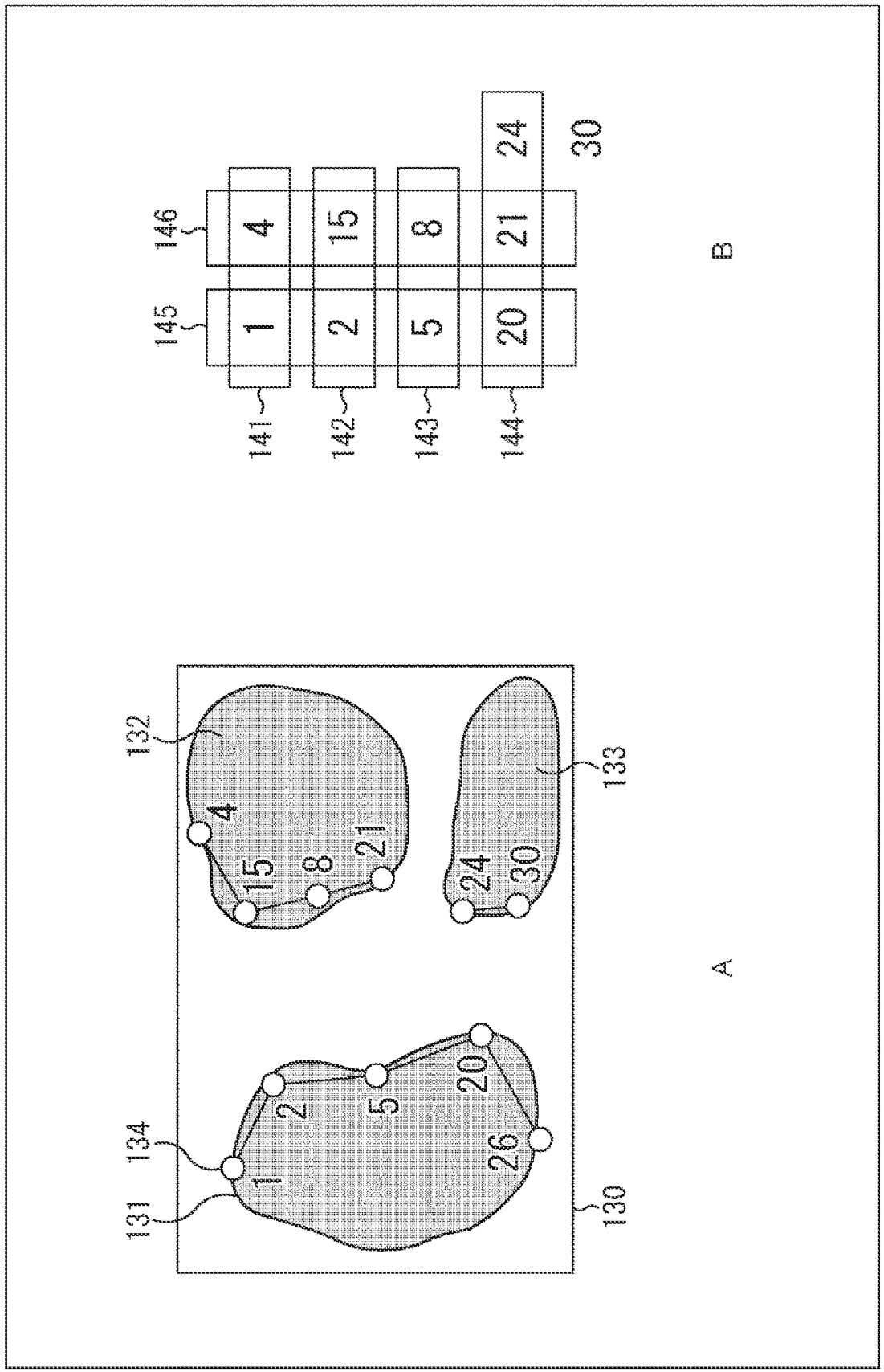
FIG. 9 is a diagram for explaining an example of a transmission order.

For example, as illustrated in A of FIG. 9, it is assumed that a patch image 131, a patch image 132, and a patch image 133 are arranged in a geometry image 130. The patch image 131, the patch image 132, and the patch image 133 have vertices 134 indicated by white circles on their respective boundaries. In A of FIG. 9, only one vertex is denoted by a reference sign, but all vertices indicated by white circles are vertices 134. A number indicated in the vicinity of each vertex indicates identification information of each vertex.

B of FIG. 9 uses the identification information assigned to the vertex 134. A pair constituted by vertices 134 is illustrated. In B of FIG. 9, quadrangular frames 141 to 144 indicate pairs constituted by vertices 134. That is, the vertex 134 to which the identification information "1" is assigned and the vertex 134 to which the identification information "4" is assigned constitute a pair. In addition, the vertex 134 to which the identification information "2" is assigned and the vertex 134 to which the identification information "15" is assigned constitute a pair. Further, the vertex 134 to which the identification information "5" is assigned and the vertex 134 to which the identification information "8" is assigned constitute a pair. In addition, the vertex 134 to which the identification information "20" is assigned, the vertex 134 to which the identification information "21" is assigned, and the vertex 134 to which the identification information "24" is assigned constitute a pair.

For example, as the pair information about the pair having such a configuration is illustrated in the 11th row from the top of the table illustrated in FIG. 5, the vertices constituting the pair may be indicated one by one (for each pair). That is, the pair information may indicate that the plurality of vertices of the first patch and the corresponding plurality of vertices of the second patch are each a pair. For example, in a case where the number of vertices constituting a pair is known in advance to the decoder, such as a case where the number of vertices constituting a pair is limited to two, an array of identification information of vertices arranged for each pair may be indicated in the pair information. The decoder that has acquired the pair information can easily grasp each vertex constituting each pair by dividing the array of the identification information of the vertex for each number of vertices constituting the pair.

Note that the pair information may include a parameter indicating the number of vertices constituting a pair, for example, as illustrated in the 12th row from the top of the table illustrated in FIG. 5. If the number of vertices constituting each pair is indicated, the decoder can easily grasp each vertex constituting each pair by dividing the array of the identification information of the vertices included in the pair information by the number of vertices indicated by the parameter. That is, in this case, the number of vertices constituting each pair may not be grasped in advance by the decoder. Note that the number of parameters transmitted as the pair information is arbitrary. For example, in the pair information, the value of this parameter may be indicated for each pair, may be indicated for each of a predetermined number of pairs of two or more, or may be indicated for all pairs. In other words, the number of vertices constituting the pair may be variable. That is, the number of vertices constituting the pair may not be common to all the pairs.

Furthermore, instead of including the parameter indicating the number of vertices constituting a pair in the pair information, a flag indicating a pair division (for example, a 1-bit flag "0" or the like) may be inserted into the array of vertex identification information included in the pair information. This flag is information known in advance for the decoder. The decoder that has acquired the pair information can easily grasp which vertices constitute the pair by detecting the flag from the array of the identification information of the vertices. That is, also in this case, the decoder may not grasp the number of vertices constituting each pair in advance. In addition, the number of vertices constituting the pair may be variable.

Furthermore, the pair information may include information indicating a group including a plurality of vertices of the first patch and a group including a plurality of vertices of the second patch. For example, as illustrated in the 13th row from the top of the table illustrated in FIG. 5, a list in which vertices constituting pairs are collected for each patch may be generated, and the pair information may indicate pairs of the list. In the case of the example in B of FIG. 9, vertices 134 of the patch image 131 indicated by a quadrangular frame 145 and vertices 134 of the patch image 132 indicated by a quadrangular frame 146 may be listed, and a correspondence relationship between the lists may be indicated in the pair information.

For example, in the pair information, identification information of vertices may be arranged for each group, and an array in which the groups are arranged for each pair may be indicated. In this case, the group division position in the array of the identification information of the vertices may be indicated by a parameter indicating the number of vertices constituting the group. The value of this parameter may be indicated for each group, may be indicated for each of a predetermined number of two or more groups, or may be indicated for all groups. In other words, the number of vertices constituting the group may be variable. That is, the number of vertices constituting the group may not be common to all pairs.

Furthermore, the group division position in the array of vertex identification information may be indicated by inserting a flag indicating the group division (for example, a 1-bit flag "0" or the like). This flag is information known in advance for the decoder. The decoder that has acquired the pair information can easily grasp which vertices constitute the group by detecting the flag from the array of the identification information of the vertices. That is, also in this case, the decoder may not grasp the number of vertices constituting each group in advance. In addition, the number of vertices constituting the group may be variable.

In this manner, by enclosing the identification information of the vertices constituting the pair with parentheses or curly brackets, each vertex constituting each pair can be clearly indicated for each group. Therefore, the decoder can more easily grasp each vertex constituting each pair on the basis of the pair information.

<Contents of Pair Information>

In the pair information, information indicating vertices (or edges) constituting the pair is arbitrary.

<ID>

For example, as illustrated in the 15th row from the top of the table illustrated in FIG. 5, the pair information may indicate a pair by using identification information corresponding to each state of vertices in the object before encoding. The identification information may be any information.

For example, as illustrated in the 16th row from the top of the table illustrated in FIG. 5, the identification information may be identification information (all vertex IDs) for identifying each vertex among vertices included in the mesh. In other words, the identification information may be information assigned to all vertices included in the mesh.

For example, as illustrated in the 17th row from the top of the table illustrated in FIG. 5, the identification information may be identification information (in-patch vertex ID) for identifying each vertex among vertices included in the patch. In other words, the identification information may be information independently assigned to each vertex for each patch.

In that case, the pair information may further include identification information (patch ID) of the patch as illustrated in the 18th row from the top of the table illustrated in FIG. 5. The decoder can identify each vertex among the vertices included in the mesh by combining the patch ID and the in-patch vertex ID.

In this case, the patch ID may be transmitted for each pair as illustrated in the 19th row from the top of the table illustrated in FIG. 5. That is, the pair information may include patch identification information for each pair. That is, in this case, the patch ID is transmitted for each vertex constituting each pair. Thus, for each vertex constituting each pair, it is indicated which patch the vertex belongs to.

In addition, as illustrated in the 20th row from the top of the table illustrated in FIG. 5, the patch ID may be transmitted for each of a plurality of pairs. That is, the pair information may include patch identification information for each of a plurality of pairs. That is, in this case, the patch ID is transmitted for each vertex constituting some pairs. For the vertex of the patch to which the patch ID is not transmitted, for example, the patch ID (latest patch ID) transmitted immediately before may be applied. For example, the patch ID may be transmitted only when the applied patch ID changes, and the transmission of the patch ID may be omitted for a pair to which the same patch ID as the previous pair is applied. By doing so, an increase in the code amount can be suppressed, and an increase in the encoding efficiency can be suppressed.

Furthermore, as illustrated in the 21st row from the top of the table illustrated in FIG. 5, the identification information may be identification information for identifying each vertex among vertices located at the boundary of the patch (boundary vertex list ID). In other words, this identification information may be information assigned to each vertex located at the boundary of the patch.

In that case, the encoding unit may further encode a list of vertices located at the boundary of the patch (boundary vertex list) as illustrated in the 22nd row from the top of the table illustrated in FIG. 5. The decoder can easily identify a vertex among each vertex located at the boundary of the patch by referring to the boundary vertex list.

Note that, as illustrated in the 23rd row from the top of the table illustrated in FIG. 5, the pair information may indicate a pair using an absolute value of the identification information. By expressing the pair in this manner, the decoder can more easily grasp the identification information of each vertex constituting the pair.

Furthermore, as illustrated at the bottom row of the table illustrated in FIG. 5, the pair information may indicate a pair by using a relative value of the identification information from the identification information of another vertex. By expressing the pair in this manner, the information amount (code amount) of the pair information can be reduced as compared with the case of indicating the pair using the identification information of each vertex constituting the pair. That is, a reduction in the encoding efficiency of the pair information can be suppressed.

<UV Coordinates>

Furthermore, for example, as illustrated at the top row of the table illustrated in FIG. 6, the pair information may indicate a pair on the basis of each coordinate of a plurality of vertices in the two-dimensional plane of the image instead of the identification information described above.

In this case, as illustrated in the second row from the top of the table illustrated in FIG. 6, the pair information may indicate a pair using UV coordinates of each vertex constituting the pair.

For example, it is assumed that the patches A to D have vertices #0 to #8 of UV coordinates as illustrated in the table of FIG. 10, respectively. A to D indicate patch IDs, and #0 to #8 indicate in-patch IDs. For example, the UV coordinates of the vertex #0 of the patch A are (u00, v00), and the UV coordinates of the vertex #1 of the patch A are (u10, v10). In addition, the UV coordinates of the vertex #0 of the patch B are (u01, v01), and the UV coordinates of the vertex #1 of the patch B are (u11, v11). It is assumed that the vertex #0 of the patch A and the vertex #0 of the patch B constitute a pair. In addition, it is assumed that the vertex #1 of the patch A and the vertex #1 of the patch B constitute a pair.

In the pair coordinates, the pair constituted by these vertices may be indicated as (u00, v00), (u01, v01), and the like using the respective UV coordinates. By expressing the pair in this manner, the decoder can more easily grasp the UV coordinates of each vertex constituting the pair.

Furthermore, as illustrated in the third row from the top of the table illustrated in FIG. 6, the pair information may indicate a pair using a difference in UV coordinates (relative coordinates (du, dv)). For example, the pair information may indicate a pair using the UV coordinates (u, v) of the reference vertex, which is one of the vertices constituting the pair, and the difference (relative coordinates (du, dv)) of the UV coordinates, such as (u, v) and (du, dv). By expressing the pair in this manner, the information amount (code amount) of the pair information can be reduced as compared with the case of indicating the pair using the UV coordinates of each vertex constituting the pair. That is, a reduction in the encoding efficiency of the pair information can be suppressed.

For example, as illustrated in the fourth row from the top of the table illustrated in FIG. 6, the pair information may indicate relative coordinates of a vertex different from the reference vertex with reference to the coordinates of the reference vertex among the plurality of vertices.

Figure 11:
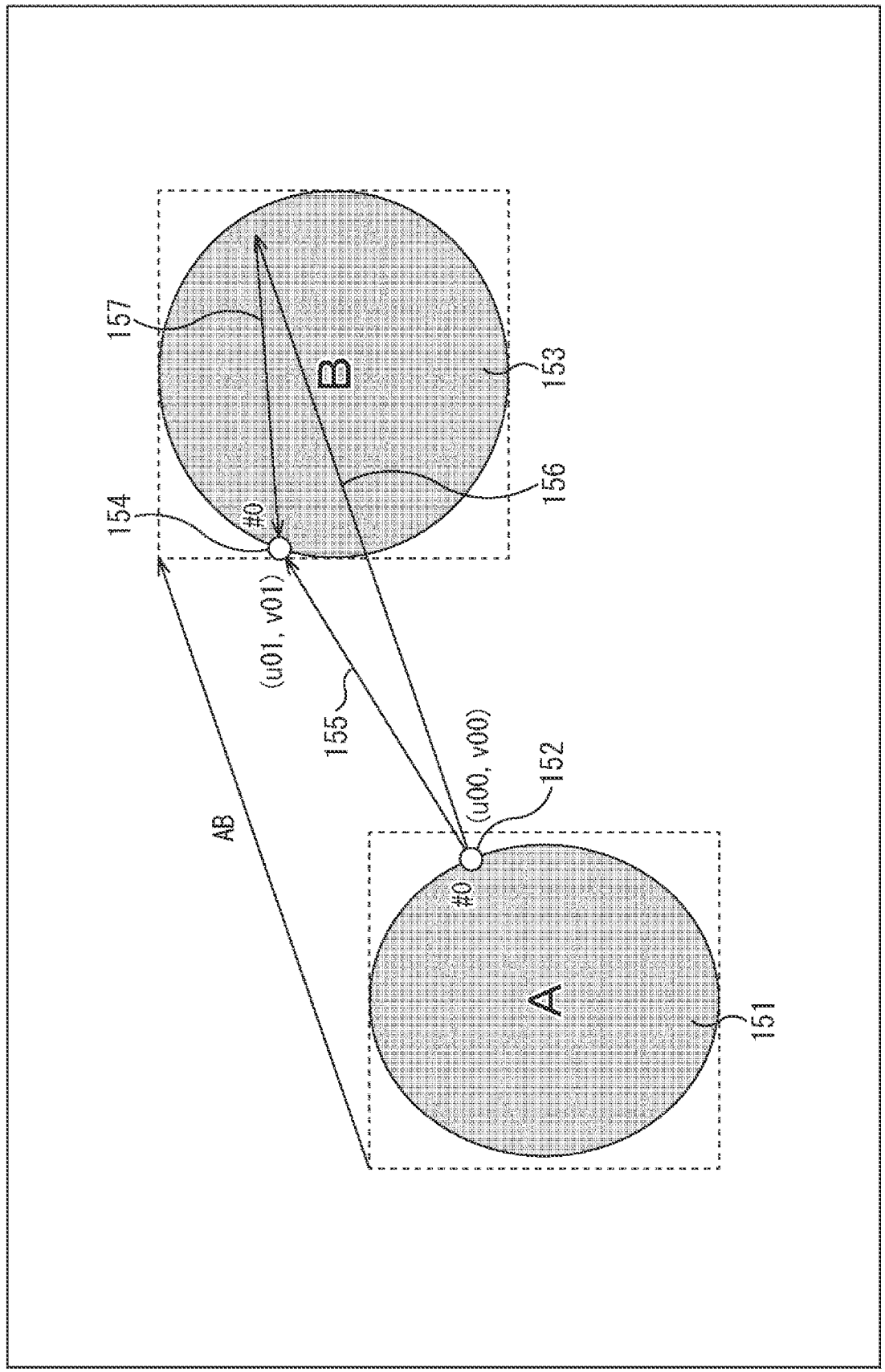
FIG. 11 is a diagram for explaining a content example of pair information.

For example, it is assumed that patches and vertices illustrated in FIG. 10 are arranged in a geometry image as illustrated in FIG. 11. That is, it is assumed that the patch image 151 of the patch A and the patch image 153 of the patch B are arranged in the geometry image as illustrated in FIG. 11. Then, it is assumed that the vertex #0 of the patch A is arranged at the position of the white circle 152 and the vertex #0 of the patch B is arranged at the position of the white circle 154. In addition, a relative position of the patch B with the patch A as a reference (relative vector between patches) is defined as a vector AB.

In this case, the vertex #0 of the patch A may be set as a reference vertex, and (u, v) may be set as the coordinates (u00, v00) of the white circle 152. That is, (u, v)=(u00, v00) may be satisfied. Further, the relative coordinates of the vertex #0 of the patch B viewed from the vertex #0 of the patch A, that is, the vector 155 may be set as (du, dv). That is, (du, dv)=(u01-u00, v01-v00) may be satisfied.

Furthermore, for example, as illustrated in the fifth row from the top of the table illustrated in FIG. 6, the pair information may indicate relative coordinates of a vertex different from the reference vertex with reference to the position of the relative vector between the first patch and the second patch with reference to the coordinates of the reference vertex among the plurality of vertices.

For example, in FIG. 11, the vertex #0 of the patch A may be set as a reference vertex, and (u, v) may be set as the coordinates (u00, v00) of the white circle 152. That is, (u, v)=(u00, v00) may be satisfied. In addition, the vector AB is used to move to a position when the vertex #0 of the patch A is set as a vertex of the patch B. That is, the vertex #0 of the patch A is moved from (u00, v00) as indicated by the vector 156. Then, the relative coordinates of the vertex #0 of the patch B viewed from the position after the movement (the tip of the vector 156), that is, the vector 157 may be set as (du, dv). That is, (du, dv) may be expressed as an addition result of the vector AB (that is, the vector 156) and the vector 157 instead of using the vector 155.

Meanwhile, when the patch is arranged in the geometry image, the posture of the patch may be corrected. A method of correcting the posture of the patch is arbitrary. For example, the patch may be vertically inverted, horizontally inverted, or rotated by a predetermined angle.

Figure 12:
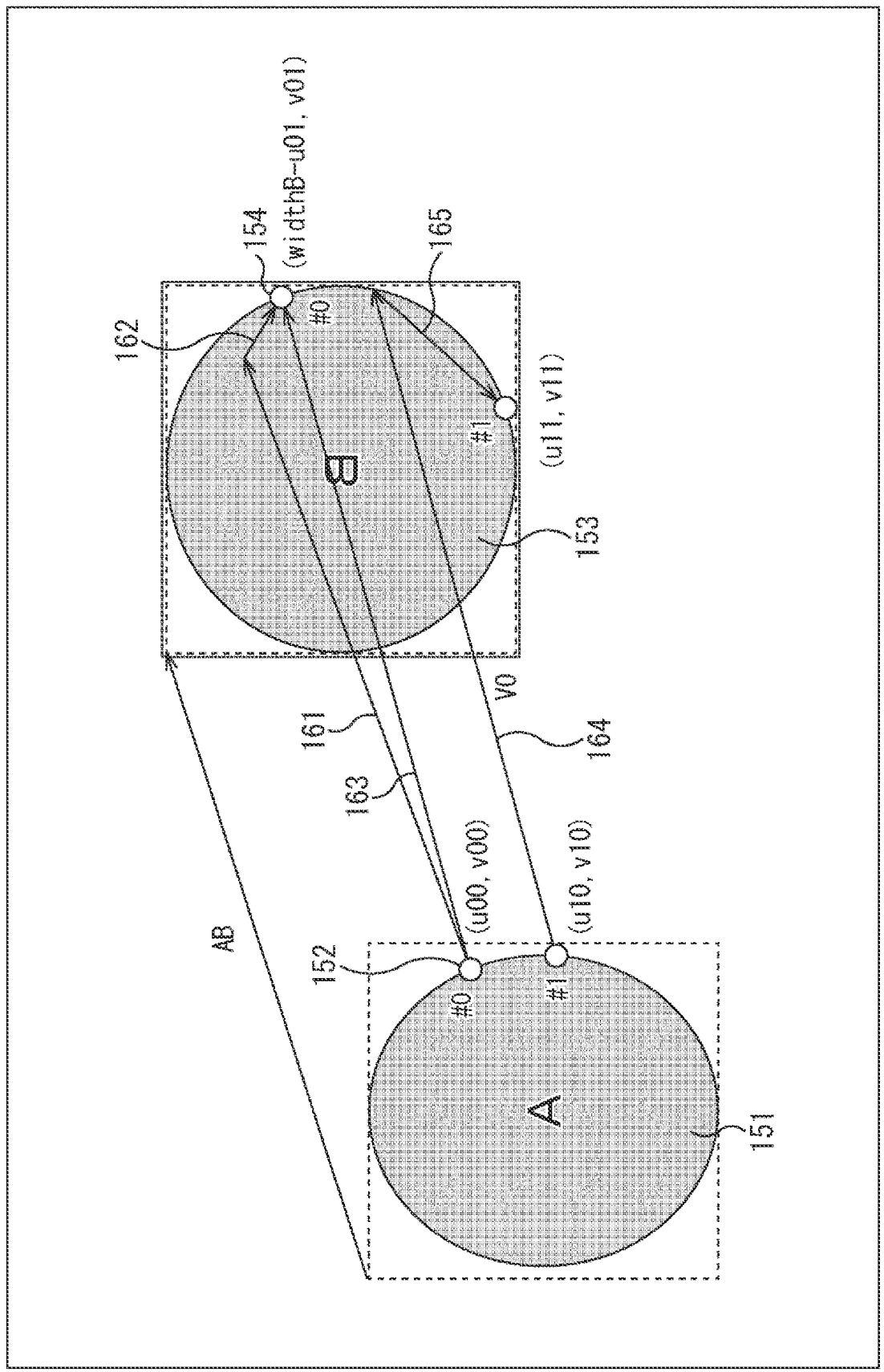
FIG. 12 is a diagram for explaining a content example of pair information.

Such posture correction is performed such that absolute values of du and dv are reduced. For example, the posture of the patch B may be corrected so that the position of the vertex #0 of the patch B approaches the position of the vertex A of the patch A. In the example of FIG. 12, the patch B is horizontally reversed and arranged. Therefore, the UV coordinates of the vertex #0 of the patch B are (widthB-u01, v01). The widthB indicates the width (the length in the horizontal direction in the drawing) of the patch B.

For example, when the vertex #0 of the patch A is set as the reference vertex, and the relative coordinates of the vertex #0 of the patch B viewed from the vertex #0 of the patch A is set as (du, dv), the posture of the patch B is corrected, so that (du, dv) becomes the vector 163. That is, (du, dv)=(widthB-u01-u00, v01-v00). Since the length of the vector 163 is shorter than that of the vector 155, a reduction in the encoding efficiency of the pair information can be further suppressed.

Furthermore, for example, as illustrated in the sixth row from the top of the table illustrated in FIG. 6, the pair information may indicate relative coordinates of a vertex different from the reference vertex in the second patch in a state in which the posture is corrected with reference to a position of a relative vector between the first patch and the second patch with reference to coordinates of the reference vertex among the plurality of vertices.

For example, in FIG. 12, the vertex #0 of the patch A is moved from (u00, v00) as indicated by the vector 161 using the vector AB. Then, the relative coordinates of the vertex #0 of the patch B viewed from the position after the movement (the tip of the vector 161), that is, the vector 162 may be set as (du, dv). That is, (du, dv) may be expressed as an addition result of the vector AB (that is, the vector 161) and the vector 162 instead of using the vector 163.

Furthermore, for example, as illustrated in the seventh row from the top of the table illustrated in FIG. 6, the pair information may indicate relative coordinates of a vertex different from the reference vertex of the processing target pair with reference to relative coordinates of a vertex different from the reference vertex with reference to the coordinates of the reference vertex among the plurality of vertices of another pair.

For example, it is assumed that the vertex #1 of the patch A and the vertex #1 of the patch B constituting the pair are arranged as illustrated in FIG. 12. This pair is a pair different from the pair constituted by the vertex #0 of the patch A and the vertex #0 of the patch B described above.

When a pair constituted by the vertex #1 of the patch A and the vertex #1 of the patch B is expressed, information of the pair constituted by the vertex #0 of the patch A and the vertex #0 of the patch B may be used. For example, the vertex #1 of the patch A is set as a reference vertex, and (u, v)=(u10, v10) is set. Then, the vertex #0 of the patch A is moved using the vector 163 connecting the vertex #0 of the patch A and the vertex #0 of the patch B. That is, the position of the vertex #1 of the patch A is moved according to the positional relationship between the vertex #0 of the patch A and the vertex #0 of the patch B. As a result, the vertex #1 of the patch A moves like the vector 164. Then, the relative coordinates of the vertex #0 of the patch B viewed from the position of the vertex #1 of the patch A moved in this way (the tip of the vector 164), that is, the position of the vertex #1 of the patch A reflecting the positional relationship between the vertex #0 of the patch A and the vertex #0 of the patch B, that is, the vector 165 may be set as (du, dv). That is, (du, dv) may be expressed as an addition result of the vector 164 and the vector 165.

Note that although the posture of the patch B is corrected in the example of FIG. 12, this method can be applied even if the posture of the patch B is not corrected as in the example of FIG. 11.

<Each Pair Group (Partial Pair)>

From <Pair Information for Each Pair (All Pairs)> to here, the case where the pair information indicates only pairs constituted by vertices included in the pair information has been described. Hereinafter, a case where the pair information also indicates pairs constituted by vertices not indicated by the pair information will be described.

In this case, the pair information includes information about only some pairs. In other words, information about the remaining pairs is omitted. Therefore, the correction unit of the decoder restores the omitted information on the basis of the transmitted pair information.

Note that the transmission order of the pairs in this case is similar to the case where the pair information indicates only the pairs constituted by the vertices included in the pair information described above in <Transmission Order of Pair>. Furthermore, the content of the pair information in this case is similar to the case where the pair information indicates only the pairs constituted by the vertices included in the pair information described above in <Contents of Pair Information>, <ID>, and <UV Coordinates>.

<Format of Pair Information>

The information included in the pair information (in other words, how to omit information) in this case is arbitrary.

<Three-Point Pair>

For example, as illustrated in the seventh row from the top of the table illustrated in FIG. 5, the pair information may include information indicating a correspondence relationship between a combination of vertices located at both ends of the first edge and a vertex located in the middle of the first edge and a combination of vertices located at both ends of the second edge and a vertex located in the middle of the second edge with respect to a first edge of the first patch and a second edge of the second patch corresponding to boundaries between the first patch and the second patch in the object before encoding. That is, the pair information has information indicating a pair constituted by the end point of the edge and a pair constituted by the intermediate point, and information regarding a pair constituted by other vertices may be omitted.

Figure 13:
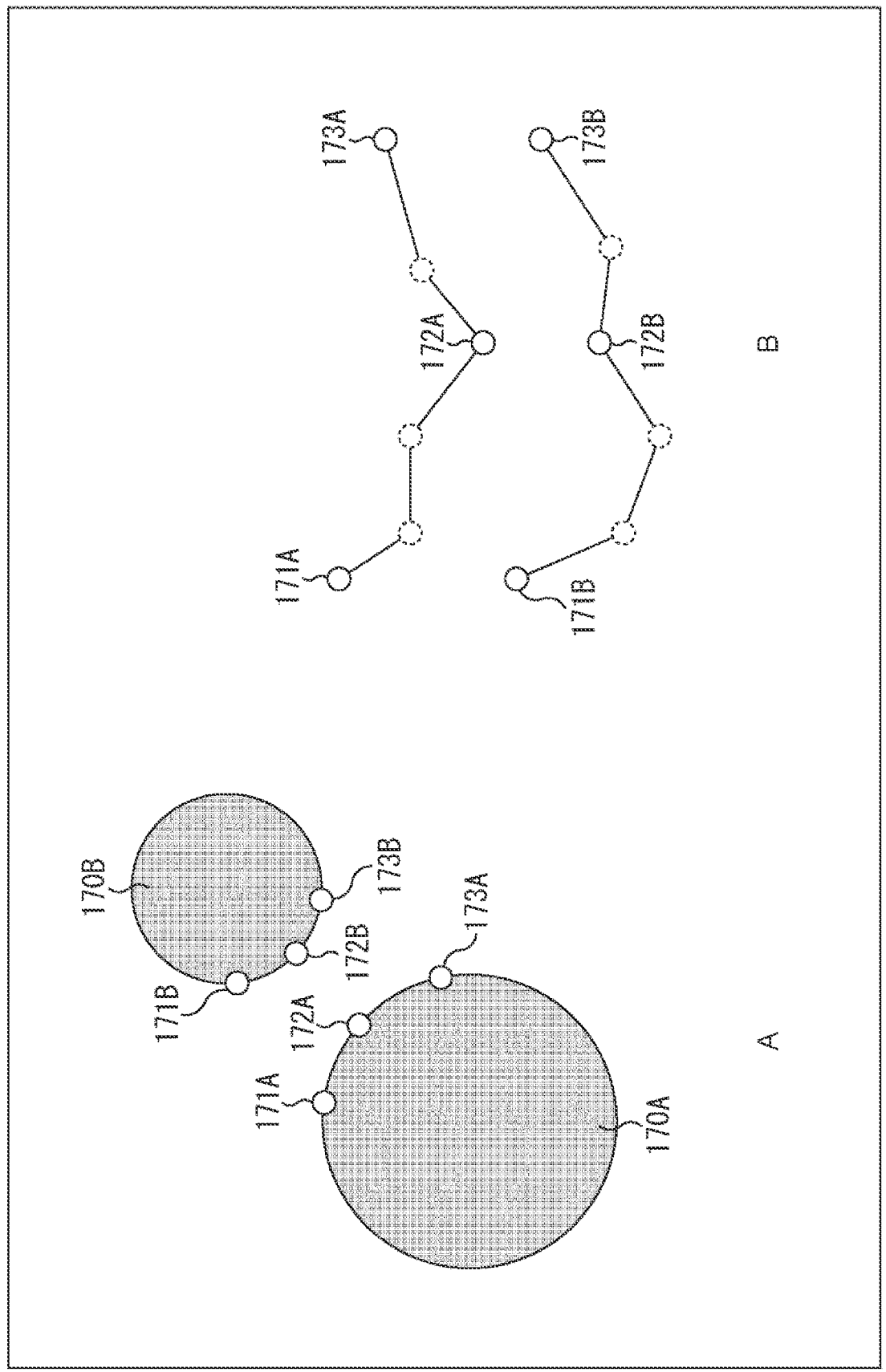
FIG. 13 is a diagram for explaining a configuration example of pair information.

For example, in A of FIG. 13, the patch 170A has a vertex 171A, a vertex 172A, and a vertex 173A at its boundaries. The patch 170B also has a vertex 171B, a vertex 172B, and a vertex 173B at its boundaries. Then, the vertex 171A and the vertex 171B constitute a pair, the vertex 172A and the vertex 172B constitute a pair, and the vertex 173A and the vertex 173B constitute a pair. That is, in the mesh, the patch 170A and the patch 170B are adjacent to each other at the boundary between the vertex 171A and the vertex 173A (the boundary between the vertex 171B and the vertex 173B).

In such a case, the boundary between the vertex 171A and the vertex 173A (the boundary between the vertex 171B and the vertex 173B) constitutes an edge shared by the patch 170A and the patch 170B. That is, the vertex 171A and the vertex 173A (or the vertex 171B and the vertex 173B) are end points of the edge. Further, the vertex 172A (or the vertex 172B) is an intermediate point of the edge.

In the patch 170A, a vertex other than the vertex 172A may exist at the boundary (edge) between the vertex 171A and the vertex 173A as in the example illustrated in B of FIG. 13. Similarly, in the patch 170B, a vertex other than the vertex 172B may exist at the boundary (edge) between the vertex 171B and the vertex 173B as in the example illustrated in B of FIG. 13.

However, in the pair information, information regarding a pair constituted by the above-described six vertices is stored. For example, in the case of B of FIG. 13, information of a pair constituted by the vertex 171A and the vertex 171B, a pair constituted by the vertex 172A and the vertex 172B, and a pair constituted by the vertex 173A and the vertex 173A is stored in the pair information. Then, in B of FIG. 13, information regarding a pair constituted by other vertices indicated by dotted circles is omitted.

In this manner, by causing the pair information to include only the information regarding the pairs constituted by both end points and an intermediate point of the edge, the code amount of the pair information can be reduced as compared with the case where the pair information includes the information regarding the pairs constituted by all vertices of the edge. That is, a reduction in the encoding efficiency of the pair information can be suppressed.

Note that any vertex between both of end points (also referred to as both end points) of the edge may be set as the intermediate point.

The correction unit of the decoder not only obtains the information of these three pairs from the pair information, but also restores (interpolates) the other vertices existing at the edge from both end points and the intermediate point of the edge, and obtains information regarding the pairs constituted by the vertices.

<Two-Point Pair>

Furthermore, for example, as illustrated in the eighth row from the top of the table illustrated in FIG. 5, the pair information may include information indicating a correspondence relationship between the scan direction with respect to the first edge at the time of decoding and the scan direction with respect to the second edge at the time of decoding with respect to the first edge of the first patch and the second edge of the second patch corresponding to the boundary between the first patch and the second patch in the object before encoding.

For example, the scan direction of the vertex located at the boundary in the patch is fixed, the first vertex of the edge in the scan order is set as the start point, and the last vertex of the edge is set as the end point. Then, in the pair information, an edge is expressed as (start point, end point), and a pair is indicated for each edge.

Figure 14:
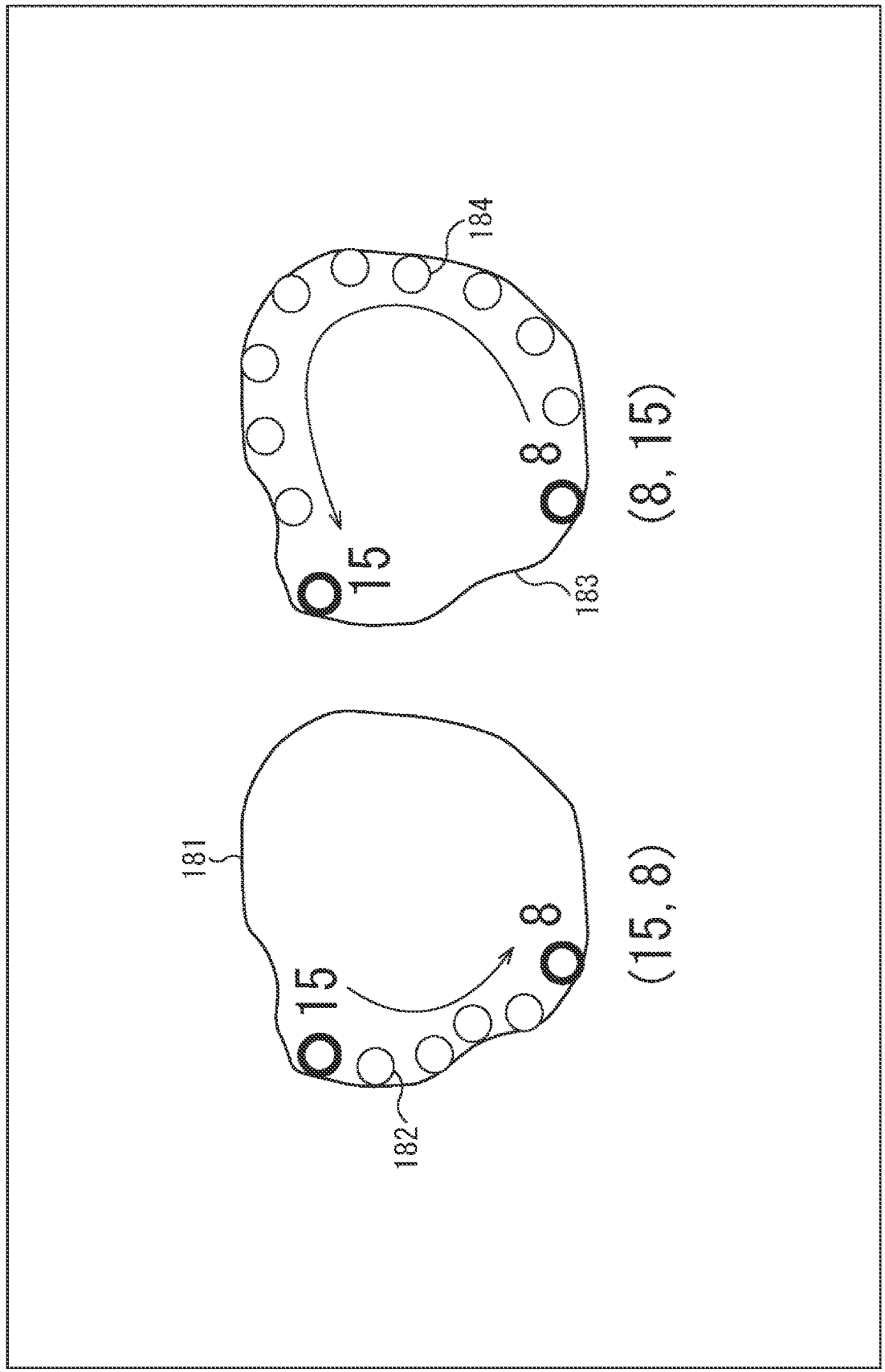
FIG. 14 is a diagram for explaining a configuration example of pair information.

For example, in FIG. 14, the scan order is a direction of an arrow (counterclockwise). In this case, the boundary (edge) on the left side in the drawing between the vertex to which the identification information "15" is assigned and the vertex to which the identification information "8" is assigned of the patch 181 is expressed as (15, 8). That is, the vertex to which the identification information "15" is assigned is set as the start point of the edge, and the vertex to which the identification information "8" is assigned is set as the end point of the edge.

The pair information includes information regarding a pair constituted by the edge (15, 8). Then, the information regarding the pair constituted by the other vertices 182 existing at the edge is omitted.

Similarly, the boundary (edge) on the right side in the drawing between the vertex to which the identification information "15" is assigned and the vertex to which the identification information "8" is assigned of the patch 183 is expressed as (8, 15). That is, the vertex to which the identification information "8" is assigned is set as the start point of the edge, and the vertex to which the identification information "15" is assigned is set as the end point of the edge. The pair information includes information regarding a pair constituted by the (8, 15). Then, the information regarding the pair constituted by the other vertices 184 existing at the edge is omitted.

For example, the pair information expresses a pair constituted by (start point 1, end point 1) and (start point 2, end point 2) as (start point 1, end point 1) and (start point 2, end point 2). In this case, it is necessary to indicate whether the start points (end points) constitute a pair or the start point and the end point constitute a pair.

Therefore, the pair information includes flag information indicating a combination of a start point and an end point in the pair. For example, when this flag is false (for example, the value "0"), it indicates that the pair correspondence is the same as the scan direction, that is, the viewpoints constitute a pair and the end points constitute a pair. Furthermore, this flag is true (for example, when the value is "1"), it indicates that the pair correspondence is opposite to the scan direction, that is, the viewpoint and the end point constitute a pair. For example, the pair information may be expressed as (start point 1, end point 1), (start point 2, end point 2), and "flag value".

Figure 15:
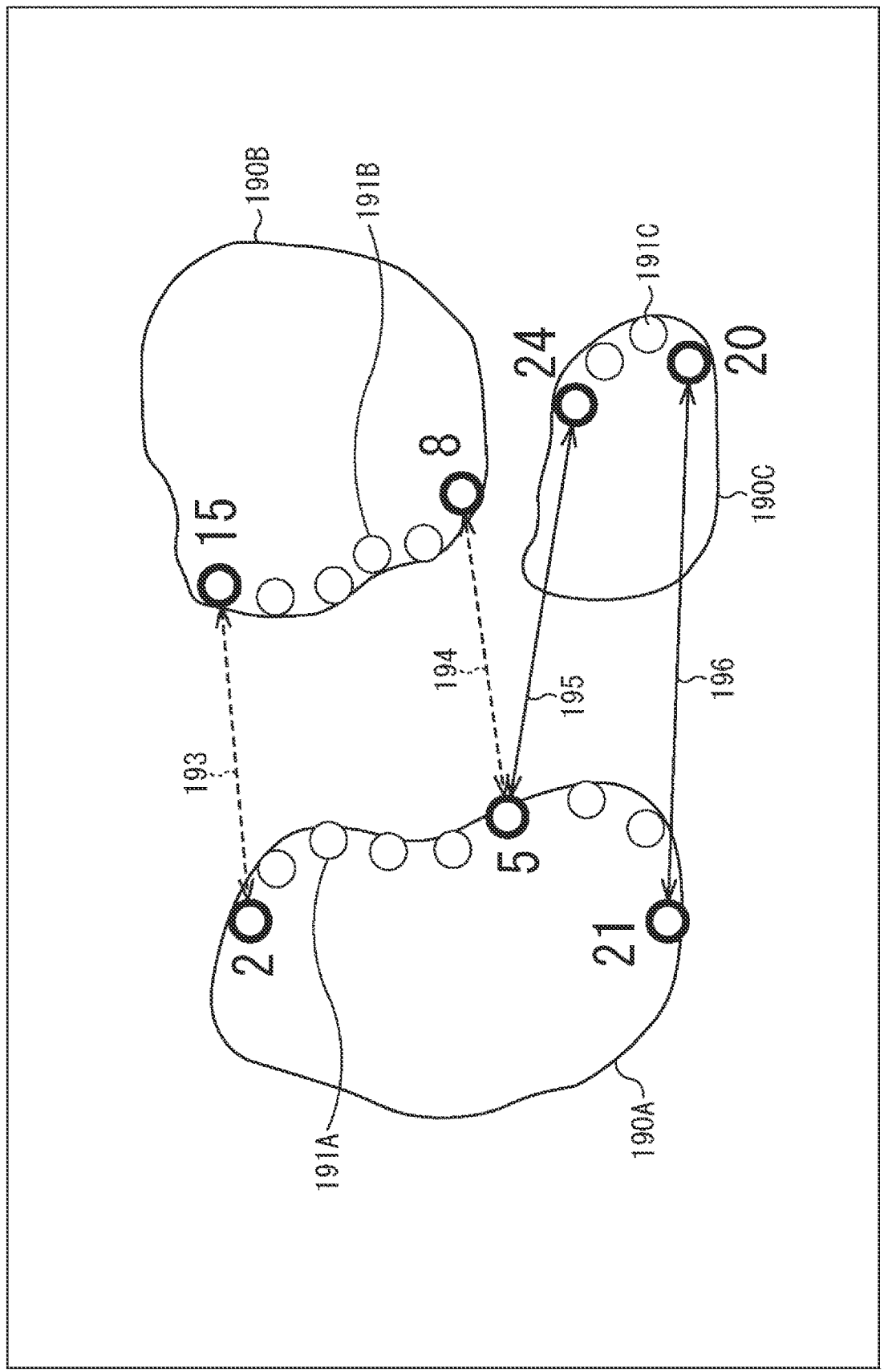
FIG. 15 is a diagram for explaining a configuration example of pair information.

For example, in FIG. 15, the boundary on the right side in the drawing between the vertex to which the identification information "2" is assigned and the vertex to which the identification information "5" is assigned of the patch 190A and the boundary on the left side in the drawing between the vertex to which the identification information "15" is assigned and the vertex to which the identification information "8" is assigned of the patch 190B constitute an edge shared by the patch 190A and the patch 190B. That is, it is assumed that the vertex to which the identification information "2" is assigned and the vertex to which the identification information "15" is assigned constitute a pair as indicated by the dotted double-headed arrow 193 and the vertex to which the identification information "5" is assigned and the vertex to which the identification information "8" is assigned constitute a pair as indicated by the dotted double-headed arrow 194.

In this case, when the scan direction is set to the counterclockwise direction, the edge of the patch 190A is expressed as (5, 2) with the vertex to which the identification information "5" is assigned as the start point and the vertex to which the identification information "2" is assigned as the end point. Similarly, the edge of the patch 190B is expressed as (15, 8) with the vertex to which the identification information "15" is assigned as a start point and the vertex to which the identification information "8" is assigned as an end point. That is, the pair indicated by the dotted double-headed arrow 193 is constituted by a start point and an end point. Similarly, the pair indicated by the dotted double-headed arrow 194 is also constituted by a start point and an end point. That is, the flag for this pair of edges is true (value "1"). Therefore, in the pair information, this pair of edges may be expressed as (5, 2), (15, 8), and 1.

In addition, in FIG. 15, the boundary on the right side in the drawing between the vertex to which the identification information "5" is assigned and the vertex to which the identification information "21" is assigned of the patch 190A and the boundary on the right side in the drawing between the vertex to which the identification information "24" is assigned and the vertex to which the identification information "20" is assigned of the patch 190C constitute an edge shared by the patch 190A and the patch 190C. That is, it is assumed that the vertex to which the identification information "5" is assigned and the vertex to which the identification information "24" is assigned constitute a pair as indicated by the solid double-headed arrow 195, and that the vertex to which the identification information "21" is assigned and the vertex to which the identification information "20" is assigned constitute a pair as indicated by the solid double-headed arrow 196.

In this case, when the scan direction is set to the counterclockwise direction, the edge of the patch 190A is expressed as (21, 5) with the vertex to which the identification information "21" is assigned as the start point and the vertex to which the identification information "5" is assigned as the end point. Similarly, the edge of the patch 190C is expressed as (20, 24) with the vertex to which the identification information "20" is assigned as a start point and the vertex to which the identification information "24" is assigned as an end point. That is, the pair indicated by the solid double-headed arrow 195 is constituted by the end points. Similarly, the pair indicated by the solid double-headed arrow 196 is constituted by starting points. That is, the flag for this pair of edges is false (value "0"). Therefore, in the pair information, this pair of edges may be expressed as (21, 5), (20, 24), 0.

Therefore, in this case, in the pair information, the information regarding the pair constituted by the other vertex 191A included in the above-described edge of the patch 190A, the other vertex 191B included in the above-described edge of the patch 190B, and the other vertex 191C included in the above-described edge of the patch 190C is omitted.

In this manner, by setting the pair information to include only the information regarding the pair constituted by the start point and the end point of the edge and the flag indicating the correspondence relationship of the pair, the code amount of the pair information can be reduced as compared with the case of including the information regarding the pair constituted by all the vertices of the edge. That is, a reduction in the encoding efficiency of the pair information can be suppressed.

The correction unit of the decoder not only obtains information of these two pairs for each edge from the pair information, but also restores (interpolates) other vertices existing at the edge from the start point and the end point of the edge, and obtains information regarding a pair constituted by the vertices.

<Vertex Interpolation>

Next, vertex interpolation by the decoder described in <Three-Point Pair> and <Two-Point Pair> will be described. When the pair information in the format described in <Three-Point Pair> or <Two-Point Pair> is acquired, the correction unit of the decoder interpolates vertices that are not indicated in the pair information, and performs the pairing processing on those points. That is, the correction unit of the decoder interpolates vertices constituting a pair and are not included in the pair information.

This interpolation method of vertex is arbitrary. For example, as illustrated in the ninth row from the top of the table illustrated in FIG. 6, the correction unit of the decoder may perform vertex interpolation on the basis of the occupancy image. In this case, the correction unit of the decoder specifies the vertex on the boundary of the patch using the occupancy image obtained by decoding, and acquires the UV coordinates. Then, the correction unit of the decoder specifies a boundary connecting the specified vertices on the basis of the connectivity.

Figure 16:
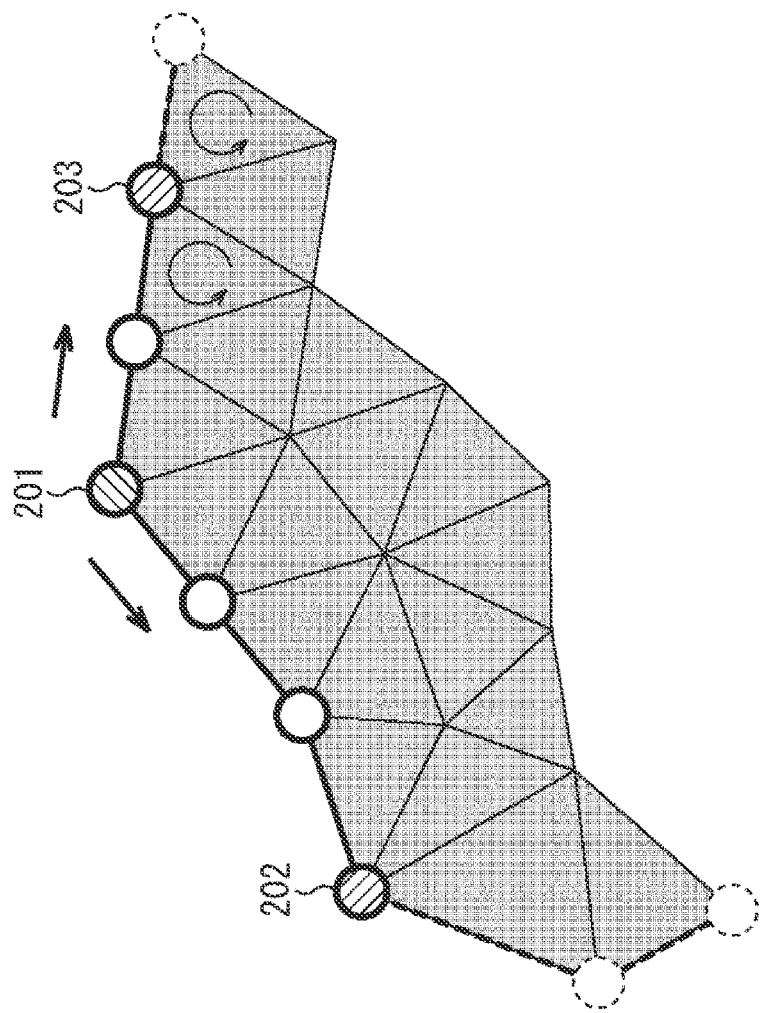
FIG. 16 is a diagram for explaining an example of vertex interpolation.

For example, when the pair information includes information regarding only a pair of both end points and a single intermediate point, the correction unit of the decoder searches for a vertex along the specified boundary from the intermediate point to both end points. For example, in FIG. 16, it is assumed that polygons indicated by gray are patches, the vertex 201 is an intermediate point, and the vertex 202 and the vertex 203 are end points. As indicated by an arrow, the correction unit of the decoder searches for a vertex along the specified boundary from the vertex 201 that is the intermediate point to the vertex 202 and the vertex 203 that are the end points. By this search, vertices indicated by white circles in the drawing are detected. The correction unit of the decoder performs the pairing processing of the detected vertex.

In this way, the correction unit of the decoder can perform the pairing processing of all the vertices existing in the edge on the basis of the pair information including the information regarding only the pair of both end points and the single intermediate point. Therefore, a reduction in the encoding efficiency can be suppressed as compared with a case where the pair information includes the information regarding the pair constituted by all the vertices of the edge.

Figure 17:
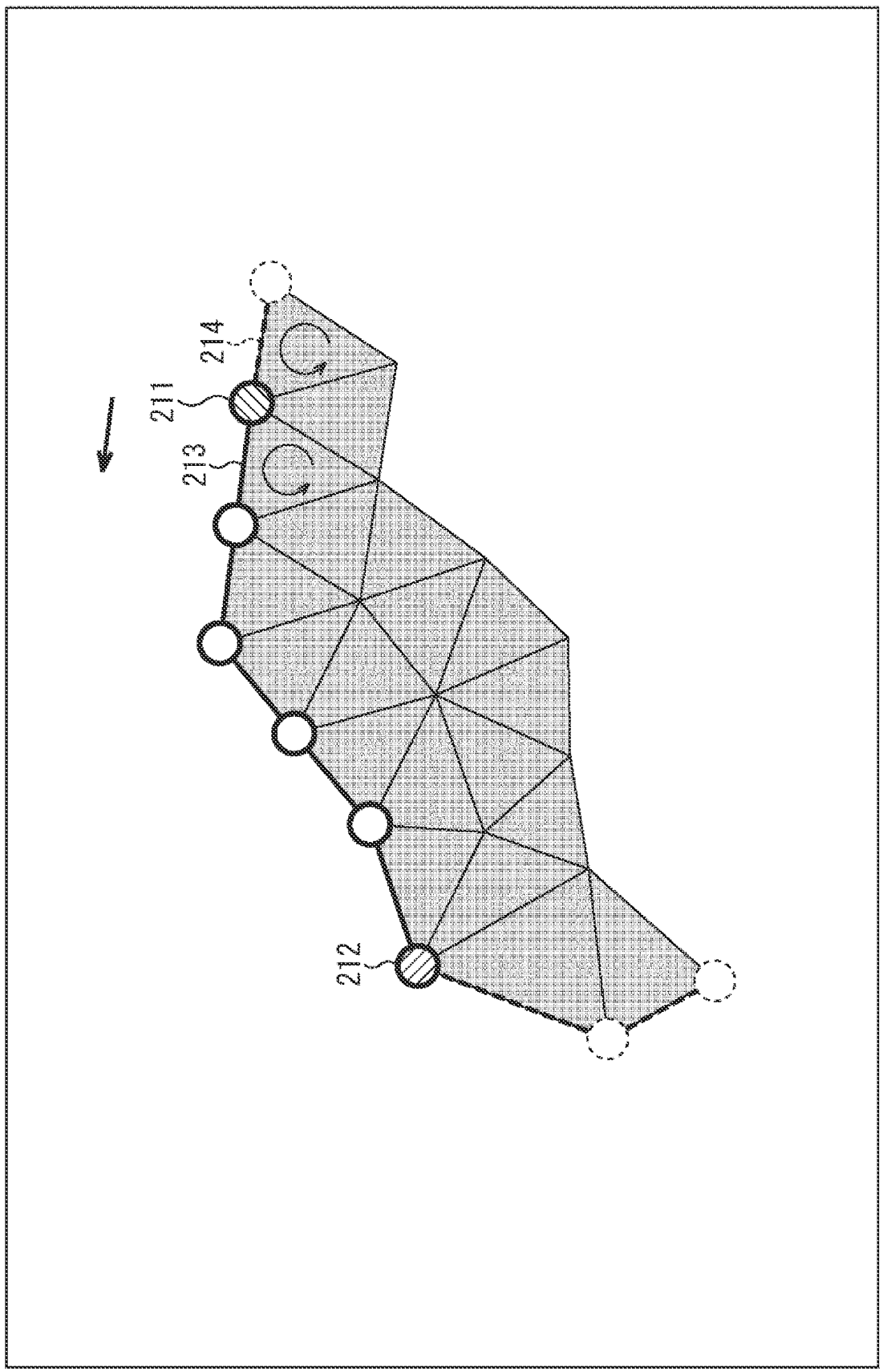
FIG. 17 is a diagram for explaining an example of vertex interpolation.

For example, when the pair information includes information regarding only a pair of a start point and an end point and flag information indicating a combination of the start point and the end point in the pair, the correction unit of the decoder searches for a vertex along the specified boundary in the designated scan direction from the start point to the end point. For example, in FIG. 17, it is assumed that polygons indicated by gray are patches, the vertex 211 is a start point, and the vertex 212 is an end point. As indicated by an arrow, the correction unit of the decoder searches for a vertex along the specified boundary in the designated scan direction from the vertex 211 as the start point to the vertex 212 as the end point. The determination as to whether or not the scan direction is the designated scan direction is made on the basis of the connectivity information of the boundary polygon. That is, the correction unit of the decoder performs the search on the side (in this case, the side 213) that matches the scan direction of the boundary polygon among the side 213 and the side 214 connected to the vertex 211 that is the start point. By this search, vertices indicated by white circles in the drawing are detected. The correction unit of the decoder performs the pairing processing of the detected vertex.

In this way, the correction unit of the decoder can perform the pairing processing of all the vertices existing in the edge on the basis of the pair information including the information regarding only the pair of the start point and the end point and the flag information indicating the combination of the start point and the end point in the pair. Therefore, a reduction in the encoding efficiency can be suppressed as compared with a case where the pair information includes the information regarding the pair constituted by all the vertices of the edge.

Note that the correction unit of the decoder may perform interpolation of the vertex on the basis of the connectivity information instead of the occupancy image, as illustrated in the 10th row from the top of the table illustrated in FIG. 6. In this case, the correction unit of the decoder specifies a polygon having no adjacent polygon (triangle) in the patch as the boundary polygon on the basis of the connectivity. In addition, the boundary of the patch is specified from the specified boundary polygon. The correction unit of the decoder searches for vertices from the intermediate point toward both end points along the boundary of the specified patch as described above, and performs the pairing processing of the detected vertices.

The method of searching for a vertex is similar to the example described above with reference to FIG. 16 or 17.

<Pairing Processing>

Next, pairing processing will be described. The correction unit of the decoder performs pairing processing on the basis of the pair information. In this pairing processing, a method of vertex matching is arbitrary.

For example, as illustrated in the 12th row from the top of the table illustrated in FIG. 6, the correction unit of the decoder may delete one of the vertex of the first patch and the vertex of the second patch indicated as a pair by the pair information in the reconstructed mesh, and convert the connection of the deleted vertex into the connection of the other vertex.

Figure 18:
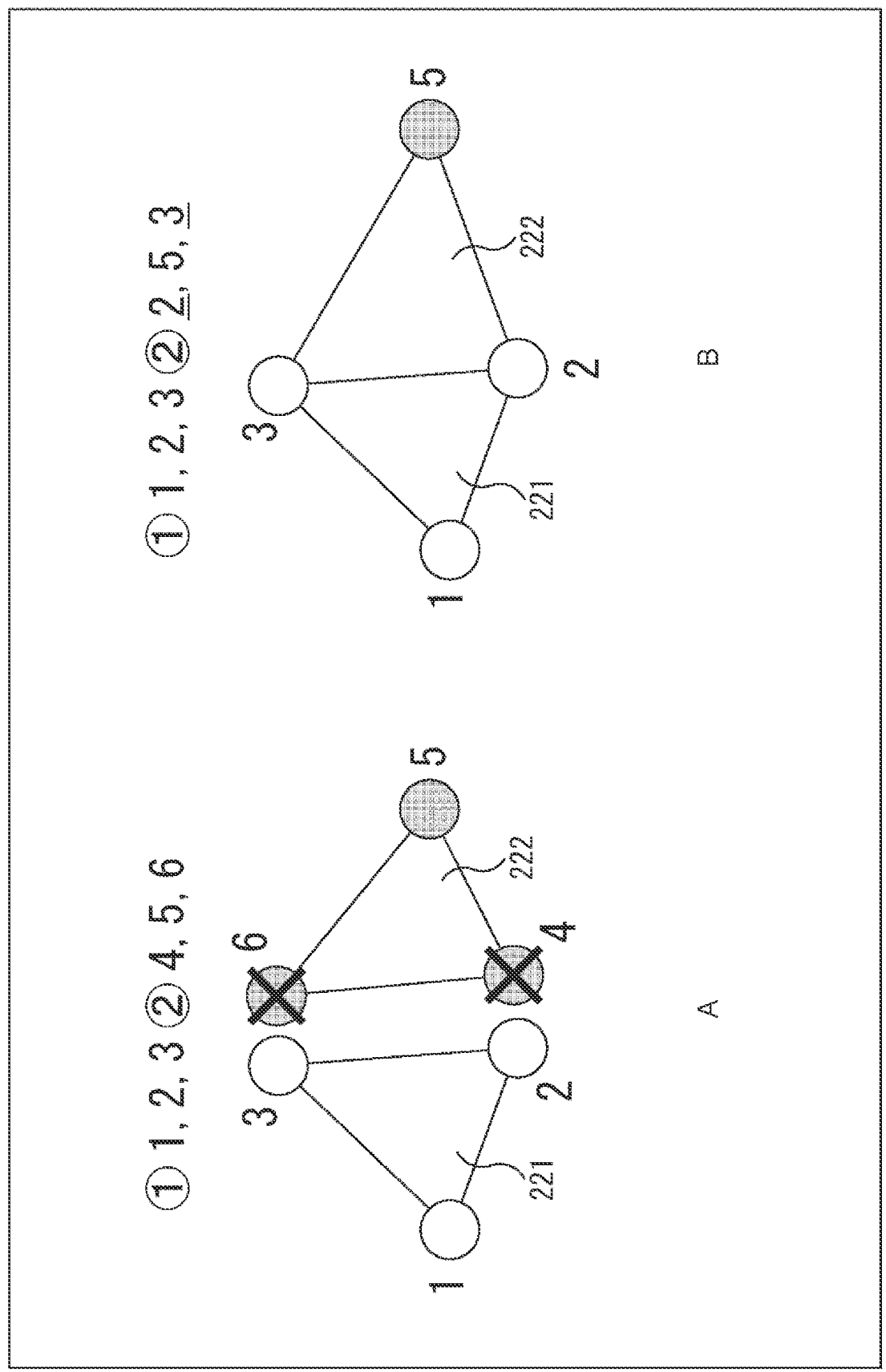
FIG. 18 is a diagram for explaining an example of mesh correction.

For example, in A of FIG. 18, it is assumed that identification information "1", identification information "2", or identification information "3" is allocated to three vertices of the polygon 221. Further, it is assumed that identification information "4", identification information "5", or identification information "6" is allocated to three vertices of the polygon 222. Then, it is assumed that the vertex to which the identification information "3" is assigned and the vertex to which the identification information "6" is assigned constitute a pair, and the vertex to which the identification information "2" is assigned and the vertex to which the identification information "4" is assigned constitute a pair, according to the pair information.

In such a case, the correction unit of the decoder first sets the position of the single vertex after the conversion on the basis of the pair information. Then, the correction unit of the decoder updates the vertex information, leaves one of the plurality of vertices constituting the pair, and eliminates the other vertices. For example, as illustrated in A of FIG. 18, the correction unit of the decoder deletes the vertex to which the identification information "6" is assigned and the vertex to which the identification information "4" is assigned. The correction unit of the decoder updates the coordinates of the remaining vertices as necessary.

Then, the correction unit of the decoder updates the connectivity, and converts the connection (side) with the eliminated vertex into the connection (side) with the remaining vertex. For example, as illustrated in B of FIG. 18, the correction unit of the decoder converts the connection connecting the vertex to which the identification information "6" is assigned and the vertex to which the identification information "5" is assigned into the connection connecting the vertex to which the identification information "3" is assigned and the vertex to which the identification information "5" is assigned. Similarly, the correction unit of the decoder converts the connection connecting the vertex to which the identification information "4" is assigned and the vertex to which the identification information "5" is assigned into the connection connecting the vertex to which the identification information "2" is assigned and the vertex to which the identification information "5" is assigned.

The correction unit of the decoder performs the pairing processing in this manner, so that the polygon 221 and the polygon 222 are adjacent to each other as illustrated in B of FIG. 18. Therefore, a crack between the polygon 221 and the polygon 222 is eliminated.

Since the correction unit of the decoder performs such pairing processing on the basis of the pair information, the decoder can more reliably eliminate the crack. That is, the occurrence of cracks can be more reliably suppressed. Therefore, a reduction in the quality of the 3D data due to encoding and decoding can be suppressed.

Furthermore, for example, as illustrated in the 13th row from the top of the table illustrated in FIG. 6, the correction unit of the decoder may move one vertex of the vertex of the first patch and the vertex of the second patch indicated as a pair by the pair information to the position of the other vertex in the reconstructed mesh.

In such a case, the correction unit of the decoder first sets the position of the overlapping point on the basis of the pair information. Then, the correction unit of the decoder updates the vertex information, and updates the coordinates of the plurality of vertices constituting the pair to the coordinates of the overlapping point. For example, as illustrated in A of FIG. 19, the correction unit of the decoder converts the coordinates of the vertex to which the identification information "3" is assigned and the coordinates of the vertex to which the identification information "6" is assigned into the same coordinates. As a result, as illustrated in B of FIG. 19, both vertices become overlapping points. Similarly, the correction unit of the decoder converts the coordinates of the vertex to which the identification information "2" is assigned and the coordinates of the vertex to which the identification information "4" is assigned into the same coordinates. As a result, as illustrated in B of FIG. 19, both vertices become overlapping points.

Figure 19:
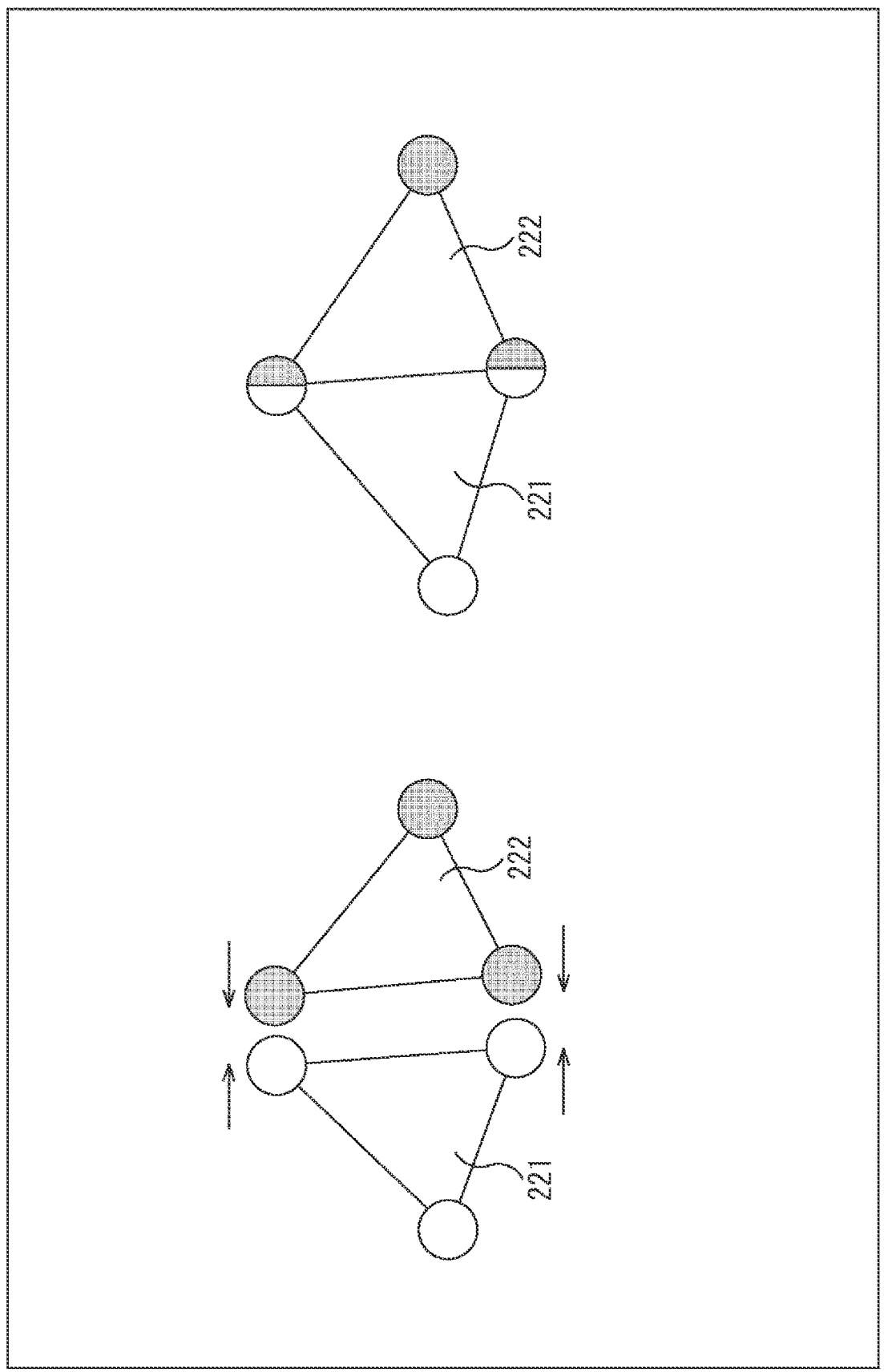
FIG. 19 is a diagram for explaining an example of mesh correction.

The correction unit of the decoder performs the pairing processing in this manner, so that the polygon 221 and the polygon 222 are adjacent to each other as illustrated in B of FIG. 19. Therefore, a crack between the polygon 221 and the polygon 222 is eliminated.

Since the correction unit of the decoder performs such pairing processing on the basis of the pair information, the decoder can more reliably eliminate the crack. That is, the occurrence of cracks can be more reliably suppressed. Therefore, a reduction in the quality of the 3D data due to encoding and decoding can be suppressed.

Furthermore, for example, as illustrated in the 14th row from the top of the table illustrated in FIG. 6, the correction unit of the decoder may form a polygon including the vertex of the first patch and the vertex of the second patch indicated to be paired by the pair information in the reconstructed mesh.

Figure 20:
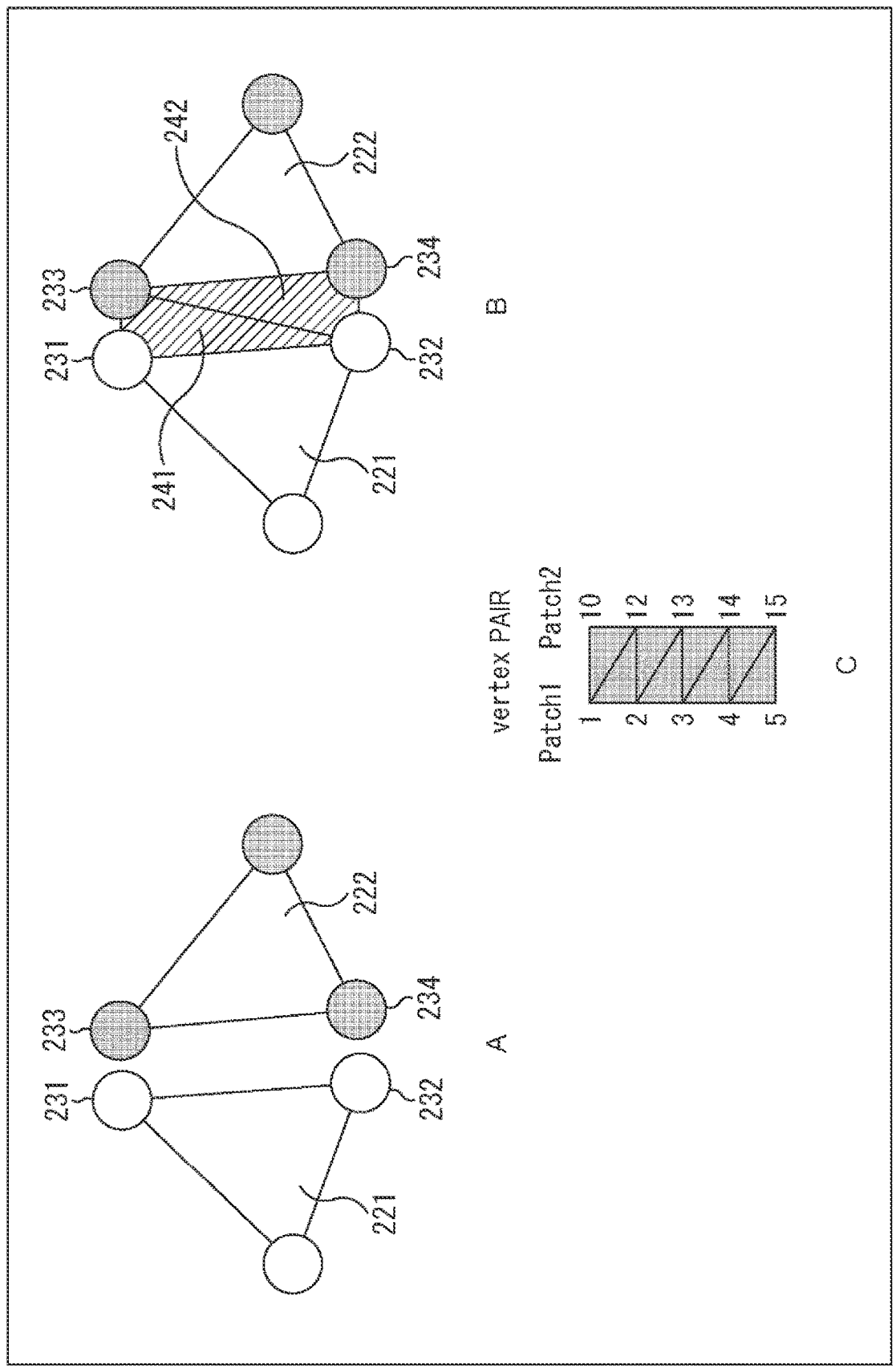
FIG. 20 is a diagram for explaining an example of mesh correction.

For example, as illustrated in A of FIG. 20, when a crack occurs between the polygon 221 and the polygon 222, the correction unit of the decoder newly forms a polygon by using the vertex 231, the vertex 233, the vertex 232, and the vertex 234 constituting a pair by the pair information.

The correction unit of the decoder updates the connectivity to connect the vertex 231, the vertex 233, the vertex 232, and the vertex 234. That is, as illustrated in B of FIG. 20, the correction unit of the decoder generates a polygon 241 having the vertices 231, 232, and 233 as vertices, and a polygon 242 having the vertices 232, 234, and 233 as vertices. At that time, the correction unit of the decoder sets the order of the vertices of the connectivity such that the boundary polygon and the surface face the same direction.

Then, the correction unit of the decoder attaches the texture to the added polygon. This texture may be any texture, but by making the texture less uncomfortable with the texture of the surrounding polygons, it is possible to suppress a reduction in quality. For example, the correction unit of the decoder may reproduce (copy) a color of a peripheral boundary polygon and apply a texture to the added polygon. In addition, the correction unit of the decoder may obtain a (weighted) average of colors of a plurality of surrounding boundary polygons and paste the derived texture to the added polygon. Furthermore, a dedicated texture for attaching to the added polygon may be transmitted from the encoder to the decoder. Then, the correction unit of the decoder may attach the transmitted texture to the added polygon.

As described above, by adding the polygon 241 and the polygon 242, the gap between the polygon 221 and the polygon 222 is filled, and the crack is eliminated. That is, the correction unit of the decoder performs the pairing processing on the basis of the pair information as described above, so that the decoder can more reliably erase the crack between the polygon 221 and the polygon 222. That is, the occurrence of cracks can be more reliably suppressed. Therefore, a reduction in the quality of the 3D data due to encoding and decoding can be suppressed.

Note that, when a large number of vertices constitute a pair, the correction unit of the decoder is only required to generate a polygon by using three vertices at a time, as illustrated in C of FIG. 20.

Furthermore, in the pairing processing, the correction unit of the decoder may select and apply any of a plurality of methods as described above. The selection method is arbitrary.

For example, in a case where vertices of a pair that are one vertex in a state before encoding are paired, a case where it is not necessary to hold an overlapping point, or the like, the correction unit of the decoder may convert a plurality of vertices constituting the pair into a single vertex. Furthermore, for example, when there is an overlapping point in a state before encoding and it is desired to hold the overlapping point, or the like, the correction unit of the decoder may set a plurality of vertices constituting a pair as the overlapping point. Furthermore, in a case where subjective evaluation is better in a case where a mesh is formed than in a case where a point is moved, or the like, the correction unit of the decoder may add a polygon using a plurality of vertices constituting a pair. Furthermore, information designating a pairing processing method may be transmitted from the encoder to the decoder. For example, this information may be transmitted in an arbitrary unit such as a sequence unit, a list unit, or a pair unit.

<Coordinate Determination Method>

As described above, in the pairing processing, when the vertices constituting the pair are converted into one vertex, a method of determining the coordinates of the converted vertex is arbitrary.

For example, as illustrated in the 16th row from the top of the table illustrated in FIG. 6, the correction unit of the decoder may set the position of a vertex after conversion into a single vertex to any position of a plurality of vertices before conversion (that is, a plurality of vertices constituting the pair). That is, another vertex may be moved to any position of the plurality of vertices constituting the pair.

In this case, a method of selecting a vertex to be a movement destination of another vertex (a method of determining a position of a vertex to which another vertex is to be moved among vertices constituting a pair) is arbitrary. For example, as illustrated in the 17th row from the top of the table illustrated in FIG. 6, information indicating a vertex to be selected as the movement destination may be transmitted from the encoder to the decoder. That is, this information indicates any of the plurality of vertices before the conversion.

Then, the correction unit of the decoder may set the position of the single vertex after the conversion on the basis of information indicating any one of the plurality of vertices before the conversion. That is, the decoder executes the pairing processing so as to move another vertex to the position of the vertex designated by the information.

As described above, the correction unit of the decoder selects the vertex to be the movement destination according to the designation of the encoder, so that the decoder can suppress the change in the coordinates adopted according to the order of reconstruction.

Furthermore, for example, as illustrated in the bottom row of the table illustrated in FIG. 6, the correction unit of the decoder may set the position of the vertex after conversion into a single vertex as the (weighted) average position of the positions of the plurality of vertices before conversion (coordinates of each vertex constituting the pair).

Similarly, in the pairing processing, when vertices constituting a pair are set as overlapping points, a method of determining the coordinates of the overlapping points is also arbitrary.

For example, as illustrated in the 16th row from the top of the table illustrated in FIG. 6, the correction unit of the decoder may set the position of the overlapping point to any position among the plurality of vertices constituting the pair.

In that case, a method of selecting the vertex is arbitrary. For example, as illustrated in the 17th row from the top of the table illustrated in FIG. 6, information indicating a vertex to be selected as the position of the overlapping point may be transmitted from the encoder to the decoder. That is, this information indicates any of the plurality of vertices before the conversion.

Then, the correction unit of the decoder may set the position of the overlapping point on the basis of information indicating any of the plurality of vertices before the conversion. That is, the correction unit of the decoder executes the pairing processing so as to form the overlapping point at the position of the vertex designated by the information.

By such a method, for example, it is possible to realize that an encoder generates this information on the basis of a mesh in a state before encoding and transmits the information to a decoder, and the decoder sets an overlapping point on the basis of the information. As a result, the decoder can more easily reproduce the state before the occurrence of the crack.

Furthermore, for example, as illustrated in the bottom row of the table illustrated in FIG. 6, the correction unit of the decoder may set the position of the overlapping point to the (weighted) average position of the positions (coordinates) of the plurality of vertices constituting the pair.

Application Example

Note that the pair information may be transmitted for all vertices (or edges) constituting the pair, or may be transmitted for some vertices (or edges). By transmitting the pair information only for some vertices, an increase in the code amount of the pair information can be suppressed. That is, a reduction in the encoding efficiency of the pair information can be suppressed.

For example, the pair information may be transmitted only for a pair that cannot be corrected by another correction method such as zippering. In that case, the encoder is only required to have a function of decoding the encoded data of the 3D data, specifying a portion that cannot be corrected by performing zippering or the like, and generating pair information of a pair of the specified portions.

3. First Embodiment

<Encoding Device>

Figure 21:
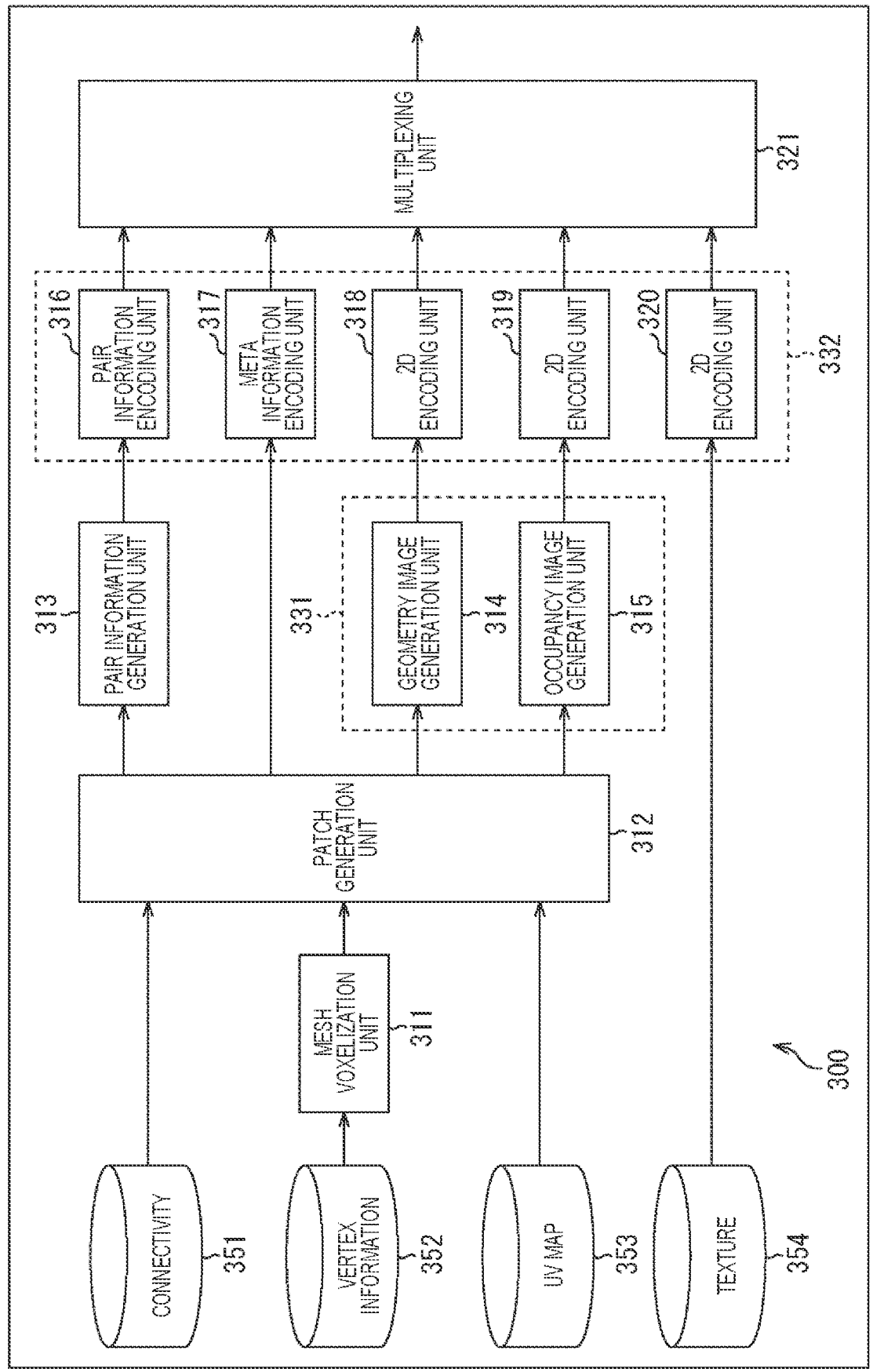
FIG. 21 is a block diagram illustrating a main configuration example of an encoding device.

The present technology described above can be applied to any device. For example, the present technology can be applied to an encoding device 300 as illustrated in FIG. 21. FIG. 21 is a block diagram illustrating an example of a configuration of an encoding device which is an embodiment of an information processing apparatus to which the present technology is applied. The encoding device 300 illustrated in FIG. 21 is a device that extends VPCC and encodes 3D data using mesh as a video frame by an encoding method for two-dimensional images. At that time, the encoding device 300 performs encoding by applying a single method or a combination of a plurality of methods among the above-described various methods of the present technology.

Note that, in FIG. 21, main processing units, data flows, and the like are illustrated, and those illustrated in FIG. 21 are not necessarily all. That is, in the encoding device 300, there may be a processing unit not illustrated as a block in FIG. 21, or there may be processing or a data flow not illustrated as an arrow or the like in FIG. 21.

As illustrated in FIG. 21, the encoding device 300 includes a mesh voxelization unit 311, a patch generation unit 312, a pair information generation unit 313, a geometry image generation unit 314, an occupancy image generation unit 315, a pair information encoding unit 316, a meta information encoding unit 317, a 2D encoding unit 318, a 2D encoding unit 319, a 2D encoding unit 320, and a multiplexing unit 321. The geometry image generation unit 314 and the occupancy image generation unit 315 may be regarded as an image generation unit 331 in the present disclosure. Furthermore, the pair information encoding unit 316, the meta information encoding unit 317, the 2D encoding unit 318, the 2D encoding unit 319, and the 2D encoding unit 320 may be regarded as an encoding unit 332 in the present disclosure. Furthermore, in the present disclosure, the pair information generation unit 313 may be simply referred to as a generation unit. Furthermore, in the present disclosure, the pair information encoding unit 316 may be simply referred to as an encoding unit.

Connectivity 351, vertex information 352, a UV map 353, and a texture 354 are supplied to the encoding device 300 as 3D data using the mesh.

The connectivity 351 is information similar to the connectivity 32 (FIG. 2), and indicates each vertex (each vertex connected to each other) forming a polygon for each polygon. The vertex information 352 is information similar to the vertex information 31 (FIG. 2) and indicates coordinates of each vertex forming the mesh. The UV map 353 is information similar to the UV map 34 (FIG. 2) and indicates the position of each vertex on the texture image. The texture 354 is information similar to the texture image 33 (FIG. 2) and indicates the texture to be pasted on the polygon. That is, the texture 354 is information including a texture image.

The mesh voxelization unit 311 acquires the vertex information 352 supplied to the encoding device 300. The mesh voxelization unit 311 converts coordinates of each vertex included in the acquired vertex information 352 into a voxel grid. The mesh voxelization unit 311 supplies the vertex information 352 of the voxel grid after the conversion to the patch generation unit 312.

The patch generation unit 312 acquires the connectivity 351 and the UV map 353 supplied to the encoding device 300. In addition, the patch generation unit 312 acquires the vertex information 352 of the voxel grid supplied from the mesh voxelization unit 311. The patch generation unit 312 generates a patch of geometry on the basis of the information. In addition, the patch generation unit 312 projects a patch of the generated geometry onto the projection plane to generate a patch image.

The patch generation unit 312 supplies information such as the generated patch image, the connectivity 351, the vertex information 352, and the UV map 353 to the pair information generation unit 313. In addition, the patch generation unit 312 supplies information such as the connectivity 351 and the UV map 353 to the meta information encoding unit 317 as meta information. Further, the patch generation unit 312 supplies the generated patch image to the geometry image generation unit 314. The patch generation unit 312 also supplies the generated patch image to the occupancy image generation unit 315.

The pair information generation unit 313 acquires information such as the patch image, the connectivity 351, the vertex information 352, and the UV map 353 supplied from the patch generation unit 312. The pair information generation unit 313 generates pair information indicating a pair constituted by one vertex or a plurality of vertices that have been overlapping points in the mesh on the basis of the information. The pair information may include information as described in the section of <2. Transmission of Pair Information> (including the sections of <Generation of Pair Information> to <Application Example>) and the like. The pair information generation unit 313 generates the pair information as described in the section of <Generation of Pair Information> and the like.

That is, the pair information generation unit 313 (generation unit) divides a mesh representing an object having a three-dimensional structure into at least a first patch and a second patch and arranges the first patch and the second patch in a single image, and generates pair information indicating that at least one vertex of the first patch and at least one vertex of the second patch located at the same position as the position of the vertex of the first patch in the object before encoding are paired.

Note that the pair information may be information indicating only a pair constituted by vertices included in the pair information.

The pair information may include information indicating a correspondence between a combination of vertices located at both ends of the first edge and a vertex located in the middle of the first edge and a combination of vertices located at both ends of the second edge and a vertex located in the middle of the second edge with respect to the first edge of the first patch and the second edge of the second patch corresponding to the boundaries between the first patch and the second patch in the object before encoding.

The pair information may include information indicating the correspondence between the scan direction for the first edge at the time of decoding and the scan direction for the second edge at the time of decoding with respect to the first edge of the first patch and the second edge of the second patch corresponding to the boundary between the first patch and the second patch in the object before encoding.

This pair information may indicate that the plurality of vertices of the first patch and the corresponding plurality of vertices of the second patch are each a pair.

The pair information may include a parameter indicating the number of vertices constituting the pair.

The pair information may include information indicating a group including a plurality of vertices of the first patch and a group including a plurality of vertices of the second patch.

The pair information may indicate a pair by using identification information corresponding to a state of each vertex in the object before encoding.

The pair information may indicate a pair on the basis of each coordinate of a plurality of vertices in the two-dimensional plane of the image.

The pair information may indicate relative coordinates of a vertex different from the reference vertex with reference to the coordinates of the reference vertex among the plurality of vertices.

The pair information may indicate relative coordinates of a vertex different from the reference vertex with reference to the position of the relative vector between the first patch and the second patch with reference to the coordinates of the reference vertex among the plurality of vertices.

The pair information may indicate relative coordinates of a vertex different from the reference vertex in the second patch in a state in which the posture is corrected with reference to a position of a relative vector between the first patch and the second patch with reference to the coordinates of the reference vertex among the plurality of vertices.

The pair information may indicate relative coordinates of a vertex different from the reference vertex of the processing target pair with reference to relative coordinates of a vertex different from the reference vertex with reference to coordinates of the reference vertex among the plurality of vertices of another pair.

The pair information generation unit 313 supplies the generated pair information to the pair information encoding unit 316.

The image generation unit 331 performs processing related to generation of an image (frame image). The geometry image generation unit 314 acquires the patch image supplied from the patch generation unit 312. The geometry image generation unit 314 arranges the patch image on a two-dimensional plane to generate a geometry image. The geometry image generation unit 314 supplies the 2D encoding unit 318 with the geometry video frame.

The occupancy image generation unit 315 acquires the patch image supplied from the patch generation unit 312. The occupancy image generation unit 315 generates an occupancy image using the patch image. The occupancy image generation unit 315 supplies the generated occupancy image to the 2D encoding unit 319.

The encoding unit 332 performs processing related to encoding. The pair information encoding unit 316 (encoding unit) acquires the pair information supplied from the pair information generation unit 313. The pair information encoding unit 316 encodes the acquired pair information by a predetermined encoding method, and generates encoded data of the pair information. This encoding method is arbitrary. The pair information encoding unit 316 supplies the encoded data of the generated pair information to the multiplexing unit 321.

The meta information encoding unit 317 acquires the meta information (including the connectivity 351 and the UV map 353) supplied from the patch generation unit 312. The meta information encoding unit 317 encodes the acquired meta information to generate encoded data of the meta information. The meta information encoding unit 317 supplies the encoded data of the generated meta information to the multiplexing unit 321.

The 2D encoding unit 318 acquires the geometry image supplied from the geometry image generation unit 314. The 2D encoding unit 318 encodes the acquired geometry image by an encoding method for 2D images, and generates encoded data of the geometry image. The 2D encoding unit 318 supplies the encoded data of the generated geometry image to the multiplexing unit 321.

The 2D encoding unit 319 acquires the occupancy image supplied from the occupancy image generation unit 315. The 2D encoding unit 319 encodes the acquired occupancy image by an encoding method for 2D images, and generates encoded data of the occupancy image. The 2D encoding unit 319 supplies the multiplexing unit 321 with the encoded data of the generated occupancy image.

The 2D encoding unit 320 acquires the texture 354 supplied to the encoding device 300. The 2D encoding unit 320 encodes the acquired texture 354 (that is, the texture image) by an encoding method for 2D images, and generates encoded data of the texture image. The 2D encoding unit 320 supplies the encoded data of the generated texture image to the multiplexing unit 321.

The multiplexing unit 321 acquires the encoded data of the pair information supplied from the pair information encoding unit 316. Further, the multiplexing unit 321 acquires the encoded data of the meta information supplied from the meta information encoding unit 317. Further, the multiplexing unit 321 acquires the encoded data of the geometry image supplied from the 2D encoding unit 318. In addition, the multiplexing unit 321 acquires the encoded data of the occupancy image supplied from the 2D encoding unit 319. Further, the multiplexing unit 321 acquires the encoded data of the texture image supplied from the 2D encoding unit 320. The multiplexing unit 321 multiplexes the acquired information to generate one bitstream. The multiplexing unit 321 outputs the generated bitstream to the outside of the encoding device 300.

Note that these processing units (mesh voxelization unit 311 to multiplexing unit 321) have an arbitrary configuration. For example, each processing unit may be configured by a logic circuit that implements the above-described processing. In addition, each processing unit may include a central processing unit (CPU), a read-only memory (ROM), a random-access memory (RAM), and the like, for example, and execute a program by using them to realize the above-described processing. Needless to say, each processing unit may have both the configurations, and a part of the above-described processing may be achieved by the logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Flow of Encoding Process>

Figure 22:
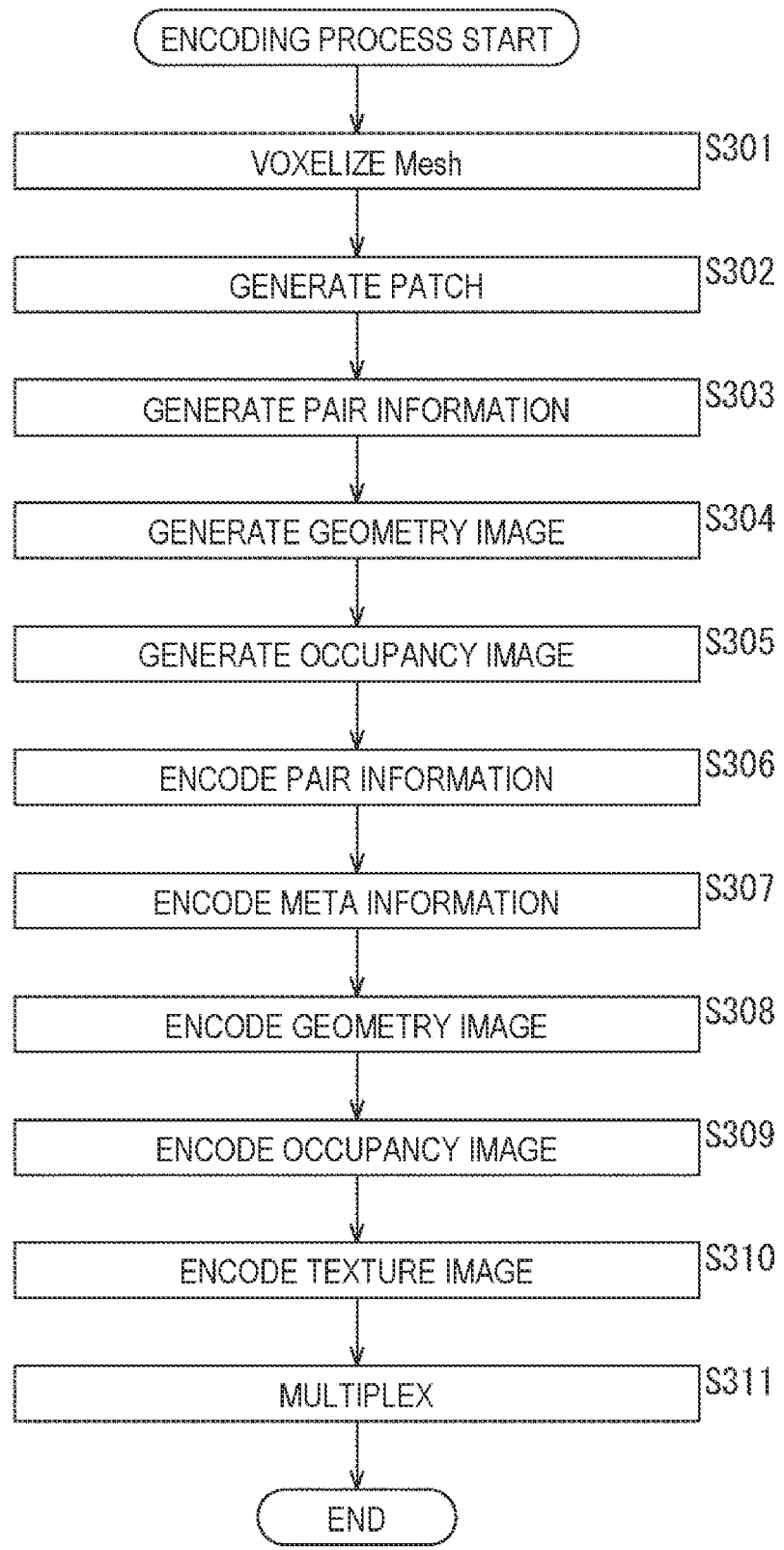
FIG. 22 is a flowchart for explaining an example of a flow of an encoding process.

An example of a flow of an encoding process executed by the encoding device 300 will be described with reference to a flowchart in FIG. 22.

When the encoding process is started, in step S301, the mesh voxelization unit 311 voxelizes the coordinates of each vertex included in the vertex information 352 to voxelize the mesh.

In step S302, the patch generation unit 312 generates a patch using the vertex information 352 and the like voxelized in step S301, projects the generated patch on the projection plane, and generates a patch image.

In step S303, the pair information generation unit 313 generates pair information indicating a pair constituted by one vertex or a plurality of vertices that are overlapping points in the mesh by appropriately using information such as the connectivity 351, the vertex information 352 voxelized in step S301, the UV map 353, and the like. The pair information may include information as described in the section of <2. Transmission of Pair Information> (including the sections of <Generation of Pair Information> to <Application Example>) and the like. The pair information generation unit 313 generates the pair information as described in the section of <Generation of Pair Information> and the like.

That is, the pair information generation unit 313 (generation unit) divides a mesh representing an object having a three-dimensional structure into at least a first patch and a second patch and arranges the first patch and the second patch in a single image, and generates pair information indicating that at least one vertex of the first patch and at least one vertex of the second patch located at the same position as the position of the vertex of the first patch in the object before encoding are paired.

Note that the pair information may be information indicating only a pair constituted by vertices included in the pair information.

The pair information may include information indicating a correspondence between a combination of vertices located at both ends of the first edge and a vertex located in the middle of the first edge and a combination of vertices located at both ends of the second edge and a vertex located in the middle of the second edge with respect to the first edge of the first patch and the second edge of the second patch corresponding to the boundaries between the first patch and the second patch in the object before encoding.

The pair information may include information indicating the correspondence between the scan direction for the first edge at the time of decoding and the scan direction for the second edge at the time of decoding with respect to the first edge of the first patch and the second edge of the second patch corresponding to the boundary between the first patch and the second patch in the object before encoding.

This pair information may indicate that the plurality of vertices of the first patch and the corresponding plurality of vertices of the second patch are each a pair.

The pair information may include a parameter indicating the number of vertices constituting the pair.

The pair information may include information indicating a group including a plurality of vertices of the first patch and a group including a plurality of vertices of the second patch.

The pair information may indicate a pair by using identification information corresponding to a state of each vertex in the object before encoding.

The pair information may indicate a pair on the basis of each coordinate of a plurality of vertices in the two-dimensional plane of the image.

The pair information may indicate relative coordinates of a vertex different from the reference vertex with reference to the coordinates of the reference vertex among the plurality of vertices.

The pair information may indicate relative coordinates of a vertex different from the reference vertex with reference to the position of the relative vector between the first patch and the second patch with reference to the coordinates of the reference vertex among the plurality of vertices.

The pair information may indicate relative coordinates of a vertex different from the reference vertex in the second patch in a state in which the posture is corrected with reference to a position of a relative vector between the first patch and the second patch with reference to the coordinates of the reference vertex among the plurality of vertices.

The pair information may indicate relative coordinates of a vertex different from the reference vertex of the processing target pair with reference to relative coordinates of a vertex different from the reference vertex with reference to coordinates of the reference vertex among the plurality of vertices of another pair.

In step S304, the geometry image generation unit 314 generates a geometry image on the basis of the patch image generated in step S302 and the UV map 353.

In step S305, the occupancy image generation unit 315 generates an occupancy image corresponding to the geometry image generated in step S304.

In step S306, the pair information encoding unit 316 (encoding unit) encodes the pair information generated in step S303 by a predetermined encoding method, and generates encoded data of the pair information. This encoding method is arbitrary.

In step S307, the meta information encoding unit 317 encodes the meta information (the connectivity 351, the UV map 353, or the like) to generate encoded data of the meta information.

In step S308, the 2D encoding unit 318 encodes the geometry image generated in step S304, and generates encoded data of the geometry image.

In step S309, the 2D encoding unit 319 encodes the occupancy image generated by the occupancy image generation unit 315 in step S305, and generates encoded data of the occupancy image.

In step S310, the 2D encoding unit 320 encodes the texture 354 (that is, the texture image), and generates encoded data of the texture image.

In step S311, the multiplexing unit 321 multiplexes the encoded data of the pair information generated in step S306, the encoded data of the meta information generated in step S307, the encoded data of the geometry image generated in step S308, the encoded data of the occupancy image generated in step S309, and the encoded data of the texture image generated in step S310 to generate one bitstream. The multiplexing unit 321 outputs the generated bitstream to the outside of the encoding device 300.

When the processing in step S311 ends, the encoding process ends.

The encoding device 300 has the above configuration, and executes the above various processes and transmits the pair information to the decoder, so that the decoder that decodes the bitstream can more reliably suppress the occurrence of the crack and perform the pairing processing between more appropriate vertices. Therefore, the encoding device 300 can suppress a reduction in the quality of the 3D data due to encoding and decoding.

4. Second Embodiment

<Decoding Device>

Figure 23:
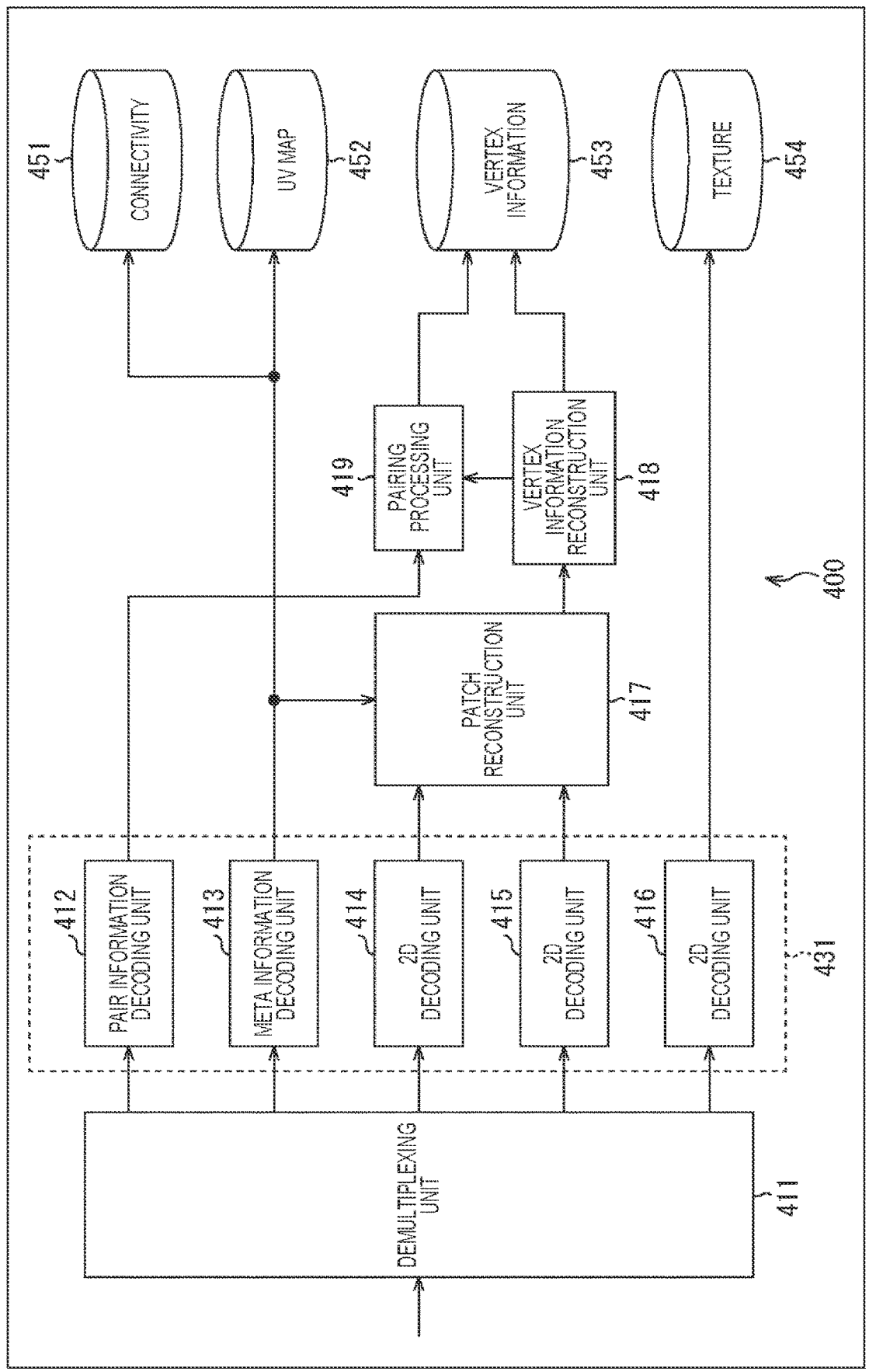
FIG. 23 is a block diagram illustrating a main configuration example of a decoding device.

The present technology can also be applied to, for example, a decoding device 400 as illustrated in FIG. 23. FIG. 23 is a block diagram illustrating an example of a configuration of a decoding device which is an aspect of an image processing device to which the present technology is applied. The decoding device 400 illustrated in FIG. 23 is a device that extends the VPCC and decodes encoded data obtained by encoding 3D data using a mesh as a video frame by an encoding method for two-dimensional images by a decoding method for two-dimensional images to generate (reconstruct) 3D data using a mesh. At that time, the decoding device 400 decodes the encoded data and reconstructs the 3D data by applying a single method or a combination of a plurality of methods among the various methods of the present technology described above.

Note that, in FIG. 23, main processing units, data flows, and the like are illustrated, and those illustrated in FIG. 23 are not necessarily all. That is, in the decoding device 400, there may be a processing unit not illustrated as a block in FIG. 23, or there may be processing or a data flow not illustrated as an arrow or the like in FIG. 23.

As illustrated in FIG. 23, the decoding device 400 includes a demultiplexing unit 411, a pair information decoding unit 412, a meta information decoding unit 413, a 2D decoding unit 414, a 2D decoding unit 415, a 2D decoding unit 416, a patch reconstruction unit 417, a vertex information reconstruction unit 418, and a pairing processing unit 419. The pair information decoding unit 412, the meta information decoding unit 413, the 2D decoding unit 414, the 2D decoding unit 415, and the 2D decoding unit 416 may be regarded as a decoding unit 431 in the present disclosure. Furthermore, in the present disclosure, the pair information decoding unit 412 may be simply referred to as a decoding unit. Furthermore, in the present disclosure, the pairing processing unit 419 may also be referred to as a correction unit.

The demultiplexing unit 411 acquires a bitstream input to the decoding device 400. As described above in the first embodiment, this bitstream is, for example, a bitstream generated by the encoding device 300, and 3D data using a mesh is encoded by extending the VPCC.

The demultiplexing unit 411 demultiplexes the bitstream and generates each encoded data included in the bitstream. That is, the demultiplexing unit 411 extracts each encoded data from the bitstream by the demultiplexing. For example, the demultiplexing unit 411 extracts the encoded data of the pair information from the bitstream. Further, the demultiplexing unit 411 extracts the encoded data of the meta information from the bitstream. Furthermore, the demultiplexing unit 411 extracts the encoded data of the geometry image from the bitstream. Further, the demultiplexing unit 411 extracts the encoded data of the occupancy image from the bitstream. Furthermore, the demultiplexing unit 411 extracts the encoded data of the texture image from the bitstream.

The demultiplexing unit 411 supplies the extracted encoded data to the decoding unit 431. For example, the demultiplexing unit 411 supplies the encoded data of the extracted pair information to the pair information decoding unit 412. Further, the demultiplexing unit 411 supplies the encoded data of the extracted meta information to the meta information decoding unit 413. Furthermore, the demultiplexing unit 411 supplies the encoded data of the extracted geometry image to the 2D decoding unit 414. Further, the demultiplexing unit 411 supplies the encoded data of the extracted occupancy image to the 2D decoding unit 415. Furthermore, the demultiplexing unit 411 supplies the encoded data of the extracted texture image to the 2D decoding unit 416.

The decoding unit 431 executes processing related to decoding. The pair information decoding unit 412 acquires the encoded data of the pair information supplied from the demultiplexing unit 411. The pair information decoding unit 412 decodes the encoded data by a predetermined decoding method to generate pair information. This decoding method is arbitrary as long as it corresponds to the encoding method applied by the pair information encoding unit 316 (FIG. 21) of the encoding device 300 in encoding the pair information.

That is, the pair information decoding unit 412 (decoding unit) divides a mesh representing an object having a three-dimensional structure into at least a first patch and a second patch and arranges the patches in a single image, and decodes encoded data of pair information indicating that at least one vertex of the first patch and at least one vertex of the second patch located at the same position as the position of the vertex of the first patch in the object before encoding are paired, to obtain pair information.

The pair information decoding unit 412 supplies the generated pair information to the pairing processing unit 419.

The meta information decoding unit 413 acquires the encoded data of the meta information supplied from the demultiplexing unit 411. The meta information decoding unit 413 decodes the encoded data of the acquired meta information to generate meta information. The meta information includes connectivity 451 and a UV map 452. The meta information decoding unit 413 outputs the generated connectivity 451 and UV map 452 to the outside of the decoding device 400 as (data constituting) 3D data using the restored mesh. Further, the meta information decoding unit 413 supplies the generated connectivity 451 and UV map 452 to the patch reconstruction unit 417.

The 2D decoding unit 414 acquires the encoded data of the geometry image supplied from the demultiplexing unit 411. The 2D decoding unit 414 decodes the acquired encoded data of the geometry image by a decoding method for 2D images to generate a geometry image. This decoding method corresponds to the encoding method applied by the 2D encoding unit 318 (FIG. 21) of the encoding device 300 in the encoding of the geometry image. The 2D decoding unit 414 supplies the generated geometry image to the patch reconstruction unit 417.

The 2D decoding unit 415 acquires the encoded data of the occupancy image supplied from the demultiplexing unit 411. The 2D decoding unit 415 decodes the obtained encoded data of the occupancy image by a decoding method for 2D images to generate an occupancy image. This decoding method corresponds to the encoding method applied by the 2D encoding unit 319 (FIG. 21) of the encoding device 300 in the encoding of the occupancy image. The 2D decoding unit 415 supplies the generated occupancy image to the patch reconstruction unit 417.

The 2D decoding unit 416 acquires the encoded data of the texture image supplied from the demultiplexing unit 411. The 2D decoding unit 416 decodes the acquired encoded data of the texture image by a decoding method for 2D images to generate a texture image (texture 454). This decoding method corresponds to the encoding method applied by the 2D encoding unit 320 (FIG. 21) of the encoding device 300 in the encoding of the texture image. The 2D decoding unit 416 outputs the generated texture image (texture 454) to the outside of the decoding device 400 as (data constituting) 3D data using the restored mesh.

The patch reconstruction unit 417 acquires the meta information (the connectivity 451, the UV map 452, and the like) supplied from the meta information decoding unit 413. In addition, the patch reconstruction unit 417 acquires the geometry image supplied from the 2D decoding unit 414. Further, the patch reconstruction unit 417 acquires the occupancy image supplied from the 2D decoding unit 415. The patch reconstruction unit 417 extracts a patch image from the geometry image using the occupancy image and the meta information, and reconstructs a patch corresponding to the extracted patch image. The patch reconstruction unit 417 supplies the reconstructed patch and the used meta information (the connectivity 451, the UV map 452, and the like) to the vertex information reconstruction unit 418.

The vertex information reconstruction unit 418 acquires the patch and the meta information supplied from the patch reconstruction unit 417. The vertex information reconstruction unit 418 reconstructs vertices included in the region of the patch from the acquired patch, and generates vertex information 453. The vertex information reconstruction unit 418 outputs the generated vertex information 453 to the outside of the decoding device 400 as (data constituting) 3D data using the restored mesh. Furthermore, the vertex information reconstruction unit 418 supplies the generated vertex information 453 and meta information (the connectivity 451, the UV map 452, and the like) to the pairing processing unit 419.

The pairing processing unit 419 acquires the pair information supplied from the pair information decoding unit 412. The pair information is information transmitted from the encoding device 300, and may include information described in the section of <2. Transmission of Pair Information> (including the sections of <Generation of Pair Information> to <Application Example>) and the like.

For example, the pair information may be information indicating only a pair constituted by vertices included in the pair information.

The pair information may include information indicating a correspondence between a combination of vertices located at both ends of the first edge and a vertex located in the middle of the first edge and a combination of vertices located at both ends of the second edge and a vertex located in the middle of the second edge with respect to the first edge of the first patch and the second edge of the second patch corresponding to the boundaries between the first patch and the second patch in the object before encoding.

The pair information may include information indicating the correspondence between the scan direction for the first edge at the time of decoding and the scan direction for the second edge at the time of decoding with respect to the first edge of the first patch and the second edge of the second patch corresponding to the boundary between the first patch and the second patch in the object before encoding.

This pair information may indicate that the plurality of vertices of the first patch and the corresponding plurality of vertices of the second patch are each a pair.

The pair information may include a parameter indicating the number of vertices constituting the pair.

The pair information may include information indicating a group including a plurality of vertices of the first patch and a group including a plurality of vertices of the second patch.

The pair information may indicate a pair by using identification information corresponding to a state of each vertex in the object before encoding.

The pair information may indicate a pair on the basis of each coordinate of a plurality of vertices in the two-dimensional plane of the image.

The pair information may indicate relative coordinates of a vertex different from the reference vertex with reference to the coordinates of the reference vertex among the plurality of vertices.

The pair information may indicate relative coordinates of a vertex different from the reference vertex with reference to the position of the relative vector between the first patch and the second patch with reference to the coordinates of the reference vertex among the plurality of vertices.

The pair information may indicate relative coordinates of a vertex different from the reference vertex in the second patch in a state in which the posture is corrected with reference to a position of a relative vector between the first patch and the second patch with reference to the coordinates of the reference vertex among the plurality of vertices.

The pair information may indicate relative coordinates of a vertex different from the reference vertex of the processing target pair with reference to relative coordinates of a vertex different from the reference vertex with reference to coordinates of the reference vertex among the plurality of vertices of another pair.

Furthermore, the pairing processing unit 419 acquires the vertex information 453 and the meta information supplied from the vertex information reconstruction unit 418. The pairing processing unit 419 performs the pairing processing of the vertices included in the vertex information 453 on the basis of the pair information. At that time, the pairing processing unit 419 executes the pairing processing as described in the sections of <Vertex Interpolation>, <Pairing Processing>, <Coordinate Determination Method>, <Application Example>, and the like.

That is, the pairing processing unit 419 (correction unit) corrects the reconstructed mesh on the basis of the pair information.

At that time, the pairing processing unit 419 (correction unit) may delete one of the vertex of the first patch and the vertex of the second patch indicated as a pair by the pair information in the reconstructed mesh, and convert the connection of the deleted vertex to the connection of the other vertex.

Furthermore, the pairing processing unit 419 (correction unit) may move one vertex of the vertex of the first patch and the vertex of the second patch indicated as a pair by the pair information to the position of the other vertex in the reconstructed mesh.

Furthermore, the pairing processing unit 419 (correction unit) may form a polygon including the vertex of the first patch and the vertex of the second patch indicated as a pair by the pair information in the reconstructed mesh.

Furthermore, the pairing processing unit 419 (correction unit) may interpolate vertices that form a pair and are not included in the pair information.

By such pairing processing, the vertex information 453 is appropriately updated. The pairing processing unit 419 outputs the updated vertex information 453 to the outside of the decoding device 400 as (data constituting) 3D data using the restored mesh.

Note that these processing units (demultiplexing unit 411 to pairing processing unit 419) have an arbitrary configuration. For example, each processing unit may be configured by a logic circuit that implements the above-described processing. Furthermore, each processing unit may have, for example, a CPU, a ROM, a RAM, and the like, and execute a program by using the CPU, the ROM, the RAM, and the like to achieve the above-described processing. Needless to say, each processing unit may have both the configurations, and a part of the above-described processing may be achieved by the logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Flow of Decoding Process>

Figure 24:
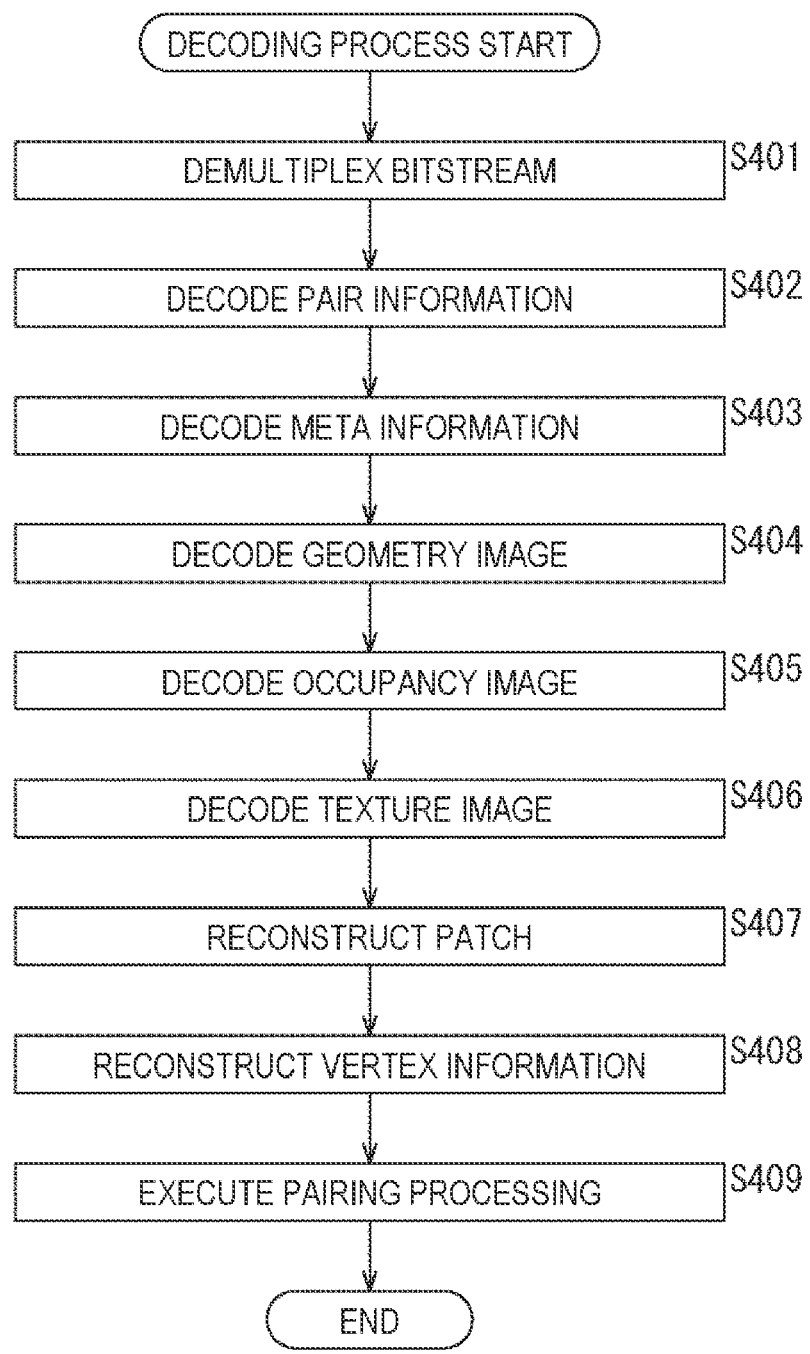
FIG. 24 is a flowchart for explaining an example of a flow of a decoding process.

An example of a flow of a decoding process executed by this decoding device 400 will be described with reference to a flowchart of FIG. 24.

When the decoding process is started, the demultiplexing unit 411 demultiplexes the bitstream input to the decoding device 400 in step S401. By this demultiplexing, the demultiplexing unit 411 extracts the encoded data of the pair information from the bitstream. Further, the demultiplexing unit 411 extracts the encoded data of the meta information from the bitstream. Furthermore, the demultiplexing unit 411 extracts the encoded data of the geometry image from the bitstream. Further, the demultiplexing unit 411 extracts the encoded data of the occupancy image from the bitstream. Furthermore, the demultiplexing unit 411 extracts the encoded data of the texture image from the bitstream.

In step S402, the pair information decoding unit 412 decodes the encoded data of the pair information extracted from the bitstream in step S401 by a predetermined decoding method to generate (restore) the pair information. The pair information is information transmitted from the encoding device 300, and may include information described in the section of <2. Transmission of Pair Information> (including the sections of <Generation of Pair Information> to <Application Example>) and the like.

That is, the pair information decoding unit 412 (decoding unit) decodes encoded data of pair information indicating a pair constituted by a single vertex of a mesh or a plurality of vertices of a patch generated from a plurality of vertices at the same position by dividing the mesh representing the object of the three-dimensional structure into patches, and obtains the pair information.

For example, the pair information may be information indicating only a pair constituted by vertices included in the pair information.

The pair information may include information indicating a correspondence between a combination of vertices located at both ends of the first edge and a vertex located in the middle of the first edge and a combination of vertices located at both ends of the second edge and a vertex located in the middle of the second edge with respect to the first edge of the first patch and the second edge of the second patch corresponding to the boundaries between the first patch and the second patch in the object before encoding.

The pair information may include information indicating the correspondence between the scan direction for the first edge at the time of decoding and the scan direction for the second edge at the time of decoding with respect to the first edge of the first patch and the second edge of the second patch corresponding to the boundary between the first patch and the second patch in the object before encoding.

This pair information may indicate that the plurality of vertices of the first patch and the corresponding plurality of vertices of the second patch are each a pair.

The pair information may include a parameter indicating the number of vertices constituting the pair.

The pair information may include information indicating a group including a plurality of vertices of the first patch and a group including a plurality of vertices of the second patch.

The pair information may indicate a pair by using identification information corresponding to a state of each vertex in the object before encoding.

The pair information may indicate a pair on the basis of each coordinate of a plurality of vertices in the two-dimensional plane of the image.

The pair information may indicate relative coordinates of a vertex different from the reference vertex with reference to the coordinates of the reference vertex among the plurality of vertices.

The pair information may indicate relative coordinates of a vertex different from the reference vertex with reference to the position of the relative vector between the first patch and the second patch with reference to the coordinates of the reference vertex among the plurality of vertices.

The pair information may indicate relative coordinates of a vertex different from the reference vertex in the second patch in a state in which the posture is corrected with reference to a position of a relative vector between the first patch and the second patch with reference to the coordinates of the reference vertex among the plurality of vertices.

The pair information may indicate relative coordinates of a vertex different from the reference vertex of the processing target pair with reference to relative coordinates of a vertex different from the reference vertex with reference to coordinates of the reference vertex among the plurality of vertices of another pair.

Note that the decoding method applied in this processing is arbitrary as long as it corresponds to the encoding method applied in step S306 (FIG. 22) of the encoding processing.

In step S403, the meta information decoding unit 413 decodes the encoded data of the meta information extracted from the bitstream in step S401, and generates (restores) the meta information. This meta information includes the connectivity 451 and the UV map 452.

In step S404, the 2D decoding unit 414 decodes the encoded data of the geometry image extracted from the bitstream in step S401, and generates (restores) the geometry image.

In step S405, the 2D decoding unit 415 decodes the encoded data of the occupancy image extracted from the bitstream in step S401, and generates (restores) the occupancy image.

In step S406, the 2D decoding unit 416 decodes the encoded data of the texture image extracted from the bitstream in step S401, and generates (restores) the texture image (texture 454).

In step S407, the patch reconstruction unit 417 extracts a patch image from the geometry image generated in step S404 by using the meta information (the connectivity 451, the UV map 452, and the like) generated in step S402, and reconstructs a patch corresponding to the patch image.

In step S408, the vertex information reconstruction unit 418 reconstructs vertices included in the region of the patch from the patch reconstructed in step S407, and generates the vertex information 453.

In step S409, the pairing processing unit 419 performs the pairing processing of the vertices included in the vertex information 453 on the basis of the pair information generated (restored) in step S402. At that time, the pairing processing unit 419 executes the pairing processing as described in the sections of <Vertex Interpolation>, <Pairing Processing>, <Coordinate Determination Method>, <Application Example>, and the like.

That is, the pairing processing unit 419 (correction unit) corrects the reconstructed mesh on the basis of the pair information.

At that time, the pairing processing unit 419 (correction unit) may delete one of the vertex of the first patch and the vertex of the second patch indicated as a pair by the pair information in the reconstructed mesh, and convert the connection of the deleted vertex to the connection of the other vertex.

Furthermore, the pairing processing unit 419 (correction unit) may move one vertex of the vertex of the first patch and the vertex of the second patch indicated as a pair by the pair information to the position of the other vertex in the reconstructed mesh.

Furthermore, the pairing processing unit 419 (correction unit) may form a polygon including the vertex of the first patch and the vertex of the second patch indicated as a pair by the pair information in the reconstructed mesh.

Furthermore, the pairing processing unit 419 (correction unit) may interpolate vertices that form a pair and are not included in the pair information.

By such pairing processing, the vertex information 453 is appropriately updated.

When the processing of step S409 ends, the decoding process ends.

The decoding device 400 has the above-described configuration, and executes the pairing processing on the basis of the pair information transmitted from the encoding device 300 by executing the above-described various types of processing. As a result, the decoding device 400 can more reliably suppress the occurrence of cracks and perform the pairing processing between more appropriate vertices. Therefore, the decoding device 400 can suppress a reduction in the quality of the 3D data due to encoding and decoding.

5. Derivation of Correct Coordinates

In the pairing processing, as a method of determining the coordinates of the vertex after conversion when the vertices constituting the pair are converted into one vertex, for example, the coordinates of the vertex before encoding (also referred to as correct coordinates) may be used as the coordinates of the vertex after conversion. That is, in the pairing processing, the vertex moved by encoding and decoding may be returned to the original position.

Figure 25:
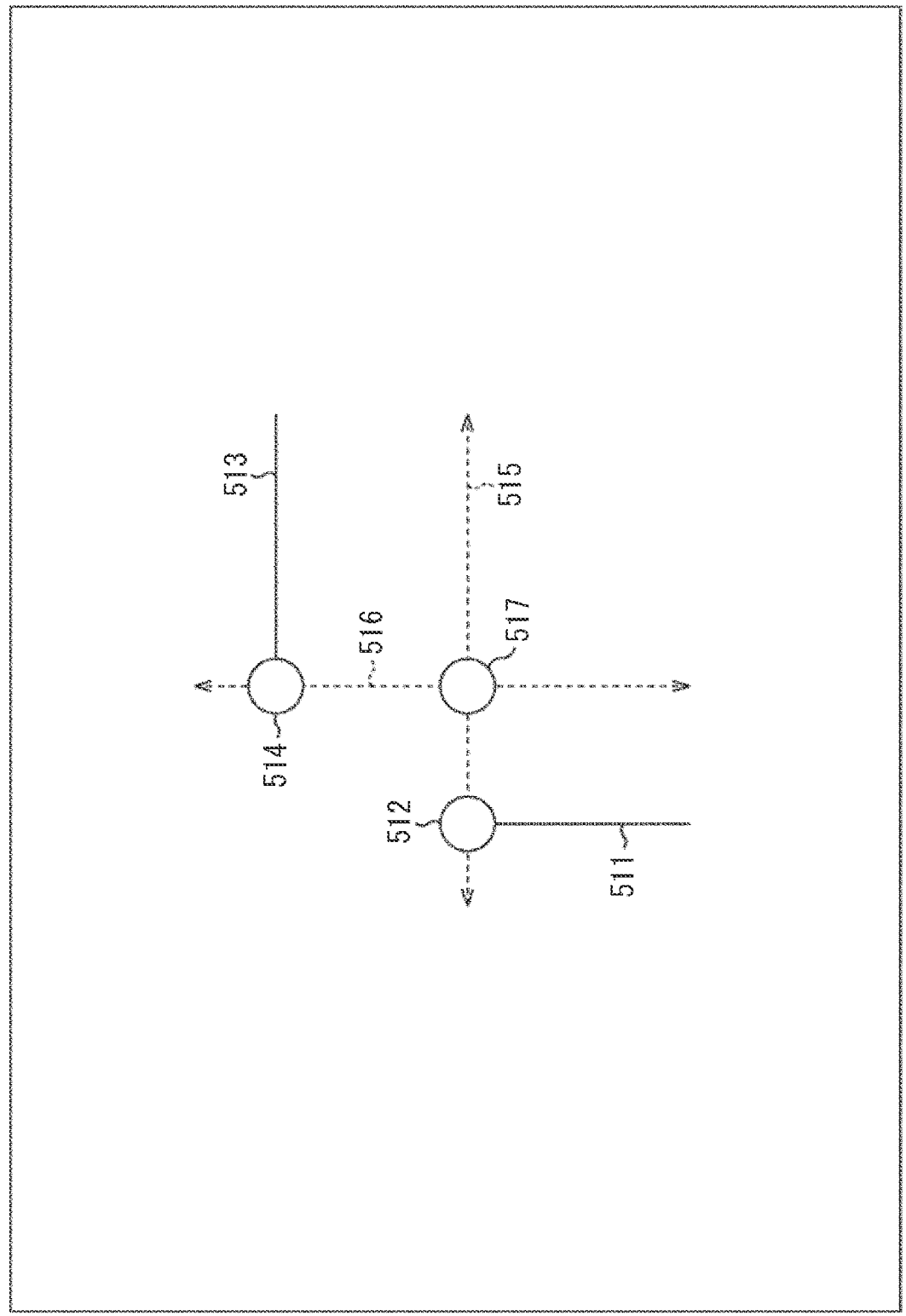
FIG. 25 is a diagram for explaining an example of deriving correct coordinates.

For example, when the projection directions of the patches of the respective vertices constituting the pair are different from each other in the three-dimensional space, the intersection of the straight lines in the projection directions passing through the respective vertices is the coordinates (correct coordinates) of the vertex before encoding. For example, as illustrated in FIG. 25, it is assumed that the vertex 512 of the patch 511 and the vertex 514 of the patch 513 constitute a pair, and the projection direction of the patch 511 (that is, the normal direction of the projection plane of the patch 511) and the projection direction of the patch 513 (that is, the normal direction of the projection plane of the patch 513) are different from each other. In this case, the intersection point 517 of the normal line 515 of the projection plane of the patch 511 passing through the vertex 512 and the normal line 516 of the projection plane of the patch 513 passing through the vertex 514 is the correct coordinates. Therefore, the decoding device can obtain the correct coordinates from the patch of the geometry.

That is, when the normal direction of the first patch does not match the normal direction of the second patch in the pairing processing, the correction unit of the decoding device may move the vertex of the first patch and the vertex of the second patch constituting the pair to the intersection of the normal line of the first patch and the normal line of the second patch.

Figure 26:
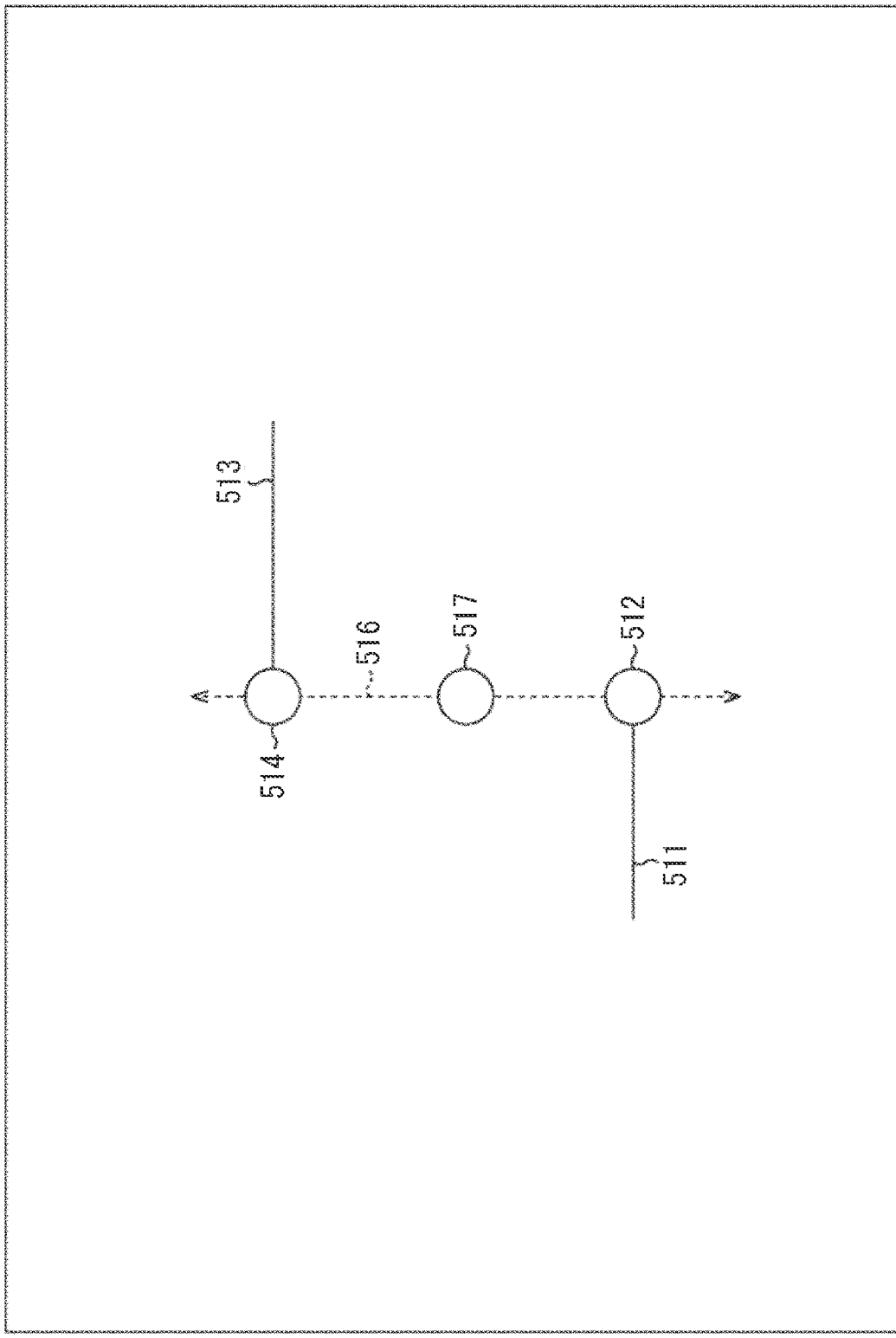
FIG. 26 is a diagram for explaining an example of deriving correct coordinates.

On the other hand, in a case where the projection directions of the patches of the respective vertices constituting the pair in the three-dimensional space are the same as each other (in the case of the positive direction or the reverse direction), the intersection of the straight lines in the projection directions passing through the respective vertices cannot be obtained. Therefore, the decoding device cannot obtain the correct coordinates from the patch of the geometry. For example, as illustrated in FIG. 26, it is assumed that the vertex 512 of the patch 511 and the vertex 514 of the patch 513 constitute a pair, and the projection direction of the patch 511 (that is, the normal direction of the projection plane of the patch 511) and the projection direction of the patch 513 (that is, the normal direction of the projection plane of the patch 513) are the same (positive direction or reverse direction). In this case, both the normal line of the projection plane of the patch 511 passing through the vertex 512 and the normal line of the projection plane of the patch 513 passing through the vertex 514 become the normal line 516, and thus, it is not possible to obtain the intersection (correct coordinates) of the normal line from the coordinates of each vertex.

As described above, when the projection directions of the patches of the respective vertices constituting the pair are the same in the three-dimensional space, for example, the pairing processing may be performed with the average of the coordinates of the respective vertices as the correct coordinates. That is, when the normal direction of the first patch matches the normal direction of the second patch, the correction unit of the decoding device may move the vertices of the first patch and the vertices of the second patch constituting the pair to the positions of the weighted average of the respective positions. For example, in the case of FIG. 26, the component of the correct coordinates in the projection plane direction is the same as the vertex 512 and the vertex 514, and the component of the correct coordinates in the direction of the normal line 516 is the average of the coordinates of the vertex 512 and the coordinates of the vertex 514.

Furthermore, when the projection directions of the patches of the respective vertices constituting the pair are the same in the three-dimensional space, for example, coordinates (correct coordinates) before encoding for each pair may be transmitted as pair information from the encoding device to the decoding device. That is, the pair information may include information indicating the position to be the movement destination when the vertices constituting the pair are moved to the same position in the pairing processing. In this case, the encoding device stores the correct coordinates for each pair in the pair information. Then, in the pairing processing, the decoding device moves each vertex constituting the pair to the correct coordinates included in the pair information. As described above, when the normal direction of the first patch matches the normal direction of the second patch, the correction unit of the decoding device may move the vertex of the first patch and the vertex of the second patch constituting the pair to the position indicated by the pair information.

Even in these cases, the decoder can more reliably suppress the occurrence of cracks and perform the pairing processing between more appropriate vertices. That is, it is possible to suppress a reduction in the quality of 3D data due to encoding and decoding.

6. Pairing Processing in Two Dimensions

Figure 27:
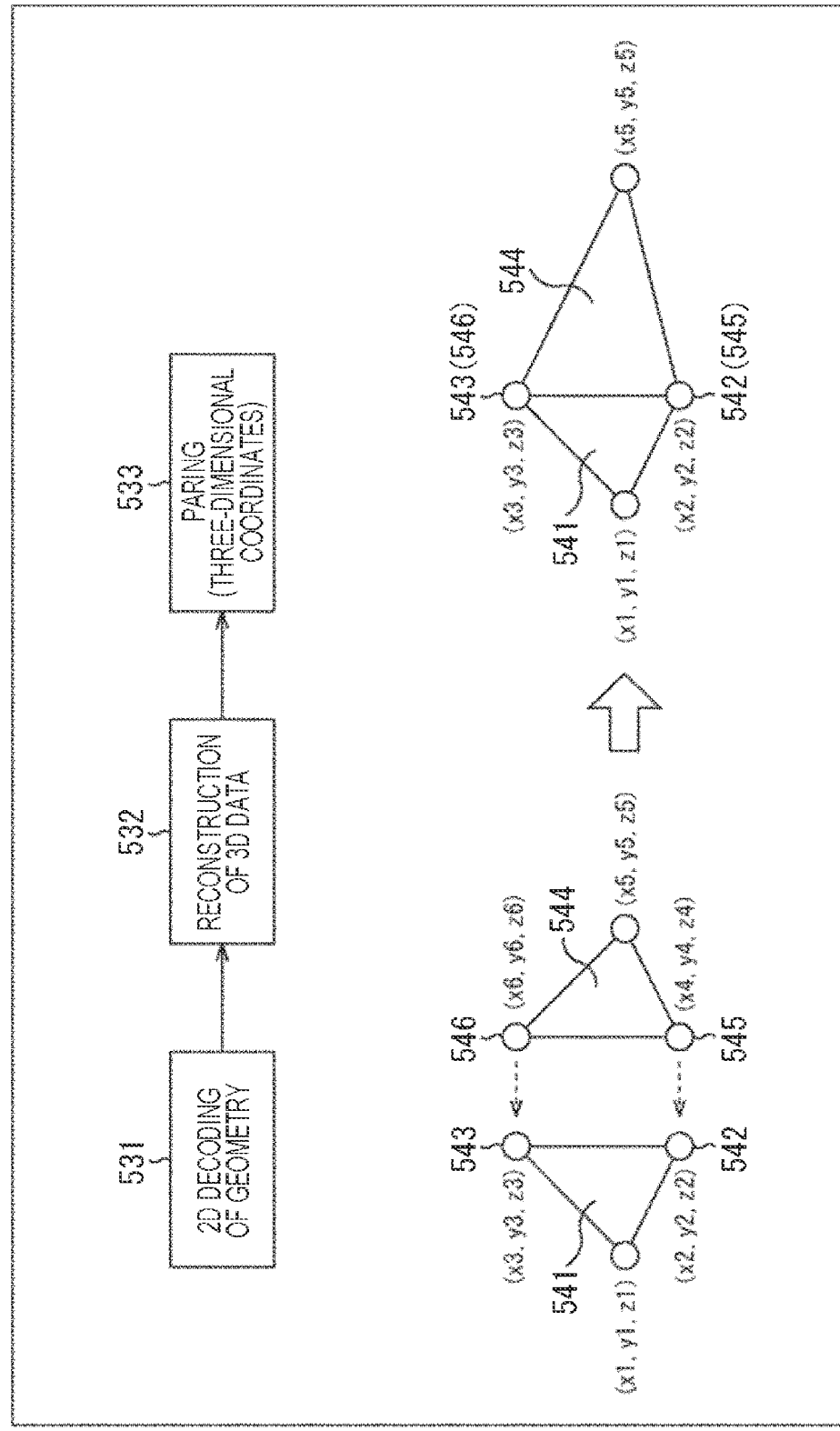
FIG. 27 is a diagram for explaining an example of pairing processing.

In the second embodiment, the pairing processing is performed in a three-dimensional space (that is, the three-dimensional coordinates of each vertex constituting the pair are corrected). That is, in this case, for example, as illustrated in FIG. 27, 2D decoding of geometry 531 is performed, reconstruction of 3D data 532 is performed, and then pairing processing 533 is performed on the 3D data in the three-dimensional space. For example, as illustrated in FIG. 27, it is assumed that the vertex 542 of the polygon 541 and the vertex 545 of the polygon 544 constitute a pair, and the vertex 543 of the polygon 541 and the vertex 546 of the polygon 544 constitute a pair. Then, it is assumed that the vertex 545 is moved to the position of the vertex 542 and the vertex 546 is moved to the position of the vertex 543 by the pairing processing. In this case, the three-dimensional coordinates (x4, y4, z4) of the vertex 545 are converted into the three-dimensional coordinates (x2, y2, z2) of the vertex 542 by the pairing processing. Further, the three-dimensional coordinates (x6, y6, z6) of the vertex 546 are converted into the three-dimensional coordinates (x3, y3, z3) of the vertex 543.

Figure 28:
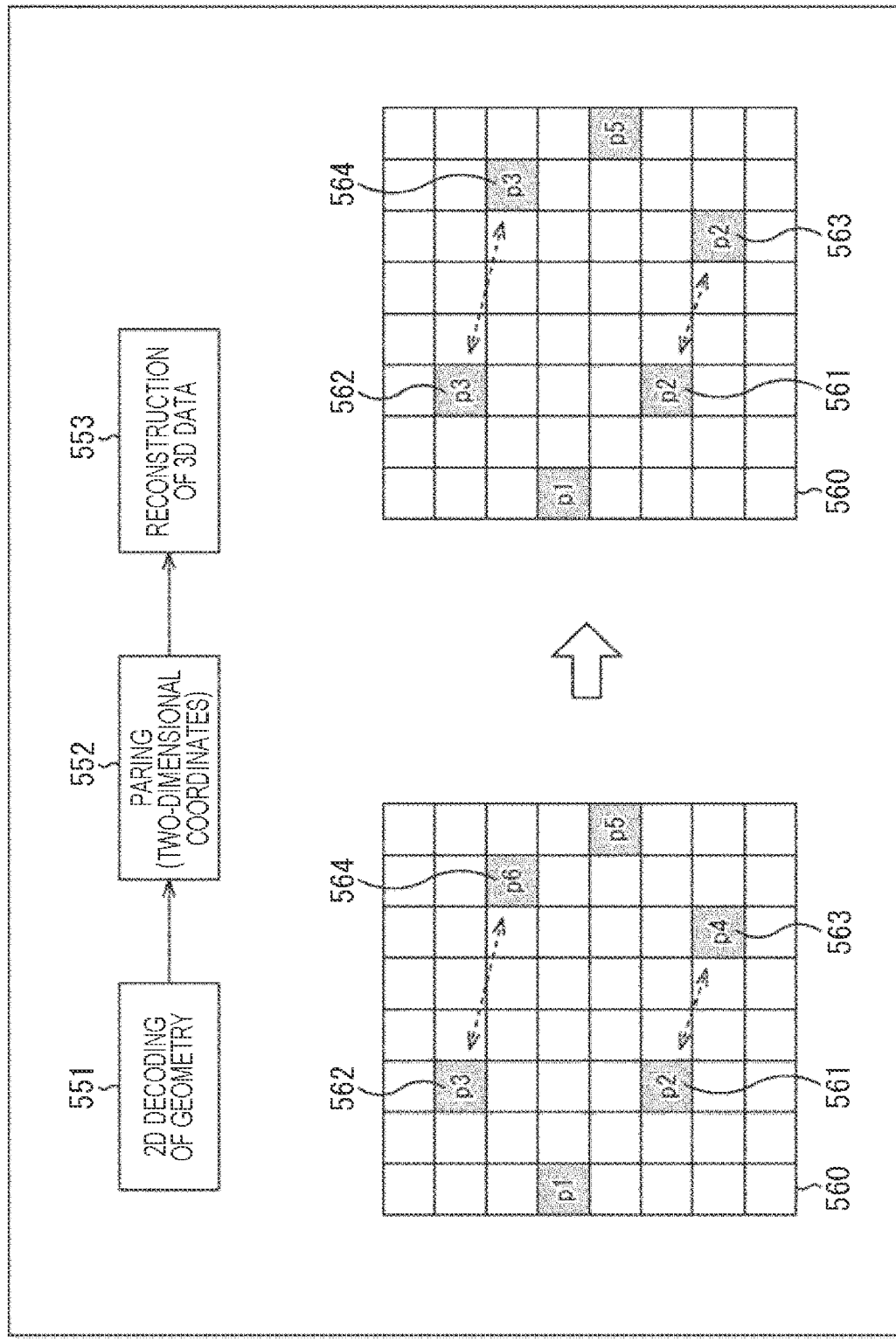
FIG. 28 is a diagram for explaining an example of pairing processing.

The pairing processing is not limited to this example, and may be performed in a two-dimensional plane, for example. For example, as illustrated in FIG. 28, after 2D decoding of geometry 551 is performed, pairing processing 552 may be performed on the two-dimensional plane, and then reconstruction of 3D data 553 may be performed. The two-dimensional plane may be, for example, a geometry image (depth image) or a two-dimensional plane (xyz image) on a three-dimensional space. In the case of the pairing processing performed on the two-dimensional plane, the pixel value p corresponding to each vertex constituting the pair of the two-dimensional plane is updated. For example, as illustrated in FIG. 28, it is assumed that the vertex corresponding to the pixel 561 and the vertex corresponding to the pixel 563 of the two-dimensional plane 560 constitute a pair, and the vertex corresponding to the pixel 562 and the vertex corresponding to the pixel 564 constitute a pair. In addition, it is assumed that, by the pairing processing, the vertex corresponding to the pixel 563 is moved to the three-dimensional position of the vertex corresponding to the pixel 561, and the vertex corresponding to the pixel 564 is moved to the three-dimensional position of the vertex corresponding to the pixel 562. In this case, the pixel value (p4) of the pixel 563 is updated to the same pixel value (p2) as the pixel 561 by the pairing processing in the two-dimensional plane. Similarly, the pixel value (p6) of the pixel 564 is updated to the same pixel value (p3) as the pixel 562. For example, when the two-dimensional plane is a geometry image (depth image), the pixel value indicates a depth value (coordinates in a normal direction of a patch in a three-dimensional space). Furthermore, when this two-dimensional plane is an xyz image, the pixel value indicates (x, y, z) coordinates.

That is, the correction unit of the decoding device may move the vertices of the first patch and the vertices of the second patch constituting the pair to the same position in the geometry image generated by decoding the encoded data, the patch construction unit may reconstruct the patch using the geometry image corrected by the correction unit, and the vertex reconstruction unit may reconstruct the vertices using the reconstructed patch.

The method of determining the positions (correct coordinates) of the corrected vertices in a case where the pairing processing is performed on the two-dimensional plane in this manner is similar to the case of the pairing processing in the three-dimensional space. For example, when the projection directions of the vertices constituting the pair are the same, the decoding device may derive correct coordinates (average or the like) using the pixel values of the vertices and move the vertices to the correct coordinates. In addition, as described above, the decoding device may move the vertex using the correct coordinates stored in the pair information. On the other hand, when the projection directions of the vertices constituting the pair are different from each other, the decoding device may derive the three-dimensional coordinates of the vertices, obtain the correct coordinates (three-dimensional coordinates) using the three-dimensional coordinates, and update the pixel values corresponding to the vertices on the two-dimensional plane such that the vertices move to the three-dimensional coordinates.

Even in these cases, the decoder can more reliably suppress the occurrence of cracks and perform the pairing processing between more appropriate vertices. That is, it is possible to suppress a reduction in the quality of 3D data due to encoding and decoding.

7. Third Embodiment

<Encoding Device>

Figure 29:
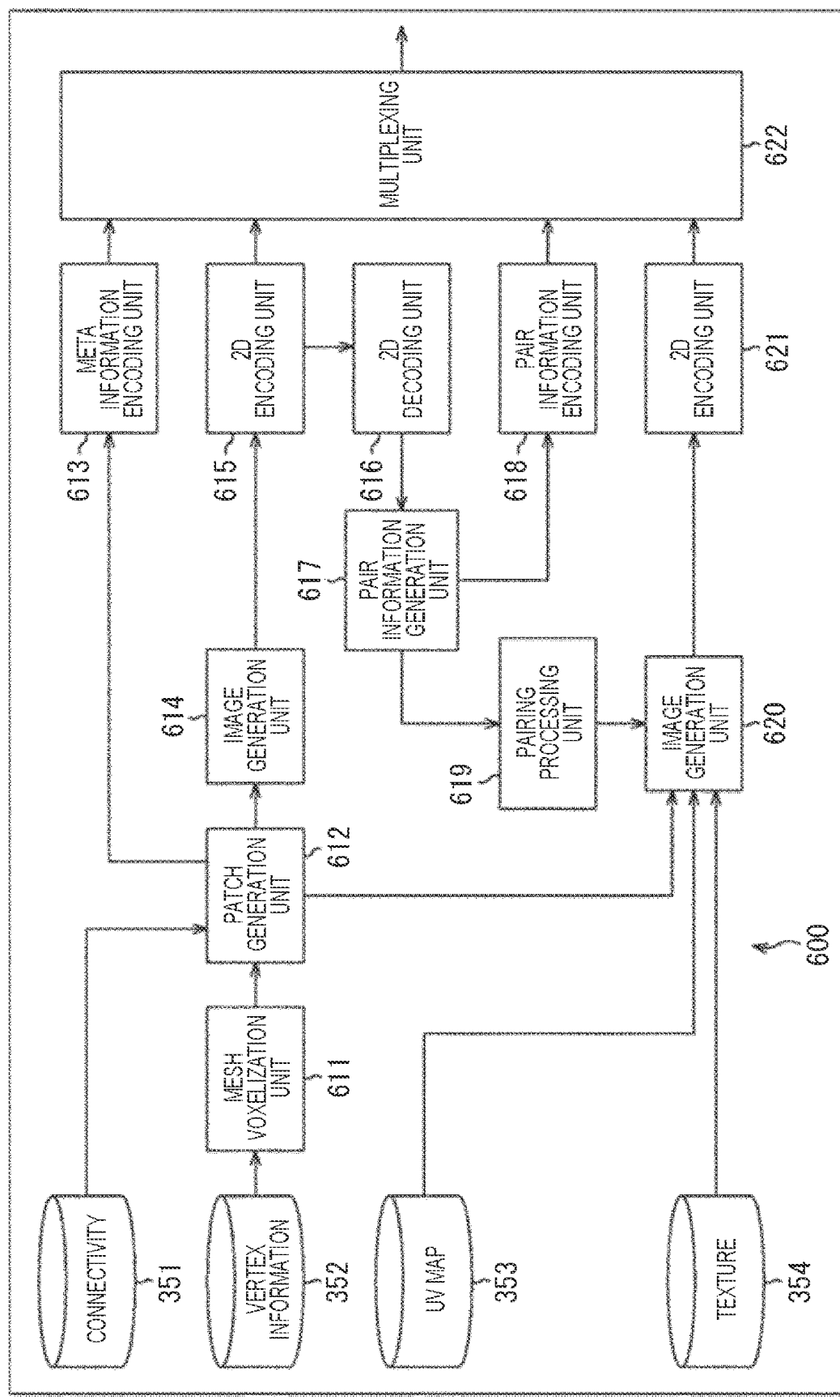
FIG. 29 is a block diagram illustrating a main configuration example of an encoding device.

FIG. 29 is a block diagram illustrating another example of the configuration of an encoding device which is an embodiment of an information processing apparatus to which the present technology is applied. Similarly to the encoding device 300 illustrated in FIG. 21, an encoding device 600 illustrated in FIG. 29 is a device that extends the VPCC and encodes 3D data using mesh as a video frame by an encoding method for two-dimensional images. The encoding device 600 has a local decoding function, decodes the encoded geometry, and updates the texture image using the decoding result. At that time, the encoding device 600 generates the pair information or performs the pairing processing by applying a single method or a combination of a plurality of methods among the above-described various methods of the present technology.

Note that, in FIG. 29, main processing units, data flows, and the like are illustrated, and those illustrated in FIG. 29 are not necessarily all. That is, in the encoding device 600, there may be a processing unit not illustrated as a block in FIG. 29, or there may be processing or a data flow not illustrated as an arrow or the like in FIG. 29.

As illustrated in FIG. 29, the encoding device 600 includes a mesh voxelization unit 611, a patch generation unit 612, a meta information encoding unit 613, an image generation unit 614, a 2D encoding unit 615, a 2D decoding unit 616, a pair information generation unit 617, a pair information encoding unit 618, a pairing processing unit 619, an image generation unit 620, a 2D encoding unit 621, and a multiplexing unit 622.

Similarly to the case of the encoding device 300, the encoding device 600 is supplied with the connectivity 351, the vertex information 352, the UV map 353, and the texture 354 as the 3D data using the mesh.

The mesh voxelization unit 611 is a processing unit similar to the mesh voxelization unit 311, and executes processing similar to the mesh voxelization unit 311. For example, the mesh voxelization unit 611 acquires the vertex information 352 supplied to the encoding device 600. The mesh voxelization unit 611 converts coordinates of each vertex included in the acquired vertex information 352 into a voxel grid. The mesh voxelization unit 611 supplies the vertex information 352 of the voxel grid after the conversion to the patch generation unit 612.

The patch generation unit 612 is a processing unit similar to the patch generation unit 312, and executes processing similar to the patch generation unit 312. For example, the patch generation unit 612 acquires the connectivity 351 supplied to the encoding device 600. In addition, the patch generation unit 612 acquires the vertex information 352 of the voxel grid supplied from the mesh voxelization unit 611. The patch generation unit 612 generates a patch of geometry on the basis of the information. In addition, the patch generation unit 612 projects a patch of the generated geometry onto the projection plane to generate a patch image. The patch generation unit 612 supplies information such as the connectivity 351 and the vertex information 352 to the meta information encoding unit 613 as meta information. In addition, the patch generation unit 612 supplies the generated patch image to the image generation unit 614 and the image generation unit 620.

The meta information encoding unit 613 is a processing unit similar to the meta information encoding unit 317, and performs processing similar to the processing of the meta information encoding unit 317. The meta information encoding unit 613 acquires the meta information (including the connectivity 351, the vertex information 352, and the like) supplied from the patch generation unit 612. The meta information encoding unit 613 encodes the acquired meta information to generate encoded data of the meta information. The meta information encoding unit 613 supplies the encoded data of the generated meta information to the multiplexing unit 622.

The image generation unit 614 acquires the patch image supplied from the patch generation unit 612. The image generation unit 614 arranges the patch image on a two-dimensional plane to generate a geometry image. The image generation unit 614 supplies the generated geometry image to the 2D encoding unit 615 as a geometry video frame. The image generation unit 614 also generates an occupancy image corresponding to the geometry image. The image generation unit 614 supplies the generated occupancy image to the 2D encoding unit 615.

The 2D encoding unit 615 acquires the geometry image and the occupancy image supplied from the image generation unit 614. The 2D encoding unit 615 encodes the acquired geometry image by an encoding method for 2D images, and generates encoded data of the geometry image. That is, the 2D encoding unit 615 can also be said to be a geometry encoding unit that encodes a geometry image and generates encoded data of the geometry image. The 2D encoding unit 615 supplies the encoded data of the generated geometry image to the 2D decoding unit 616 and the multiplexing unit 622. In addition, the 2D encoding unit 615 encodes the acquired occupancy image by an encoding method for 2D images, and generates encoded data of the occupancy image. The 2D encoding unit 615 supplies the multiplexing unit 622 with the encoded data of the generated occupancy image.

The 2D decoding unit 616 acquires the encoded data of the geometry image supplied from the 2D encoding unit 615. The 2D decoding unit 616 decodes the acquired encoded data of the geometry image by a decoding method for 2D images, and generates (restores) the geometry image. That is, the 2D decoding unit 616 can also be said to be a geometry decoding unit that decodes the encoded data of the geometry image and generates the geometry image. The 2D decoding unit 616 supplies the generated geometry image to the pair information generation unit 617.

The pair information generation unit 617 acquires the geometry image supplied from the 2D decoding unit 616. In addition, the pair information generation unit 617 may acquire information such as the connectivity 351, the vertex information 352, and the UV map 353 as necessary. The pair information generation unit 617 generates pair information indicating a pair constituted by one vertex or a plurality of vertices that have been overlapping points in the mesh on the basis of the information. That is, the pair information generation unit 617 divides a mesh representing an object having a three-dimensional structure into at least a first patch and a second patch and arranges the first patch and the second patch in a single image, and generates pair information indicating that at least one vertex of the first patch and at least one vertex of the second patch located at the same position as the position of the vertex of the first patch in the object before encoding are paired. Then, the pair information generation unit 617 generates the pair information on the basis of the geometry image generated by the geometry decoding unit. This pair information may include the information described in the section of <2. Transmission of Pair Information>, the section of <5. Derivation of Correct Coordinates>, the section of <6. Pairing Processing in Two Dimensions>, and the like. The pair information generation unit 617 supplies the generated pair information to the pair information encoding unit 618. Furthermore, the pair information generation unit 617 supplies the generated pair information and the acquired information (geometry image, meta information, and the like) to the pairing processing unit 619.

The pair information encoding unit 618 acquires the pair information supplied from the pair information generation unit 617. The pair information encoding unit 618 encodes the acquired pair information by a predetermined encoding method, and generates encoded data of the pair information. This encoding method is arbitrary. The pair information encoding unit 618 supplies the encoded data of the generated pair information to the multiplexing unit 622.

The pairing processing unit 619 acquires the pair information, the geometry image, the meta information, and the like supplied from the pair information generation unit 617. The pairing processing unit 619 performs the pairing processing on the patch included in the geometry image on the basis of the acquired pair information. At that time, the pairing processing unit 619 executes the pairing processing as described in the section of <2. Transmission of Pair Information>, the section of <5. Derivation of Correct Coordinates>, the section of <6. Pairing Processing in Two Dimensions>, and the like. Note that the pairing processing unit 619 may perform the pairing processing in a two-dimensional plane or in a three-dimensional space. When the pairing processing is performed in the three-dimensional space, the pairing processing unit 619 reconstructs the 3D data using the geometry image, then performs the pairing processing, and generates the geometry image using the 3D data after the pairing processing. The pairing processing unit 619 supplies the geometry image subjected to the pairing processing to the image generation unit 620.

The image generation unit 620 acquires the UV map 353 and the texture 354 input to the encoding device 600. In addition, the image generation unit 620 acquires the patch image supplied from the patch generation unit 612. Furthermore, the image generation unit 620 acquires the geometry image after the pairing processing supplied from the pairing processing unit 619. The image generation unit 620 updates the texture 354 using the acquired patch image, geometry image, UV map 353, and the like, and generates a texture image corresponding to the geometry image after the pairing processing. Furthermore, the image generation unit 620 may also update the UV map 353 as necessary. The image generation unit 620 supplies the generated texture image to the 2D encoding unit 621.

The 2D encoding unit 621 acquires the texture image supplied from the image generation unit 620. The 2D encoding unit 621 encodes the acquired texture image by an encoding method for 2D images, and generates encoded data of the texture image. The 2D encoding unit 621 supplies the encoded data of the generated texture image to the multiplexing unit 622.

The multiplexing unit 321 acquires the encoded data of the meta information supplied from the meta information encoding unit 613. Further, the multiplexing unit 622 acquires the encoded data of the geometry image and the encoded data of the occupancy image supplied from the 2D encoding unit 615. Furthermore, the multiplexing unit 622 acquires the encoded data of the pair information supplied from the pair information encoding unit 618. Further, the multiplexing unit 622 acquires the encoded data of the texture image supplied from the 2D encoding unit 621. The multiplexing unit 622 multiplexes the acquired information to generate one bitstream. The multiplexing unit 622 outputs the generated bitstream to the outside of the encoding device 600.

With such a configuration, in the encoding device 600, the decoder can more reliably suppress the occurrence of cracks and perform the pairing processing between more appropriate vertices. That is, the encoding device 600 can suppress a reduction in the quality of the 3D data due to encoding and decoding.

Note that these processing units (mesh voxelization unit 611 to multiplexing unit 622) have an arbitrary configuration. For example, each processing unit may be configured by a logic circuit that implements the above-described processing. In addition, each processing unit may include a central processing unit (CPU), a read-only memory (ROM), a random-access memory (RAM), and the like, for example, and execute a program by using them to realize the above-described processing. Needless to say, each processing unit may have both the configurations, and a part of the above-described processing may be achieved by the logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Flow of Encoding Process>

Figure 30:
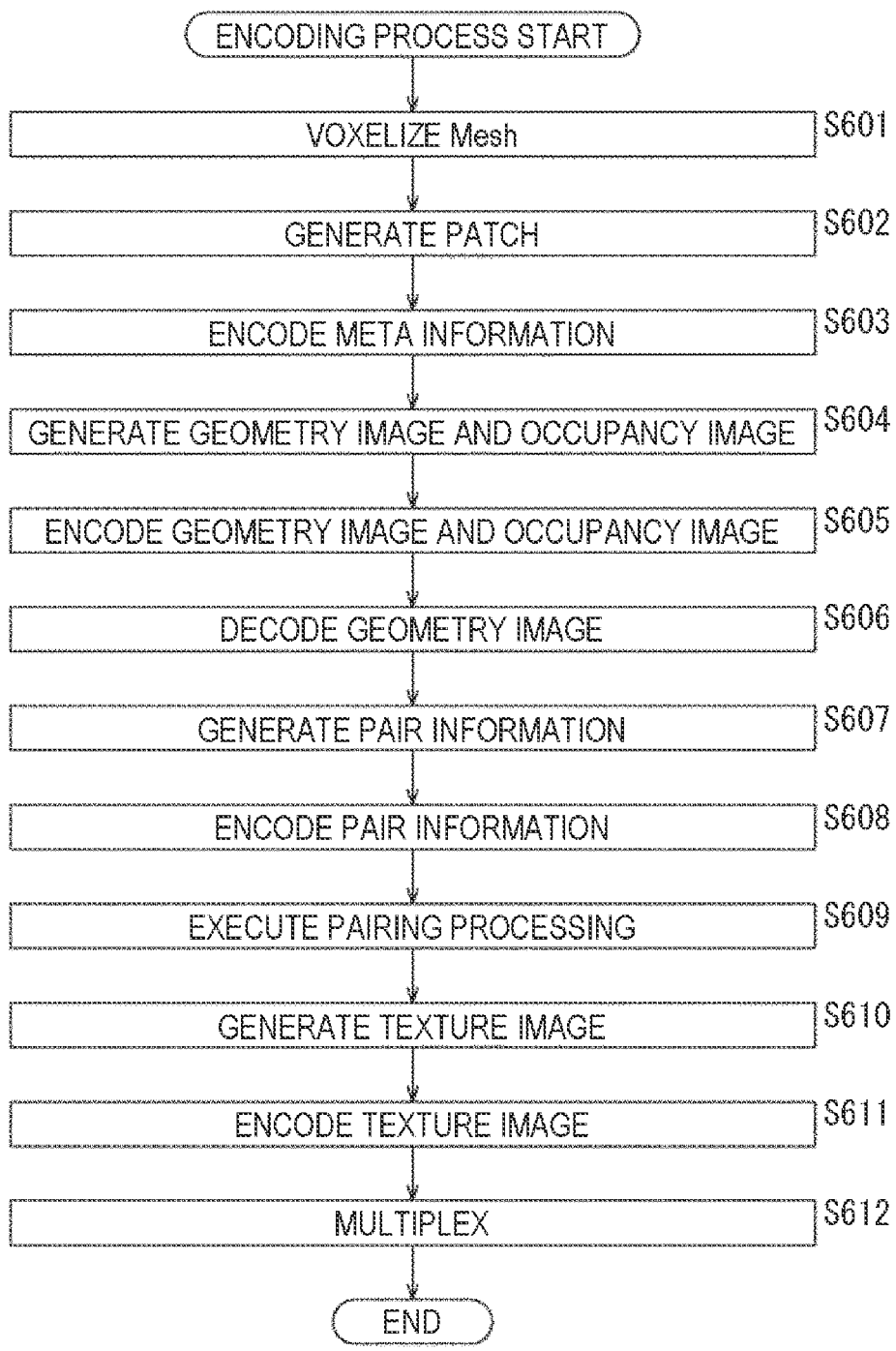
FIG. 30 is a flowchart for explaining an example of a flow of an encoding process.

An example of a flow of an encoding process executed by the encoding device 600 will be described with reference to a flowchart in FIG. 30.

When the encoding process is started, in step S601, the mesh voxelization unit 611 voxelizes the coordinates of each vertex included in the vertex information 352 to voxelize the mesh.

In step S602, the patch generation unit 612 generates a patch using the vertex information 352 and the like voxelized in step S601, projects the generated patch on the projection plane, and generates a patch image.

In step S603, the meta information encoding unit 613 encodes the meta information (the connectivity 351, the UV map 353, or the like) to generate encoded data of the meta information.

In step S604, the image generation unit 614 generates a geometry image and an occupancy image on the basis of the patch image and the UV map 353 generated in step S602.

In step S605, the 2D encoding unit 615 encodes the geometry image generated in step S604, and generates encoded data of the geometry image. In addition, the 2D encoding unit 615 encodes the occupancy image generated in step S604, and generates encoded data of the occupancy image.

In step S606, the 2D decoding unit 616 decodes the encoded data of the geometry image generated in step S605 to generate the geometry image.

In step S607, the pair information generation unit 617 generates pair information indicating a pair constituted by one vertex or a plurality of vertices that are overlapping points in the mesh by using the geometry image, the meta information, and the like generated in step S606. This pair information may include the information described in the section of <2. Transmission of Pair Information>, the section of <5. Derivation of Correct Coordinates>, the section of <6. Pairing Processing in Two Dimensions>, and the like.

In step S608, the pair information encoding unit 618 encodes the pair information generated in step S607 by a predetermined encoding method, and generates encoded data of the pair information. This encoding method is arbitrary.

In step S609, the pairing processing unit 619 performs the pairing processing on the geometry image generated in step S606 on the basis of the pair information or the like generated in step S607. At that time, the pairing processing unit 619 executes the pairing processing as described in the section of <2. Transmission of Pair Information>, the section of <5. Derivation of Correct Coordinates>, the section of <6. Pairing Processing in Two Dimensions>, and the like.

In step S610, the image generation unit 620 updates the texture 354 using the patch image generated in step S602 and the geometry image after the pairing processing generated in step S609, and generates a texture image.

In step S611, the 2D encoding unit 621 encodes the texture image generated in step S610, and generates encoded data of the texture image.

In step S612, the multiplexing unit 622 multiplexes the encoded data of the meta information generated in step S603, the encoded data of the geometry image and the encoded data of the occupancy image generated in step S605, the encoded data of the pair information generated in step S608, and the encoded data of the texture image generated in step S611 to generate a bitstream.

By executing each processing in this manner, in the encoding device 600, the decoder can more reliably suppress the occurrence of cracks and perform the pairing processing between more appropriate vertices. That is, the encoding device 600 can suppress a reduction in the quality of the 3D data due to encoding and decoding.

8. Fourth Embodiment

<Decoding Device>

Figure 31:
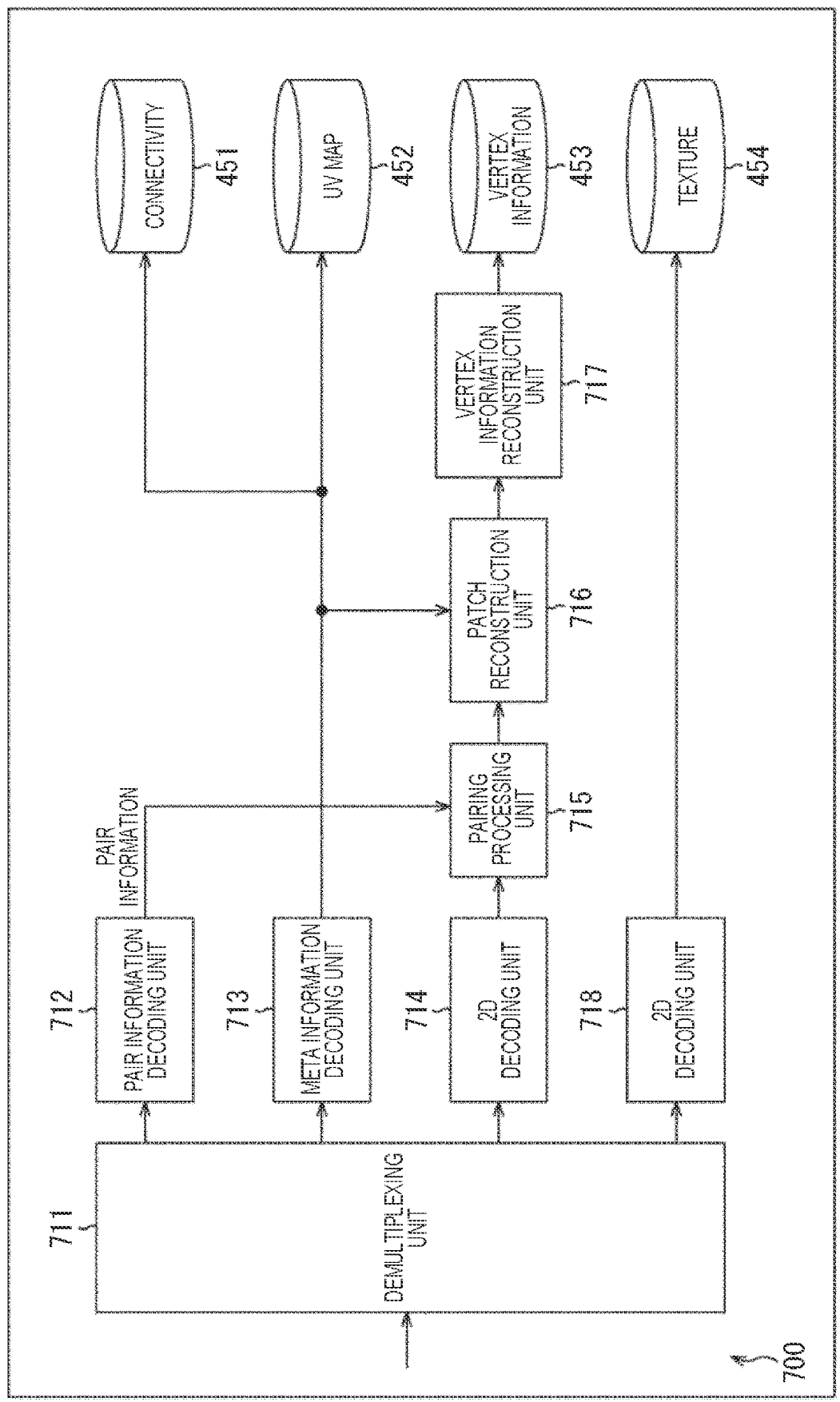
FIG. 31 is a block diagram illustrating a main configuration example of a decoding device.

FIG. 31 is a block diagram illustrating an example of a configuration of a decoding device which is an aspect of an image processing device to which the present technology is applied. Similarly to the decoding device 400 illustrated in FIG. 23, a decoding device 700 illustrated in FIG. 31 is a device that extends the VPCC and decodes encoded data obtained by encoding 3D data using a mesh as a video frame by an encoding method for two-dimensional images by a decoding method for two-dimensional images to generate (reconstruct) 3D data using a mesh. At that time, the decoding device 700 decodes the encoded data and reconstructs the 3D data by applying a single method or a combination of a plurality of methods among the various methods of the present technology described above. However, the decoding device 700 performs the pairing processing on the two-dimensional plane.

Note that, in FIG. 31, main processing units, data flows, and the like are illustrated, and those illustrated in FIG. 31 are not necessarily all. That is, in the decoding device 700, there may be a processing unit not illustrated as a block in FIG. 31, or there may be processing or a data flow not illustrated as an arrow or the like in FIG. 31.

As illustrated in FIG. 31, the decoding device 700 includes a demultiplexing unit 711, a pair information decoding unit 712, a meta information decoding unit 713, a 2D decoding unit 714, a pairing processing unit 715, a patch reconstruction unit 716, a vertex information reconstruction unit 717, and a 2D decoding unit 718.

The demultiplexing unit 711 acquires a bitstream input to the decoding device 700. As described above in the first embodiment, this bitstream is, for example, a bitstream generated by the encoding device 300 or the encoding device 600, and 3D data using a mesh is encoded by extending the VPCC.

The demultiplexing unit 711 demultiplexes the bitstream and generates each encoded data included in the bitstream. That is, the demultiplexing unit 711 extracts each encoded data from the bitstream by the demultiplexing. For example, the demultiplexing unit 711 extracts the encoded data of the pair information from the bitstream. Further, the demultiplexing unit 711 extracts the encoded data of the meta information from the bitstream. Furthermore, the demultiplexing unit 711 extracts the encoded data of the geometry image from the bitstream. Further, the demultiplexing unit 711 extracts the encoded data of the occupancy image from the bitstream. Furthermore, the demultiplexing unit 711 extracts the encoded data of the texture image from the bitstream. That is, the demultiplexing unit 711 can also be said to be an acquisition unit that acquires the encoded data from the bitstream.

The demultiplexing unit 711 supplies the encoded data of the extracted pair information to the pair information decoding unit 712. Further, the demultiplexing unit 711 supplies the encoded data of the extracted meta information to the meta information decoding unit 713. Furthermore, the demultiplexing unit 711 supplies the encoded data of the extracted geometry image and the encoded data of the occupancy image to the 2D decoding unit 714. Further, the demultiplexing unit 711 supplies the encoded data of the extracted texture image to the 2D decoding unit 718.

The pair information decoding unit 712 acquires the encoded data of the pair information supplied from the demultiplexing unit 711. The pair information decoding unit 712 decodes the encoded data by a predetermined decoding method to generate pair information. This decoding method is arbitrary as long as it corresponds to the encoding method applied by the encoding device 300 or the encoding device 600 in encoding the pair information.

That is, the pair information decoding unit 712 divides a mesh representing an object having a three-dimensional structure into at least a first patch and a second patch and arranges the patches in a single image, and decodes encoded data of pair information indicating that at least one vertex of the first patch and at least one vertex of the second patch located at the same position as the position of the vertex of the first patch in the object before encoding are paired, to obtain the pair information. The pair information decoding unit 712 supplies the generated pair information to the pairing processing unit 715.

The meta information decoding unit 713 acquires the encoded data of the meta information supplied from the demultiplexing unit 711. The meta information decoding unit 713 decodes the encoded data of the acquired meta information to generate meta information. The meta information includes connectivity 451 and a UV map 452. The meta information decoding unit 713 outputs the generated connectivity 451 and UV map 452 to the outside of the decoding device 700 as (data constituting) 3D data using the restored mesh. Further, the meta information decoding unit 713 supplies the generated connectivity 451 and UV map 452 to the patch reconstruction unit 716.

The 2D decoding unit 714 acquires the encoded data of the geometry image and the encoded data of the occupancy image supplied from the demultiplexing unit 711. The 2D decoding unit 714 decodes the acquired encoded data of the geometry image by a decoding method for 2D images to generate a geometry image. In addition, the 2D decoding unit 714 decodes the acquired encoded data of the occupancy image by a decoding method for 2D images to generate an occupancy image. These decoding methods correspond to the encoding methods applied by the encoding device 300 and the encoding device 600 in the encoding of the geometry image. The 2D decoding unit 714 supplies the generated geometry image and occupancy image to the pairing processing unit 715.

The pairing processing unit 715 acquires the pair information supplied from the pair information decoding unit 712. This pair information is, for example, information transmitted from the encoding device 300 or the encoding device 600, and may include information as described in the sections of <2. Transmission of Pair Information>, <5. Derivation of Correct Coordinates>, <6. Pairing Processing in Two Dimensions>, and the like. Furthermore, the pairing processing unit 715 acquires the geometry image and the occupancy image supplied from the 2D decoding unit 714. The pairing processing unit 715 performs the pairing processing on the patch included in the geometry image on the basis of the acquired pair information. That is, the pairing processing unit 715 can also be said to be a correction unit that corrects the geometry of the vertices constituting the pair on the basis of the pair information. At that time, the pairing processing unit 715 executes the pairing processing on a two-dimensional plane (for example, a geometry image) as described in the section of <6. Pairing Processing in Two Dimensions> and the like. The pairing processing unit 715 supplies the geometry image, the occupancy image, and the like after the pairing processing to the patch reconstruction unit 716.

The patch reconstruction unit 716 acquires the meta information (the connectivity 451, the UV map 452, and the like) supplied from the meta information decoding unit 713. In addition, the patch reconstruction unit 716 acquires the geometry image and the occupancy image after the pairing processing supplied from the pairing processing unit 715. The patch reconstruction unit 716 extracts a patch image from the geometry image using the occupancy image and the meta information, and reconstructs a patch corresponding to the extracted patch image. The patch reconstruction unit 716 supplies the reconstructed patch and the used meta information (the connectivity 451, the UV map 452, and the like) to the vertex information reconstruction unit 717.

The vertex information reconstruction unit 717 acquires the patch and the meta information supplied from the patch reconstruction unit 716. The vertex information reconstruction unit 717 reconstructs vertices included in the region of the patch from the acquired patch, and generates vertex information 453. That is, the vertex information reconstruction unit 717 can also be said to be a vertex reconstruction unit that reconstructs a vertex using the reconstructed patch. The vertex information reconstruction unit 717 outputs the generated vertex information 453 to the outside of the decoding device 700 as (data constituting) 3D data using the restored mesh.

The 2D decoding unit 718 acquires the encoded data of the texture image supplied from the demultiplexing unit 711. The 2D decoding unit 718 decodes the acquired encoded data of the texture image by a decoding method for 2D images to generate a texture image (texture 454). This decoding method corresponds to the encoding method applied by the encoding device 300 or the encoding device 600 to encode the texture image. The 2D decoding unit 718 outputs the generated texture image (texture 454) to the outside of the decoding device 700 as (data constituting) 3D data using the restored mesh.

With such a configuration, the decoding device 700 can more reliably suppress the occurrence of cracks and perform the pairing processing between more appropriate vertices. That is, the decoding device 700 can suppress a reduction in the quality of the 3D data due to encoding and decoding.

Note that these processing units (demultiplexing unit 711 to 2D decoding unit 718) have an arbitrary configuration. For example, each processing unit may be configured by a logic circuit that implements the above-described processing. Furthermore, each processing unit may have, for example, a CPU, a ROM, a RAM, and the like, and execute a program by using the CPU, the ROM, the RAM, and the like to achieve the above-described processing. Needless to say, each processing unit may have both the configurations, and a part of the above-described processing may be achieved by the logic circuit and another may be achieved by executing the program. The configurations of the processing units may be independent from each other, and, for example, among the processing units, some processing units may achieve a part of the above-described processing with a logic circuit, some other processing units may achieve the above-described processing by executing a program, and still some other processing units may achieve the above-described processing with both a logic circuit and execution of a program.

<Flow of Decoding Process>

Figure 32:
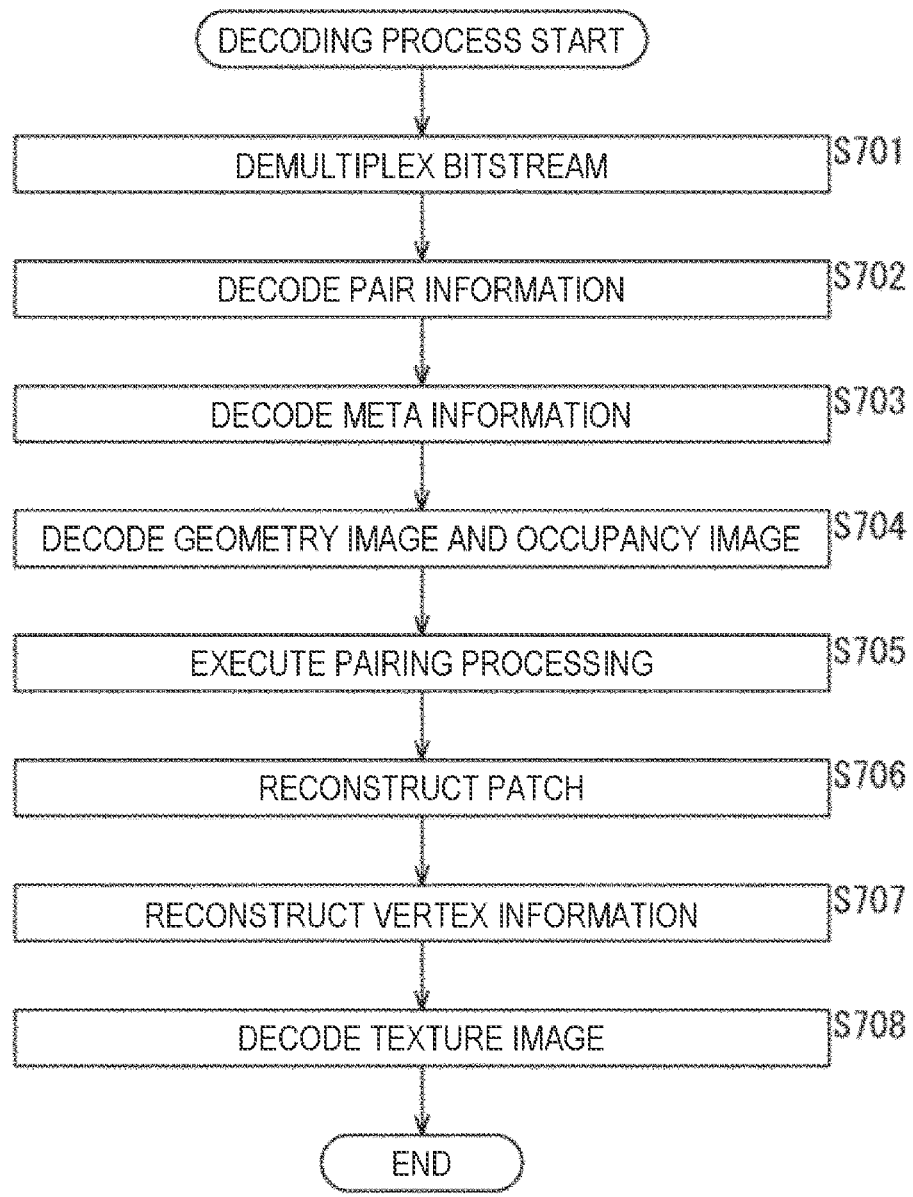
FIG. 32 is a flowchart for explaining an example of a flow of a decoding process.

An example of a flow of a decoding process executed by this decoding device 700 will be described with reference to a flowchart of FIG. 32.

When the decoding process is started, the demultiplexing unit 711 demultiplexes the bitstream input to the decoding device 700 in step S701. By this demultiplexing, the demultiplexing unit 711 extracts (acquires) encoded data of the pair information from the bitstream. Further, the demultiplexing unit 711 extracts (acquires) encoded data of the meta information from the bitstream. Furthermore, the demultiplexing unit 711 extracts (acquires) encoded data of the geometry image from the bitstream. Further, the demultiplexing unit 711 extracts (acquires) encoded data of the occupancy image from the bitstream. Furthermore, the demultiplexing unit 711 extracts (acquires) encoded data of the texture image from the bitstream.

In step S702, the pair information decoding unit 712 decodes the encoded data of the pair information extracted from the bitstream in step S701 by a predetermined decoding method to generate (restore) the pair information. The pair information is information transmitted from the encoding device 300, the encoding device 600, or the like, and may include information as described in the sections <2. Transmission of Pair Information>, <5. Derivation of Correct Coordinates>, <6. Pairing Processing in Two Dimensions>, and the like.

That is, the pair information decoding unit 712 divides a mesh representing an object having a three-dimensional structure into patches to decode encoded data of pair information indicating a pair constituted by a single vertex of the mesh or a plurality of vertices of a patch generated from a plurality of vertices at the same position, and obtains the pair information.

In step S703, the meta information decoding unit 713 decodes the encoded data of the meta information extracted from the bitstream in step S701, and generates (restores) the meta information. This meta information includes the connectivity 451 and the UV map 452.

In step S704, the 2D decoding unit 714 decodes the encoded data of the geometry image extracted from the bitstream in step S701, and generates (restores) the geometry image. In addition, the 2D decoding unit 714 decodes the encoded data of the occupancy image extracted from the bitstream in step S701 to generate (restore) the occupancy image.

In step S705, the pairing processing unit 715 performs the pairing processing of the vertices included in the vertex information 453 on the basis of the pair information generated (restored) in step S702. At that time, the pairing processing unit 715 executes the pairing processing on the two-dimensional plane (for example, the geometry image) as described in the section of <6. Pairing Processing in Two Dimensions>.

In step S706, the patch reconstruction unit 716 extracts a patch image from the geometry image generated in step S704 by using the meta information (the connectivity 451, the UV map 452, and the like) generated in step S702, and reconstructs a patch corresponding to the patch image.

In step S707, the vertex information reconstruction unit 717 reconstructs vertices included in the region of the patch from the patch reconstructed in step S706, and generates the vertex information 453.

In step S708, the 2D decoding unit 718 decodes the encoded data of the texture image extracted from the bitstream in step S701, and generates (restores) the texture image (texture 454).

By executing each process in this manner, the decoding device 700 can more reliably suppress the occurrence of cracks and perform the pairing processing between more appropriate vertices. That is, the decoding device 700 can suppress a reduction in the quality of the 3D data due to encoding and decoding.

9. Appendix

In the above description, a case where 3D data using a mesh is encoded by extending the standard called VPCC has been described, but Visual Volumetric Video-based Coding (V3C) or metadata immersive video (MIV) may be applied instead of VPCC. V3C and MIV are standards using substantially the same encoding technique as VPCC, and can be extended similarly to the case of VPCC to encode 3D data using a mesh. Therefore, the above-described present technology can also be applied to a case where V3C or MIV is applied to encoding of 3D data using a mesh.

<3D Data>

Although the case where the present technology is applied to mesh encoding/decoding has been described above, the present technology is not limited to these examples, and can be applied to encoding/decoding of 3D data of an arbitrary standard. That is, as long as there is no contradiction with the present technology described above, specifications of various processes such as an encoding/decoding method and various types of data such as 3D data and metadata are arbitrary. Furthermore, in so far as there is no conflict with the present technology, part of the above-described processing or specifications may be omitted.

<Computer>

The above-described series of processing can be executed by hardware or software. When the series of processing is executed by software, a program constituting the software is installed in a computer. Here, the computer includes a computer incorporated in dedicated hardware, a generalpurpose personal computer for example that can execute various functions by installing various programs, and the like.

Figure 33:
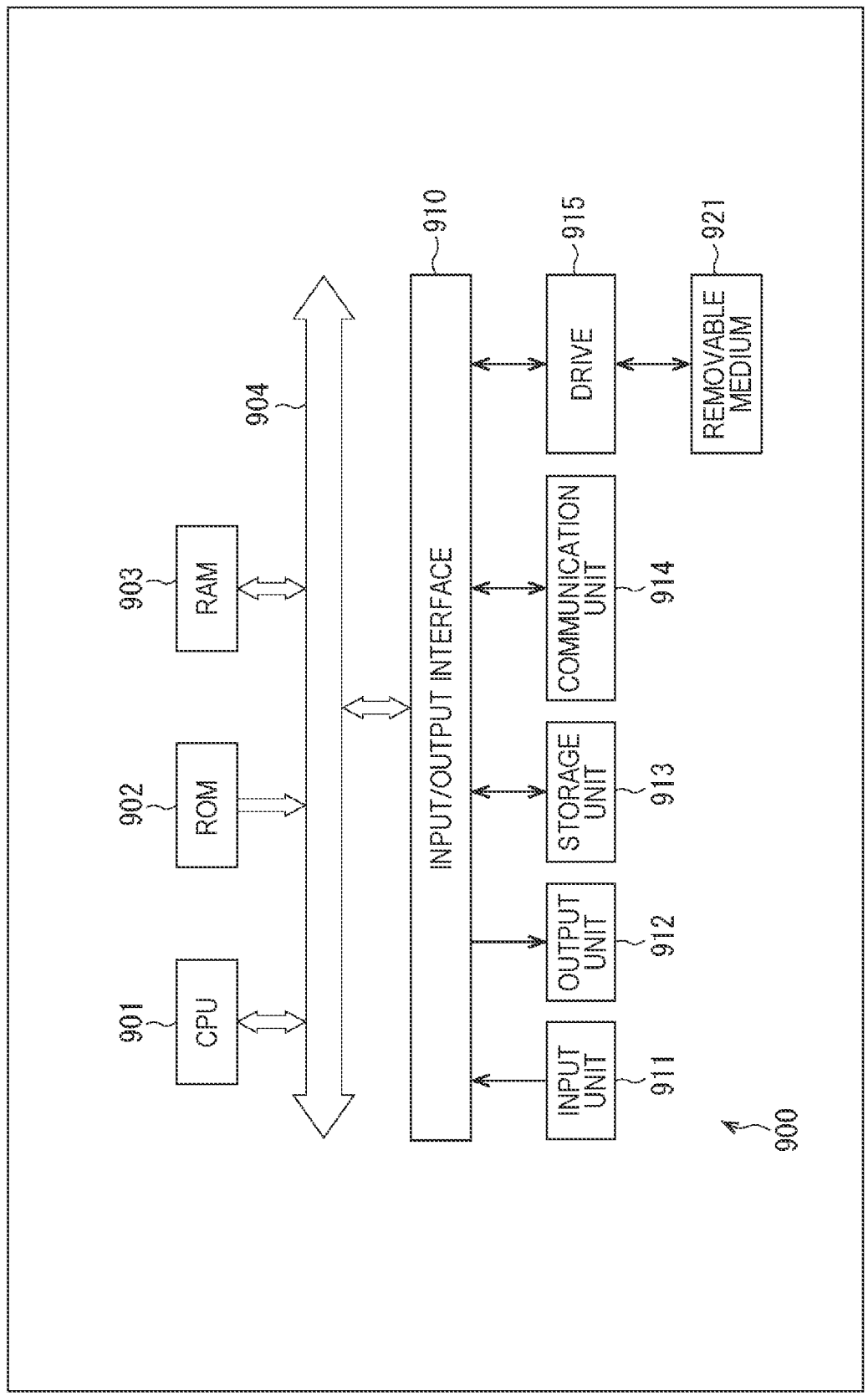
FIG. 33 is a block diagram illustrating a main configuration example of a computer.

FIG. 33 is a block diagram illustrating a configuration example of hardware of a computer that executes the above-described series of processing by a program.

In a computer 900 illustrated in FIG. 33, a central processing unit (CPU) 901, a read only memory (ROM) 902, and a random access memory (RAM) 903 are mutually connected via a bus 904.

Furthermore, an input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory, and the like. The communication unit 914 includes, for example, a network interface. The drive 915 drives a removable medium 921 such as a magnetic disk, an optical disk, a magneto-optical disk, or a semiconductor memory.

In the computer configured as described above, the series of processing described above are performed, for example, by the CPU 901 loading a program stored in the storage unit 913 into the RAM 903 via the input/output interface 910 and the bus 904, and executing the program. Furthermore, the RAM 903 also appropriately stores data and the like necessary for the CPU 901 to execute various processes.

The program executed by the computer can be applied by being recorded on, for example, the removable medium 921 as a package medium or the like. In this case, the program can be installed in the storage unit 913 via the input/output interface 910 by attaching the removable medium 921 to the drive 915.

Furthermore, this program can also be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

<Applicable Target of Present Technology>

The present technology may be applied to an arbitrary configuration. For example, the present technology can be applied to various electronic devices.

Furthermore, for example, the present technology can also be implemented as a partial configuration of a device, such as a processor (for example, a video processor) as a system large scale integration (LSI) or the like, a module (for example, a video module) using a plurality of the processors or the like, a unit (for example, a video unit) using a plurality of the modules or the like, or a set (for example, a video set) obtained by further adding other functions to the unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that in the present specification, a system means a set of a plurality of components (devices, modules (parts), and the like), and it does not matter whether or not all the components are in the same housing. Therefore, both of a plurality of devices stored in different housings and connected via a network, and one device in which a plurality of modules is stored in one housing are systems.

<Field and Use to Which Present Technology Is Applicable>

The system, device, processing unit and the like to which the present technology is applied can be used in arbitrary fields such as traffic, medical care, crime prevention, agriculture, livestock industry, mining, beauty care, factory, household appliance, weather, and natural surveillance, for example. Furthermore, any application thereof may be used.

<Others>

Note that in the present specification, the "flag" is information for identifying a plurality of states, and includes not only information used for identifying two states of true (1) and false (0) but also information capable of identifying three or more states. Therefore, the value that may be taken by the "flag" may be, for example, a binary of I/O or a ternary or more. That is, the number of bits constituting this "flag" is arbitrary, and may be one bit or a plurality of bits. Furthermore, identification information (including the flag) is assumed to include not only identification information thereof in a bitstream but also difference information of the identification information with respect to a certain reference information in the bitstream, and thus, in the present specification, the "flag" and "identification information" include not only the information thereof but also the difference information with respect to the reference information.

Furthermore, various kinds of information (such as metadata) related to encoded data (a bitstream) may be transmitted or recorded in any form as long as it is associated with the encoded data. Here, the term "associating" means, when processing one data, allowing other data to be used (to be linked), for example. That is, the data associated with each other may be collected as one data or may be made individual data. For example, information associated with the encoded data (image) may be transmitted on a transmission path different from that of the encoded data (image). Furthermore, for example, the information associated with the encoded data (image) may be recorded in a recording medium different from that of the encoded data (image) (or another recording area of the same recording medium). Note that this "association" may be not the entire data but a part of data. For example, an image and information corresponding to the image may be associated with each other in any unit such as a plurality of frames, one frame, or a part within a frame.

Note that in the present specification, terms such as "synthesize", "multiplex", "add", "integrate", "include", "store", "put in", "introduce", "insert", and the like mean, for example, to combine a plurality of objects into one, such as to combine encoded data and metadata into one data, and mean one method of "associating" described above.

Furthermore, the embodiments of the present technology are not limited to the above-described embodiments, and various modifications are possible without departing from the scope of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, a configuration other than the above-described configurations may be added to the configuration of each device (or each processing unit). Moreover, when the configuration and operation of the entire system are substantially the same, a part of the configuration of a certain device (or processing unit) may be included in the configuration of another device (or another processing unit).

Furthermore, for example, the above-described program may be executed in any device. In this case, the device is only required to have a necessary function (functional block or the like) and obtain necessary information.

Furthermore, for example, each step of one flowchart may be executed by one device, or may be shared and executed by a plurality of devices. Furthermore, when a plurality of processing is included in one step, the plurality of processing may be executed by one device, or may be shared and executed by a plurality of devices. In other words, a plurality of processes included in one step can also be executed as processes of a plurality of steps. On the contrary, processing described as a plurality of steps can be collectively executed as one step.

Furthermore, for example, in a program executed by the computer, processing of steps describing the program may be executed in a time-series order in the order described in the present specification, or may be executed in parallel or individually at a required timing such as when a call is made. That is, as long as there is no contradiction, the processing of each step may be executed in an order different from the above-described order. Moreover, this processing of steps describing program may be executed in parallel with processing of another program, or may be executed in combination with processing of another program.

Furthermore, for example, a plurality of technologies related to the present technology can be implemented independently as a single entity as long as there is no contradiction. A plurality of arbitrary present technologies can be implemented in combination. For example, part or all of the present technologies described in any of the embodiments can be implemented in combination with part or all of the present technologies described in other embodiments. Furthermore, a part or all of the present technologies described above may be implemented in combination with another technology not described above.

Note that the present technology can also have the following configuration.

(1) An information processing apparatus including: a generation unit that divides a mesh representing an object having a three-dimensional structure into at least a first patch and a second patch and arranges the first patch and the second patch in a single image, and generates pair information indicating that at least one vertex of the first patch and at least one vertex of the second patch located at a same position as a position of the vertex of the first patch in the object before encoding are a pair; and
an encoding unit that encodes the pair information.

(2) The information processing apparatus according to (1),
in which the pair information is information indicating only the pair constituted by the vertices included in the pair information.

(3) The information processing apparatus according to (1),
in which the pair information is information also indicating the pair constituted by the vertex not indicated by the pair information.

(4) The information processing apparatus according to (3), in which the pair information includes information indicating a correspondence between a combination of the vertex located at both ends of a first edge and the vertex located in a middle of the first edge and a combination of the vertex located at both ends of a second edge and the vertex located in a middle of the second edge with respect to the first edge of the first patch and the second edge of the second patch corresponding to boundaries between the first patch and the second patch in the object before the encoding.

(5) The information processing apparatus according to (3) or (4),
in which the pair information includes information indicating a correspondence relationship between a scan direction with respect to the first edge at a time of decoding and a scan direction with respect to the second edge at a time of the decoding with respect to a first edge of the first patch and a second edge of the second patch corresponding to boundaries between the first patch and the second patch in the object before the encoding.

(6) The information processing apparatus according to any one of (1) to (5),
in which the pair information indicates that a plurality of the vertex of the first patch and a corresponding plurality of the vertex of the second patch are each a pair.

(7) The information processing apparatus according to (6),
in which the pair information includes a parameter indicating the number of the vertex constituting the pair.

(8) The information processing apparatus according to any one of (1) to (5),
in which the pair information includes information indicating a group including a plurality of the vertex of the first patch and a group including a plurality of the vertex of the second patch.

(9) The information processing apparatus according to any one of (1) to (8),
in which the pair information indicates the pair by using identification information corresponding to a state of each vertex in the object before the encoding.

(10) The information processing apparatus according to (9),
in which the identification information is identification information for identifying each vertex among the vertices included in the mesh.

(11) The information processing apparatus according to (9) or (10),
in which the identification information is identification information for identifying each vertex among the vertices included in the patch.

(12) The information processing apparatus according to (11),
in which the pair information further includes identification information of the patch.

(13) The information processing apparatus according to (12),
in which the pair information includes identification information of the patch for each pair.

(14) The information processing apparatus according to (12),
in which the pair information includes identification information of the patch for each of a plurality of the pair.

(15) The information processing apparatus according to any one of (9) to (14), in which the identification information is identification information for identifying each vertex among the vertices located at a boundary of the patch.

(16) The information processing apparatus according to (15),
in which the encoding unit further encodes a list of the vertices located at a boundary of the patch.

(17) The information processing apparatus according to any one of (9) to (16),
in which the pair information indicates the pair by using an absolute value of the identification information.

(18) The information processing apparatus according to any one of (9) to (17),
in which the pair information indicates the pair by using a relative value of the identification information from the identification information of another vertex.

(19) The information processing apparatus according to any one of (1) to (18),
in which the pair information indicates the pair on the basis of each coordinate of a plurality of the vertex in a two-dimensional plane of the image.

(20) The information processing apparatus according to (19),
in which the pair information indicates the pair by using the coordinates of each vertex constituting the pair.

(21) The information processing apparatus according to (19) or (20),
in which the pair information indicates relative coordinates of the vertex different from a reference vertex with reference to the coordinates of the reference vertex among the plurality of the vertex.

(22) The information processing apparatus according to any one of (19) to (21),
in which the pair information indicates relative coordinates of the vertex different from the reference vertex with reference to a position of a relative vector between the first patch and the second patch with reference to the coordinates of the reference vertex among the plurality of the vertex.

(23) The information processing apparatus according to any one of (19) to (22),
in which the pair information indicates relative coordinates of the vertex different from the reference vertex in the second patch in a state where a posture is corrected with reference to the position of the relative vector between the first patch and the second patch with reference to the coordinates of the reference vertex among the plurality of the vertex.

(24) The information processing apparatus according to any one of (19) to (23),
in which the pair information indicates relative coordinates of the vertex different from the reference vertex of a processing target pair with reference to relative coordinates of the vertex different from the reference vertex with reference to the coordinates of the reference vertex among the plurality of the vertex of another pair.

(25) An information processing method including:
dividing a mesh representing an object having a three-dimensional structure into at least a first patch and a second patch and arranging the first patch and the second patch in a single image, and generating pair information indicating that at least one vertex of the first patch and at least one vertex of the second patch located at a same position as a position of the vertex of the first patch in the object before encoding are a pair; and
encoding the pair information generated.

(31) An information processing apparatus including:
a decoding unit that divides a mesh representing an object having a three-dimensional structure into at least a first patch and a second patch and arranges the first patch and the second patch in a single image, decodes encoded data of pair information indicating that at least one vertex of the first patch and at least one vertex of the second patch located at a same position as a position of the vertex of the first patch in the object before encoding are a pair, and obtains the pair information; and
a correction unit that corrects the mesh reconstructed on the basis of the pair information.

(32) The information processing apparatus according to (31),
in which the correction unit deletes one vertex of the vertex of the first patch and the vertex of the second patch indicated as the pair by the pair information in the mesh reconstructed, and converts connection of the vertex deleted into connection of another vertex.

(33) The information processing apparatus according to (32),
in which the correction unit sets a position of a single vertex to any position of a plurality of vertices.

(34) The information processing apparatus according to (33),
in which the correction unit sets a position of the single vertex on the basis of information indicating any of the plurality of vertices.

(35) The information processing apparatus according to any one of (32) to (34),
in which the correction unit sets the position of the single vertex to an average of positions of the plurality of vertices.

(36) The information processing apparatus according to any one of (31) to (35),
in which the correction unit moves one vertex of the vertex of the first patch and the vertex of the second patch indicated as the pair by the pair information to a position of another vertex in the mesh reconstructed.

(37) The information processing apparatus according to (36),
in which the correction unit sets a position of an overlapping point to any position of the plurality of vertices.

(38) The information processing apparatus according to (37),
in which the correction unit sets the position of the overlapping point on the basis of information indicating any of the plurality of vertices.

(39) The information processing apparatus according to any one of (36) to (38),
in which the correction unit sets the position of the overlapping point to an average of positions of the plurality of vertices.

(40) The information processing apparatus according to any one of (31) to (39),
in which the correction unit forms a polygon including the vertex of the first patch and the vertex of the second patch indicated as the pair by the pair information in the mesh reconstructed.

(41) The information processing apparatus according to any one of (31) to (40),
in which the correction unit interpolates the vertex that constitutes the pair and is not included in the pair information.

(42) The information processing apparatus according to (41), in which the correction unit executes interpolation of the vertex on the basis of an occupancy image.

(43) The information processing apparatus according to (41) or (42), in which the correction unit executes interpolation of the vertex on the basis of connectivity information.

(44) An information processing method including:

dividing a mesh representing an object having a three-dimensional structure into at least a first patch and a second patch and arranging the first patch and the second patch in a single image, and decoding encoded data of pair information indicating that at least one vertex of the first patch and at least one vertex of the second patch located at a same position as a position of the vertex of the first patch in the object before encoding are a pair; and correcting the mesh reconstructed on the basis of the pair information obtained by decoding the encoded data.

(51) An information processing apparatus including:

a pair information generation unit that divides a mesh representing an object having a three-dimensional structure into at least a first patch and a second patch and arranges the first patch and the second patch in a single image, and generates pair information indicating that at least one vertex of the first patch and at least one vertex of the second patch located at a same position as a position of the vertex of the first patch in the object before encoding are a pair; and a pair information encoding unit that encodes the pair information.

(52) The information processing apparatus according to (51), in which the pair information includes information indicating a position to be a movement destination when each vertex constituting the pair is moved to a same position.

(53) The information processing apparatus according to (51) or (52), further including:

a geometry encoding unit that encodes a geometry image in which a patch of a geometry of the mesh is arranged and generates encoded data of the geometry image; and a geometry decoding unit that decodes the encoded data of the geometry image and generates the geometry image, in which the pair information generation unit generates the pair information on the basis of the geometry image generated by the geometry decoding unit.

(54) An information processing method including:

dividing a mesh representing an object having a three-dimensional structure into at least a first patch and a second patch and arranging the first patch and the second patch in a single image, and generating pair information indicating that at least one vertex of the first patch and at least one vertex of the second patch located at a same position as a position of the vertex of the first patch in the object before encoding are a pair; and encoding the pair information.

(61) An information processing apparatus including:

a pair information decoding unit that divides a mesh representing an object having a three-dimensional structure into at least a first patch and a second patch and arranges the first patch and the second patch in a single image, decodes encoded data of pair information indicating that at least one vertex of the first patch and at least one vertex of the second patch located at a same position as a position of the vertex of the first patch in the object before encoding are a pair, and obtains the pair information; and a correction unit that corrects a geometry of a vertex constituting the pair on the basis of the pair information.

(62) The information processing apparatus according to (61), in which when a normal direction of the first patch does not match a normal direction of the second patch, the correction unit moves the vertex of the first patch and the vertex of the second patch constituting the pair to an intersection of a normal line of the first patch and a normal line of the second patch.

(63) The information processing apparatus according to (61) or (62), in which when the normal direction of the first patch matches the normal direction of the second patch, the correction unit moves the vertex of the first patch and the vertex of the second patch constituting the pair to weighted average positions of respective positions.

(64) The information processing apparatus according to any one of (61) to (63), in which when the normal direction of the first patch matches the normal direction of the second patch, the correction unit moves the position to a position indicated by the pair information.

(65) The information processing apparatus according to any one of (61) to (64), in which the correction unit moves the vertex of the first patch and the vertex of the second patch constituting the pair to a same position in a geometry image generated by decoding encoded data, the information processing apparatus further including:

a patch reconstruction unit that reconstructs a patch using the geometry image corrected by the correction unit; and a vertex reconstruction unit that reconstructs a vertex using the patch reconstructed.

(66) An information processing method including:

dividing a mesh representing an object having a three-dimensional structure into at least a first patch and a second patch and arranging the first patch and the second patch in a single image, decoding encoded data of pair information indicating that at least one vertex of the first patch and at least one vertex of the second patch located at a same position as a position of the vertex of the first patch in the object before encoding are a pair, and acquiring the pair information; and correcting a geometry of a vertex constituting the pair on the basis of the pair information.

REFERENCE SIGNS LIST

300 Encoding device
311 Mesh voxelization unit
312 Patch generation unit
313 Pair information generation unit
314 Geometry image generation unit
315 Occupancy image generation unit
316 Pair information encoding unit
317 Meta information encoding unit
318 to 320 2D encoding unit
321 Multiplexing unit
331 Image generation unit
332 Encoding unit
400 Decoding device 411 Demultiplexing unit
412 Pair information decoding unit
413 Meta information decoding unit
414 to 416 2D decoding unit
417 Patch reconstruction unit
418 Vertex information reconstruction unit
419 Pairing processing unit
600 Encoding device
611 Mesh voxelization unit
612 Patch generation unit
613 Meta information encoding unit
614 Image generation unit
615 2D encoding unit
616 2D decoding unit
617 Pair information generation unit
618 Pair information encoding unit
619 Pairing processing unit
620 Image generation unit
621 2D encoding unit
622 Multiplexing unit
700 Decoding device
711 Demultiplexing unit
712 Pair information decoding unit
713 Meta information decoding unit
714 2D decoding unit
715 Pairing processing unit
716 Patch reconstruction unit
717 Vertex information reconstruction unit
718 2D decoding unit
900 Computer

The invention claimed is:

1. An information processing apparatus comprising:
a generation unit that divides a mesh representing an object having a three-dimensional structure into at least a first patch and a second patch and arranges the first patch and the second patch in a single image, and generates pair information indicating that at least one vertex of the first patch and at least one vertex of the second patch located at a same position as a position of the vertex of the first patch in the object before encoding are a pair; and
an encoding unit that encodes the pair information.

2. The information processing apparatus according to claim 1,
wherein the pair information is information indicating only the pair constituted by the vertices included in the pair information.

3. The information processing apparatus according to claim 1,
wherein the pair information includes information indicating a correspondence between a combination of the vertex located at both ends of a first edge and the vertex located in a middle of the first edge and a combination of the vertex located at both ends of a second edge and the vertex located in a middle of the second edge with respect to the first edge of the first patch and the second edge of the second patch corresponding to boundaries between the first patch and the second patch in the object before the encoding.

4. The information processing apparatus according to claim 1,
wherein the pair information includes information indicating a correspondence relationship between a scan direction with respect to the first edge at a time of decoding and a scan direction with respect to the second edge at a time of the decoding with respect to a first edge of the first patch and a second edge of the second patch corresponding to boundaries between the first patch and the second patch in the object before the encoding.

5. The information processing apparatus according to claim 1,
wherein the pair information indicates that a plurality of the vertex of the first patch and a corresponding plurality of the vertex of the second patch are each a pair.

6. The information processing apparatus according to claim 5,
wherein the pair information includes a parameter indicating the number of the vertex constituting the pair.

7. The information processing apparatus according to claim 1,
wherein the pair information includes information indicating a group including a plurality of the vertex of the first patch and a group including a plurality of the vertex of the second patch.

8. The information processing apparatus according to claim 1,
wherein the pair information indicates the pair by using identification information corresponding to a state of each vertex in the object before the encoding.

9. The information processing apparatus according to claim 1,
wherein the pair information indicates the pair on a basis of each coordinate of a plurality of the vertex in a two-dimensional plane of the image.

10. The information processing apparatus according to claim 9,
wherein the pair information indicates relative coordinates of the vertex different from a reference vertex with reference to the coordinates of the reference vertex among the plurality of the vertex.

11. The information processing apparatus according to claim 10,
wherein the pair information indicates relative coordinates of the vertex different from the reference vertex with reference to a position of a relative vector between the first patch and the second patch with reference to the coordinates of the reference vertex among the plurality of the vertex.

12. The information processing apparatus according to claim 11,
wherein the pair information indicates relative coordinates of the vertex different from the reference vertex in the second patch in a state where a posture is corrected with reference to the position of the relative vector between the first patch and the second patch with reference to the coordinates of the reference vertex among the plurality of the vertex.

13. The information processing apparatus according to claim 9,
wherein the pair information indicates relative coordinates of the vertex different from the reference vertex of a processing target pair with reference to relative coordinates of the vertex different from the reference vertex with reference to the coordinates of the reference vertex among the plurality of the vertex of another pair.

14. An information processing method comprising:
dividing a mesh representing an object having a three-dimensional structure into at least a first patch and a second patch and arranging the first patch and the second patch in a single image, and generating pair information indicating that at least one vertex of the first patch and at least one vertex of the second patch located at a same position as a position of the vertex of the first patch in the object before encoding are a pair; and encoding the pair information generated.

15. An information processing apparatus comprising:

a decoding unit that divides a mesh representing an object having a three-dimensional structure into at least a first patch and a second patch and arranges the first patch and the second patch in a single image, decodes encoded data of pair information indicating that at least one vertex of the first patch and at least one vertex of the second patch located at a same position as a position of the vertex of the first patch in the object before encoding are a pair, and obtains the pair information; and a correction unit that corrects the mesh reconstructed on a basis of the pair information.

16. The information processing apparatus according to claim 15, wherein the correction unit deletes one vertex of the vertex of the first patch and the vertex of the second patch indicated as the pair by the pair information in the mesh reconstructed, and converts connection of the vertex deleted into connection of another vertex.

17. The information processing apparatus according to claim 15, wherein the correction unit moves one vertex of the vertex of the first patch and the vertex of the second patch indicated as the pair by the pair information to a position of another vertex in the mesh reconstructed.

18. The information processing apparatus according to claim 15, wherein the correction unit forms a polygon including the vertex of the first patch and the vertex of the second patch indicated as the pair by the pair information in the mesh reconstructed.

19. The information processing apparatus according to claim 15, wherein the correction unit interpolates the vertex that constitutes the pair and is not included in the pair information.

20. An information processing method comprising:

dividing a mesh representing an object having a three-dimensional structure into at least a first patch and a second patch and arranging the first patch and the second patch in a single image, and decoding encoded data of pair information indicating that at least one vertex of the first patch and at least one vertex of the second patch located at a same position as a position of the vertex of the first patch in the object before encoding are a pair; and correcting the mesh reconstructed on a basis of the pair information obtained by decoding the encoded data.

* * * * *